United States Patent
Konno et al.

(10) Patent No.: US 8,411,242 B2
(45) Date of Patent: Apr. 2, 2013

(54) LIQUID CRYSTAL DISPLAY DEVICE

(75) Inventors: Takayuki Konno, Kanagawa (JP);
Shinichi Nishida, Kanagawa (JP);
Teruaki Suzuki, Kanagawa (JP);
Yusuke Nogami, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/155,044

(22) Filed: Jun. 7, 2011

(65) Prior Publication Data

US 2011/0234935 A1 Sep. 29, 2011

Related U.S. Application Data

(62) Division of application No. 12/727,633, filed on Mar. 19, 2010, now Pat. No. 7,986,390, which is a division of application No. 11/882,516, filed on Aug. 2, 2007, now Pat. No. 7,728,940.

(30) Foreign Application Priority Data

Aug. 11, 2006 (JP) .................................. 2006-219322
Mar. 9, 2007 (JP) .................................. 2007-060758

(51) Int. Cl.
*G02F 1/1335* (2006.01)
(52) U.S. Cl. ......................................................... 349/139
(58) Field of Classification Search .................... 349/38, 349/39, 139
See application file for complete search history.

(56) References Cited

U.S. PATENT DOCUMENTS

| 6,862,067 B2 | 3/2005 | Matsumoto et al. |
| 6,924,863 B2 * | 8/2005 | Nishida et al. ................ 349/141 |
| 6,965,422 B2 | 11/2005 | Kubo et al. |
| 2004/0090564 A1 | 5/2004 | Lee |

FOREIGN PATENT DOCUMENTS

| JP | 2002-007483 | 1/2002 |
| JP | 2002-323706 | 11/2002 |
| JP | 2003-061352 | 2/2003 |
| JP | 2003-207803 | 7/2003 |

* cited by examiner

*Primary Examiner* — Eric Wong
(74) *Attorney, Agent, or Firm* — Young & Thompson

(57) ABSTRACT

Disclosed is an active matrix liquid crystal display device including substrates and a liquid crystal layer. The substrate includes: scan signal wiring lines; common signal wiring lines; video signal wiring lines intersecting these wiring lines; and pixels surrounded with the scan signal wiring lines and the video signal wiring lines. Each of pixels includes: a thin film transistor; source electrodes in a layer with the video signal wiring lines; pixel electrodes connected to the source electrodes; and common electrodes connected to the common signal wiring lines. The source electrodes include first parts overlapping the scan signal wiring lines and second parts connecting with the pixel electrodes, which are positioned around central parts between the video signal wiring lines. Molecular axes in the liquid crystal layer rotate under an electric field applied between the pixel electrodes and the common electrodes.

6 Claims, 47 Drawing Sheets

LIQUID CRYSTAL DISPLAY DEVICE

INCORPORATION BY REFERENCE

This application is based upon and claims the benefit of priority from Japanese Patent Application Nos. 2006-219322 filed on Aug. 11, 2006 and 2007-060758 filed on Mar. 9, 2007, the disclosure of which is incorporated herein in its entirety by reference.

BACKGROUND OF THE INVENTION

1. Technical Field

The present invention relates to a liquid crystal display (LCD) device, and particularly relates to an LCD device of an active matrix type in an In-Plane Switching (IPS) mode of a high aperture ratio and high contrast.

2. Background Art

A display of a twisted nematic (TN) system with high contrast is widely used. However, since molecular axes of liquid crystal (LC) molecules rise by a vertical electric field, a display device of the TN system includes a significant viewing angle dependency. In recent years, as demand for a large monitor of a TV is increasing, an IPS mode becomes widespread. In a display device of the IPS mode, molecular axes of LC molecules rotate by a horizontal electric field in a plane parallel to a substrate to perform display. Since the IPS mode does not include viewing angle dependency over a rising angle of the molecular axes, viewing angle characteristics thereof is substantially more advantageous than that of the TN system.

In a display device of the IPS mode, pixel electrodes and common electrodes are arranged in a shape like a comb teeth, and a horizontal electric field is applied between the pixel electrodes and the common electrodes. For this reason, a ratio of an electrode area to display areas is large. That is, the display device of the IPS mode includes a low aperture ratio. Since the display device of the IPS mode is driven by a horizontal electric field, LC molecules in display areas tend to be affected by an electric field leaked from video signal wiring lines and a vertical cross talk easily occurs.

For example, a solution for such problem is disclosed in Japanese Patent Application Laid-Open No. 2002-323706 (patent document 1). FIG. 35A shows one pixel plan view and FIG. 35B shows a cross sectional view along lines I-I, II-II and III-III. A plurality of scan signal wiring lines 3501, which are first metal layers, and two common signal wiring lines 3502 in parallel thereto are formed on a substrate. A first insulating film 3503 is formed on the plurality of scan signal wiring lines and the plurality of common signal wiring lines. A plurality of video signal wiring lines 3504, which are second metal layers, a thin film transistor (TFT) 3505 and source electrodes 3506 are formed on the first insulating film. The source electrodes 3506 are disposed at both sides of a plurality of pixels, and are connected to pixel auxiliary wiring lines 3506B that are located in the same layer as the source electrodes. The respective source electrodes 3506 form a storage capacitance in areas overlapped the plurality of common signal wiring lines 3502. The source electrodes 3506 and the plurality of common signal wiring lines 3502 are patterned like a saw shape.

In edges in display areas, the saw-like pattern portions suppress an electric field which causes a reverse-rotation of LC molecules. A second insulating film 3507 is formed on the plurality of video signal wiring lines 3504, the TFT 3505 and the source electrodes 3506. A third insulating film 3508 that is a transparent insulating film is formed on the second insulating film 3507. Pixel electrodes 3509 and common electrodes 3510 which are transparent electrodes are formed on the third insulating film 3508. The plurality of video signal wiring lines 3504 are completely covered by the common electrodes 3510 in a wiring line width direction via the second insulating film 3507 and the third insulating film 3508. The pixel electrodes 3509 and the common electrodes 3510 are electrically connected to the source electrodes 3506 and the plurality of common signal wiring lines 3502 respectively via contact holes 3511 and 3512.

The pixel electrodes 3509 and the common electrodes 3510 which are arranged in a shape of comb teeth are transparent electrodes. Thus, areas on the electrode contribute to transmittance. According to a simulation, contribution to the transmittance of the transparent electrodes increases an effective aperture ratio by about 8%. Since areas on the plurality of video signal wiring lines are completely covered by the common electrodes in the wiring line width direction, it is possible to extend an opening to areas near the plurality of video signal wiring lines. Thus, reverse-rotation of liquid crystal molecules is prevented in edges in the display areas, and efficiency for light utilization rises to a maximum extent.

Leaked electric fields from the plurality of video signal wiring lines are shielded by the common electrodes. Accordingly, vertical cross talk decreases. Further, although load capacity occurs between the plurality of video signal wiring lines and the common electrodes, the load capacity does not influence drive of the display device because of an insulating film having low dielectric constant.

A solution to the above problem is also disclosed in Japanese Patent Application Laid-Open No. 2003-207803 (patent document 2). FIG. 37A shows a plan view of one pixel and FIG. 37B shows a cross sectional view along lines I-I, II-II and III-III. A plurality of scan signal wiring lines 3701 that are first metal layers, and two common signal wiring lines 3702 in parallel thereto are formed. A first insulating film 3703 is formed on the plurality of scan signal wiring lines 3701 and the plurality of common signal wiring lines 3702. A plurality of video signal wiring lines 3704 that are second metal layers, a TFT 3705 and source electrodes 3706 are formed on the first insulating film. Although source electrodes 3706 are provided at both sides of a plurality of pixels in FIG. 37A, the source electrodes are not connected to each other in the same layer. The respective source electrodes 3706 are connected electrically via contact holes 3711, 3713 and pixel electrodes 3709. The respective source electrodes 3706 form a storage capacitance in the areas overlapped the plurality of common signal wiring lines 3702.

The source electrodes 3706 and the plurality of common signal wiring lines 3702 are patterned like a saw shape. In edges in display areas, the saw-like pattern suppresses an electric field which causes reverse-rotation of LC molecules. A second insulating film 3707 is formed on the plurality of video signal wiring lines 3704, the TFT 3705 and the source electrodes 3706. A third clear insulating film 3708 is formed on the second insulating film 3707. The pixel electrodes 3709 and common electrodes 3710 which are transparent electrodes are formed on the third insulating film 3708. The plurality of video signal wiring lines 3704 are completely covered by the common electrodes 3710 in a wiring line width direction via the second insulating film 3707 and the third insulating film 3708. The pixel electrode 3709 and common electrodes 3710 are electrically connected to the source electrodes 3706 and the plurality of common signal wiring lines 3702 respectively via contact holes 3711, 3712 and 3713.

In recent years, a liquid crystal display (LCD) device with high definition is required. In the patent document 1, high-definition LCD is not realized. The second metal layer is illustrated on FIG. 36A. When the plurality of video signal wiring lines 3604 and the pixel auxiliary wiring lines 3606B become close in the same layer, a foreign particle or the like tend to cause short-circuiting therebetween. FIG. 36B shows an example in which the two wiring lines short-circuit. The plurality of video signal wiring lines 3604 and the pixel auxiliary wiring lines 3606B are connected through a leak pass 3606C. Electric potential of the pixel electrode is influenced by change of electric potential of video signal wiring lines 3604 in this state. A leaked pass looks like a bright point on a dark screen and looks like a dark point on a light screen. Hereinafter, such a point defect which performs like above is called "a leak bright point". A demand to the image quality is increased in recent years, and in particular, a display device without the leak bright point is strongly required.

In the patent document 2, a contact hole 3713 is disposed and two source electrodes 3706 are connected via a transparent pixel electrode 3709. By eliminating pixel auxiliary wiring lines in the same layer, short-circuiting to a plurality of video signal wiring lines in the same layer is decreased. However, even in such configurations, the source electrodes and a plurality of video signal wiring lines highly tend to short-circuit. FIG. 38A shows only a second metal layer. Because a storage capacitance is formed between the source electrodes 3806 and the plurality of common signal wiring lines 3802, the source electrodes 3806 must be arranged so as to be more adjacent to the plurality of video signal wiring lines 3804 than the pixel auxiliary wiring lines. FIG. 38B shows that the plurality of video signal wiring lines 3804 and the source electrodes 3806, which are formed in the same layer, make short-circuiting through a leaked pass 3806C. In such configuration, potential of the pixel electrode is influenced by change in electric potential of the plurality of video signal wiring lines 3804, and the leak bright point occurs as stated in the patent document 1. By removing the pixel auxiliary wiring lines, short-circuiting in the same layer is reduced to some extent compared with the patent document 1. However, substantial reduction is not realized.

The display devices in the related art display form a storage capacitance by overlapping between the plurality of common signal wiring lines and the source electrodes. In the display device, short-circuiting between the plurality of video signal wiring lines and the source electrodes is still likely. Thus, improvement of substantial yield is difficult in the related art.

SUMMARY

The main object of the present application is to suppress short-circuiting between a plurality of video signal wiring lines and source electrodes to provide an active matrix LCD device of a lateral electric field type which can realize high yield.

According to an aspect of the present invention, an active matrix liquid crystal display device includes: a first substrate, a second substrate facing the first substrate, and a liquid crystal layer sandwiched by the first substrate and the second substrate. The first substrate includes: a plurality of scan signal wiring lines; a plurality of common signal wiring lines disposed along the plurality of scan signal wiring lines; a plurality of video signal wiring lines intersecting the plurality of scan signal wiring lines and the plurality of common signal wiring lines; and a plurality of pixels. The plurality of pixels are disposed in a first region surrounded with the plurality of scan signal wiring lines and the plurality of video signal wiring lines. The pixel includes: a thin film transistor; source electrodes of the thin film transistor formed in a layer in which the plurality of video signal wiring lines are disposed; pixel electrodes connected to the source electrodes; and common electrodes connected to the plurality of common signal wiring lines. The source electrodes include a first part overlapping the plurality of scan signal wiring lines and a second part connecting with the pixel electrode. The second part is positioned around a central part between the video signal wiring lines in a side of the plurality of pixels. Molecular axes of a liquid crystal molecule in the liquid crystal layer rotate in a first direction in a plane approximately parallel to the first substrate under an electric field, which is approximately parallel to the first substrate and is applied between the pixel electrode and the common electrodes.

According to an active matrix LCD device of a lateral electric field type of the present invention, following advantageous effects are obtained.

Firstly since short-circuit between source electrodes and a plurality of video signal wiring lines highly decreases, high yield in a high-definition product becomes possible. The reasons are as follows. The source electrodes and the pixel auxiliary wiring lines both located in a side of a plurality of pixels are formed in a layer which is different from a layer where the plurality of video signal wiring lines are located. The area of the source electrodes which are located in other side of the pixel and in the same layer as the plurality of video signal wiring lines is reduced. The distances between the edges of patterns (interval of facing sides of the patterns) in the same layer become large.

Secondarily reverse-rotation of LC molecules is also prevented in the above-mentioned structure. A direction of molecular axis rotation based on a fringe electric field in an LC layer and a desired direction of molecular axis rotation therein are identical in areas where pixel electrodes in atop layer and a plurality of common signal wiring lines in a bottom layer intersect. A strong electric field which rotates the molecular axes in forward rotational direction occurs in the areas. Thus, even if the source electrodes are removed, reverse-rotation of LC molecules is prevented by the new reverse-rotation preventing structure.

Other exemplary features and advantages of the present invention is apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention become apparent from the following detailed description when taken with the accompanying drawings in which.

EXEMPLARY EMBODIMENT

Exemplary embodiments of the present invention will now be described in detail in accordance with the accompanying drawings.

In an exemplary embodiment, an active matrix liquid crystal display device of an IPS mode includes source electrodes of a TFT. The source electrodes of the TFT are formed in a first part that connects with a TFT, a second part that connects with pixel electrodes and a third part that connects the first part and the second part. The second part is arranged in the almost center part between video signal wiring lines. A positional relationship between the source electrodes and video signal wiring lines is defined by a total of a value which is obtained when a width of each area of the source electrodes facing at least a part of the plurality of video signal wiring lines is divided by distances between the areas and the plurality of video signal wiring lines. By controlling the total value, a short circuit of the source electrodes and the plurality of video signal wiring lines is suppressed. Thus, a high-definition display device with high yield can be produced. A storage capacitance is formed in a part where pixel electrodes overlap a plurality of common signal wiring lines in a normal direction of a substrate. When at least apart of a second insulating film just below the pixel electrode is removed to form a concave portion, a storage capacitance is formed. In areas where a top layer pixel electrode intersect with a bottom layer common signal wiring lines, molecular axes of LC molecules in an LC layer rotate in a desired rotational direction by a fringe electric field. In the areas, a strong electric field for forward rotation occurs. Even when source electrodes are reduced in such configuration, reverse-rotation of LC molecules is prevented. Hereinafter, an exemplary embodiment is described in detail with reference to drawings.

[Exemplary Embodiment 1]

Figure 1A:
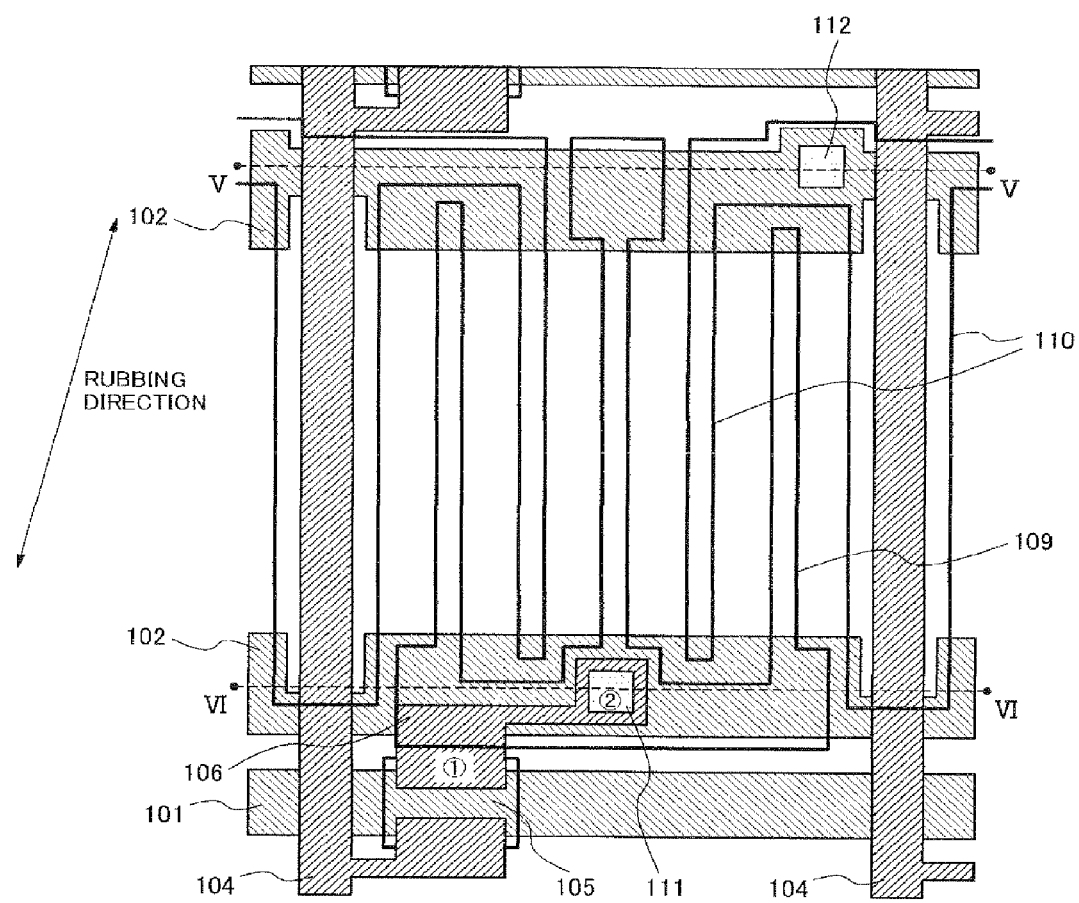
FIG. 1A is a plan view showing the composition of one pixel of an LCD device according to a first exemplary embodiment.
Figure 1B:
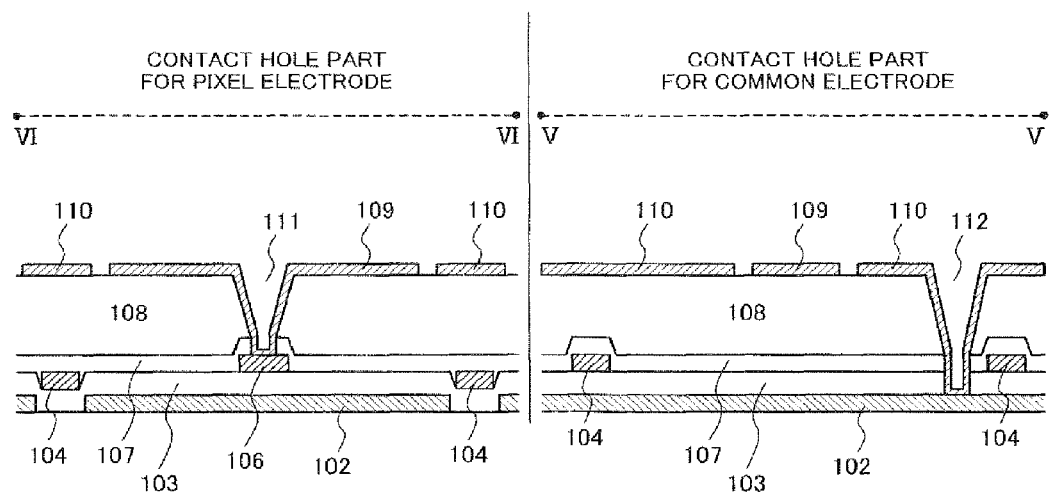
FIG. 1B is a cross sectional view showing a specified partial configuration in FIG. 1A of the LCD device according to the first exemplary embodiment.

A first exemplary embodiment is described by referring to FIGS. 1A and 1B. FIG. 1A is a plan view showing a pixel configuration of an LCD device. FIG. 1B is a cross sectional view along an IV-IV line and a V-V line in FIG. 1A.

As shown in FIGS. 1A and 1B, a TFT substrate of the LCD device includes a plurality of scan signal wiring lines 101 that are first metal layers and two common signal wiring lines 102 therealong. A first insulating film 103 is formed on the plurality of scan signal wiring lines 101 and common signal wiring lines 102. A plurality of video signal wiring lines 104 that are second metal layers, a TFT 105 and source electrodes 106 are formed on the first insulating film 103. Here, the source electrodes 106 include a first portion (1) connected with the TFT 105 and a second portion (2) connected with pixel electrodes 109. The second portion (2) is arranged in the approximate center of the video signal wiring lines 104 on both sides of a plurality of pixels. The source electrodes 106 include the first and the second part, but a shape thereof is not limited to a configuration in the drawing.

A second insulating film 107 is formed on the plurality of video signal wiring lines 104, the TFT 105 and the source electrodes 106. A third transparent insulating film 108 is formed on the second insulating film 107. The pixel electrode 109 and the common electrodes 110 which are transparent electrodes are formed on the third insulating film 108. The plurality of video signal wiring lines 104 are completely covered by the common electrodes 110 in a direction of the wiring line width via the second insulating film 107 and the third insulating film 108. The source electrodes 106 located in a layer which the plurality of video signal wiring lines 104 are arranged are formed only under the pixel as shown in FIG. 1A. In the upper side of the pixel, a width of the pixel electrode 109 in the top layer increases. In areas where the plurality of common signal wiring lines 102 overlap the pixel electrode 109, a storage capacitance is formed.

The pixel electrode 109 and the common electrodes 110 are electrically connected to the second portion 2 of the source electrodes 106, and the plurality of common signal wiring lines 102 via contact holes 111 and 112, respectively.

The first exemplary embodiment removes the source electrodes which are formed in an upper side of the pixel and formed in the layer which the plurality of video signal wiring lines are arranged compared with the related art. Accordingly, a contact hole for electrically connecting the pixel electrode and the source electrodes which are formed in a lower layer of the plurality of pixels is not needed. A short circuit decreases substantially.

The second portion of the source electrodes and the plurality of video signal wiring lines exist in the same layer. When the second portion of the source electrodes is arranged in the approximate center between the video signal wiring lines located on both sides of the pixel, a short circuit between the second portion thereof and the signal wiring lines can be reduced to the minimum. As a result, an LCD device with high yield can be realized.

More than half of a storage capacitance is formed at a part where the pixel electrode overlaps the plurality of common signal wiring lines. Thereby, an enough storage capacitance is also formed even when areas of the source electrodes are reduced. Thus the excellent image quality is obtained.

[Exemplary Embodiment 2]

Figure 2A:
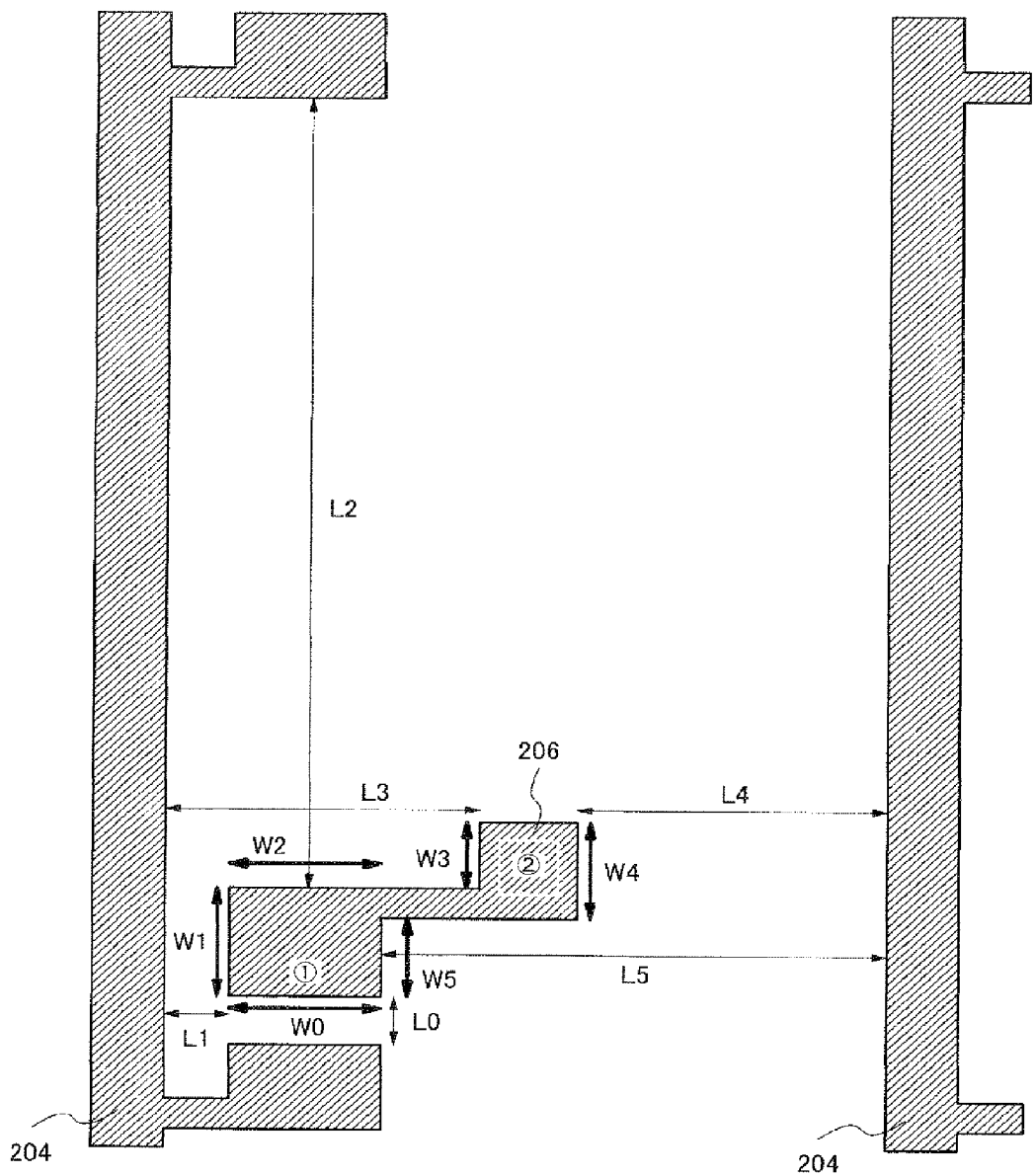
FIG. 2A is a plan view showing a configuration of a second metal layer of an LCD device according to a second exemplary embodiment.
Figure 2B:
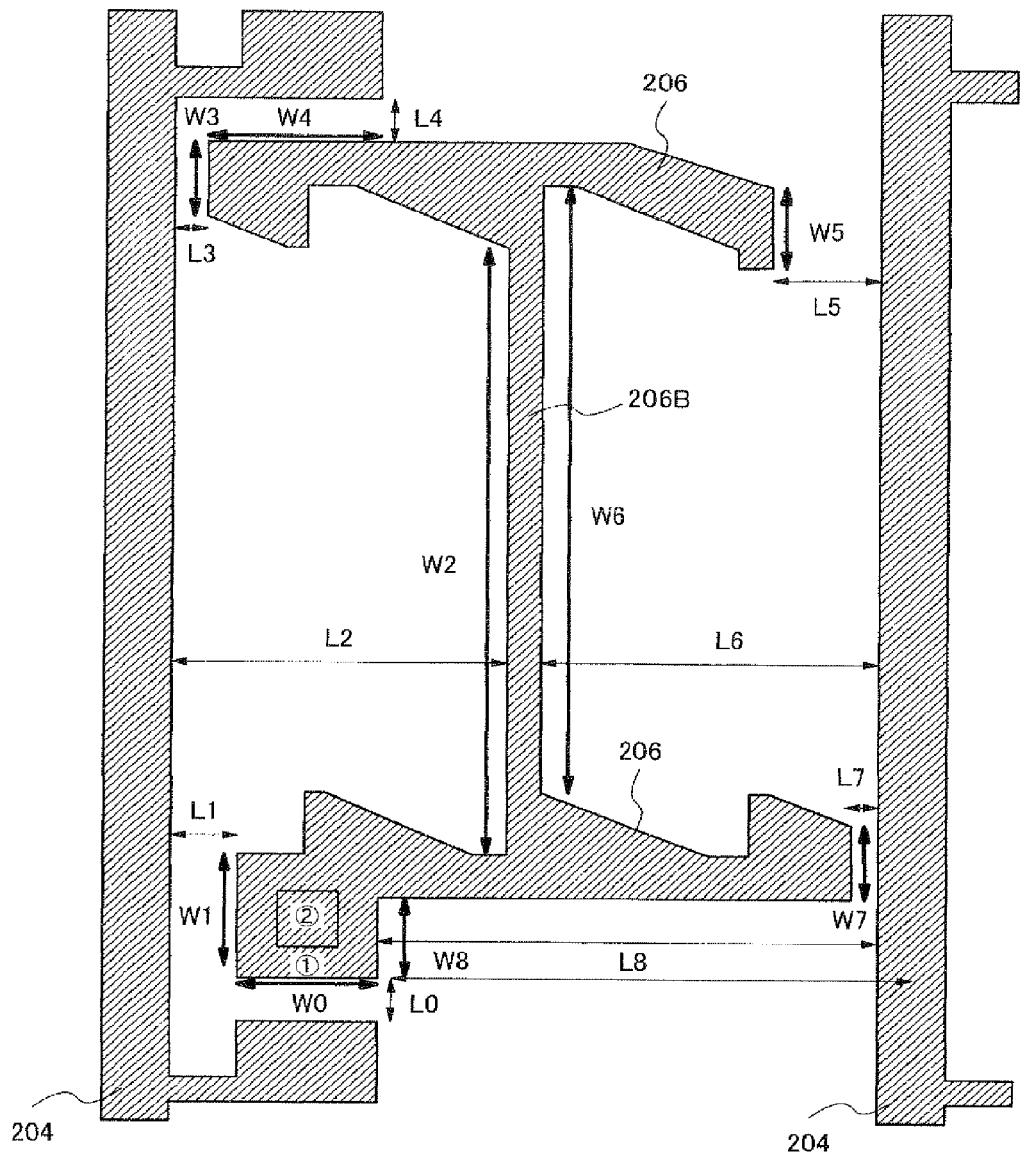
FIG. 2B is a plan view showing the configuration of the second metal layer of a conventional LCD device.

Next, a second exemplary embodiment is described by referring to FIGS. 2A and 2B. FIG. 2A is a plan view showing a structure of a second metal layer of an LCD device. FIG. 2B is a plan view showing a structure of a second metal layer of an LCD device according to a related art.

The second exemplary embodiment defines areas of source electrodes, each width of areas of the source electrodes, and distances between the areas and opposing video signal wiring lines.

As shown in FIG. 2A, regarding each of areas of source electrodes 206, edges of which face at least parts of a plurality of video signal wiring lines 204, Wi represents a width of the area and Li represents distances of the areas and the plurality of video signal wiring lines 204. A summation value ($\Sigma$Wi/Li) of Wi/Li in a pixel serves as a good parameter which shows frequency of a short circuit in the same layer. The small value of $\Sigma$Wi/Li means desirable condition. When the value of $\Sigma$Wi/Li is within two times of the value (W0/L0) which is obtained when a channel width W0 of a TFT is divided by a channel distance L0 thereof, the frequency of the short circuit between the source electrodes and the plurality of video signal wiring lines becomes enough small. Under such condition, high yield is obtained.

In a display device of a related art, three or four leak bright points in a panel detected. In the exemplary embodiment, no leak bright point is detected.

In another viewpoint, it is desirable for the area of source electrodes 206 to be small. When the total area of the source electrodes is 4 times or less than 4 times of sum of both areas of a first part and a second part in the source electrodes, the frequency of the short circuit between the source electrodes and the plurality of video signal wiring lines becomes enough small. Thus, display device with high yield is obtained. When the total area thereof is 4 times or less than 4 times of the sum of both areas of the first part and the second part, one or zero leak bright point occurs. When the total area thereof is 3 times or less than 3 times of the sum of both areas of the first part and the second part, no leak bright point occurs.

Next, the second exemplary embodiment is described in detail. In the configuration of the exemplary embodiment as shown in FIG. 2A, since areas of the source electrodes 206 are small, parameter $\Sigma$Wi/Li, i.e., the value of (W1/L1+ . . . +W5/L5), is also small. The total area of the source electrodes is about 2.5 times of the sum of both areas of the first part and the second part. The value of parameter $\Sigma$Wi/Li is about 2.5 and is nearly equal to the value of W0/L0. Under the condition, a leak bright point does not occur.

On the other hand, in a configuration of the related art as shown in FIG. 2B, the area of source electrodes 206 is large. Areas where Wi is large and areas where Li is small exist a lot.

The parameter $\Sigma Wi/Li$, i.e., the value of $(W1/L1+ \ldots +W8/L8)$, is large. The total area of the source electrodes is about 9 times of the sum of both areas of the first part and the second part. The parameter $\Sigma Wi/Li$ is about 20 and is about 8 times of the value of $W0/L0$. Under such condition, four or three leak bright points occur.

Thus, according to the second exemplary embodiment, a pixel structure which substantially reduces a short circuit is given.

[Exemplary Embodiment 3]

Figure 3A:
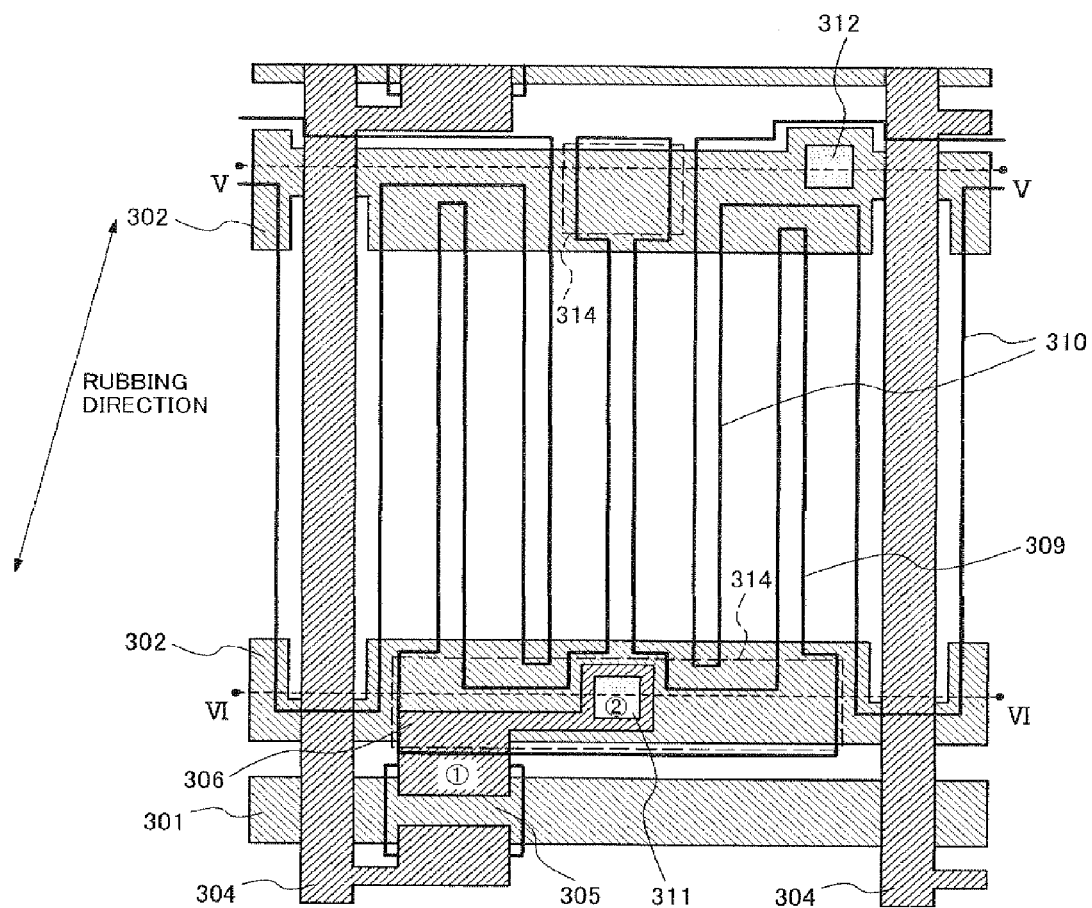
FIG. 3A is a plan view showing a configuration of one pixel of an LCD device according to third and fourth exemplary embodiments.
Figure 3B:
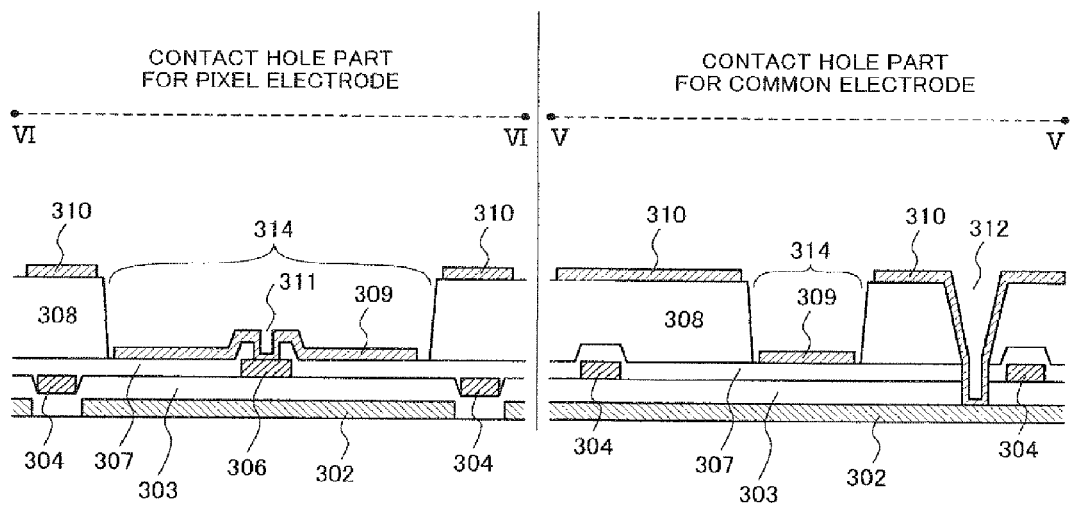
FIG. 3B is a cross sectional view showing a specified partial configuration in FIG. 3A of the LCD device according to the third and fourth exemplary embodiments.

Next, a third exemplary embodiment is described by referring to FIGS. 3A and 3B. FIG. 3A is a plan view showing one pixel configuration of an LCD device and FIG. 3B is a sectional view along a $\Sigma$-$\Sigma$ line and a $\Sigma$-$\Sigma$ line in FIG. 3A. Unlike the first exemplary embodiment, in a region where a storage capacitance is formed, a part of a third insulating layer which is located just below pixel electrodes is removed by predetermined thickness.

The third exemplary embodiment is described in detail. A storage capacitance is formed between a plurality of common signal wiring lines in a bottom layer and pixel electrodes in a top layer in the first exemplary embodiment. However, since three insulating layers are arranged between the plurality of common signal wiring lines and the pixel electrode in the first exemplary embodiment, thickness of the insulating layers for the storage capacitance is large. Therefore, the capacity of a storage capacitance is small. According to the exemplary embodiment, in the region where the storage capacitance is formed, the third insulating layer 308 which is located just below pixel electrodes 309 is removed to form a concave portion 314. Since the thickness of the insulating layer in capacitance forming areas becomes thin, a storage capacitance with a larger capacity is formed.

Further, a silicon nitride film is formed by CVD (chemical vapor deposition) method as a first insulating film 303 and the second insulating film 307, for example. After that, a photosensitive organic film made of an acrylic resin is applied as the third insulating film. Next, the concave portion 314 is formed by selectively removing the third insulating layer 308 by exposure and development. An acrylic resin has a low dielectric constant. Even if common electrodes are formed on a plurality of video signal wiring lines 304 via the insulating layers, a capacitance value of the storage capacitance between the plurality of video signal wiring lines and common electrodes is small. The storage capacitance does not influence driving of a plurality of pixels.

The third insulating film 308 is formed by CVD method, and the concave portion 314 may be formed by an etching. The third insulating film 308 which is located just below the pixel electrode 309 may be removed completely. The third insulating film 308 may be left thin.

An insulating film arranged on the plurality of video signal wiring lines 304 may include only the second insulating film 307 formed by one layer, and in storage capacitance forming areas, a part of the second insulating film may be removed.

In a case that an insulating layer arranged on the plurality of video signal wiring lines 304 includes three or more layers, one or more layers of the laminated insulating layers may be removed in the storage capacitance forming areas.

Thus, according to the third exemplary embodiment, frequency of a short circuit can be substantially decreased while forming a storage capacitance.

[Exemplary Embodiment 4]

Next, a fourth exemplary embodiment is described by referring to FIGS. 3A and 3B. A distance from edges of the concave portion to display areas is defined in the exemplary embodiment. The concave portion is formed by removing the third insulating layer which is located just below the pixel electrode. The display areas are regions between pairs of common signal wiring lines 302.

The fourth exemplary embodiment is described in detail. When edges of the concave portion 314 formed by removing the third insulating film 308 are close to display areas, light leak due to a step occurs. Such light leak causes increase of black-level luminance. The distance from the edges of the concave portion 314 formed by removing the third insulating film 308 to the display areas is defined in the exemplary embodiment. Light leakage may be well suppressed, when the distance becomes large. If the distance is not less than 2 m, the light leakage due to the step is intercepted with common signal wiring lines 302, and black-level luminance does not increase.

Thus, according to the fourth exemplary embodiment, while frequency of the short circuit decreases substantially, a storage capacitance equivalent to that of the related art is formed. Because a black-level luminance does not increase, a contrast of a display screen improves.

[Exemplary Embodiment 5]

Figure 4:
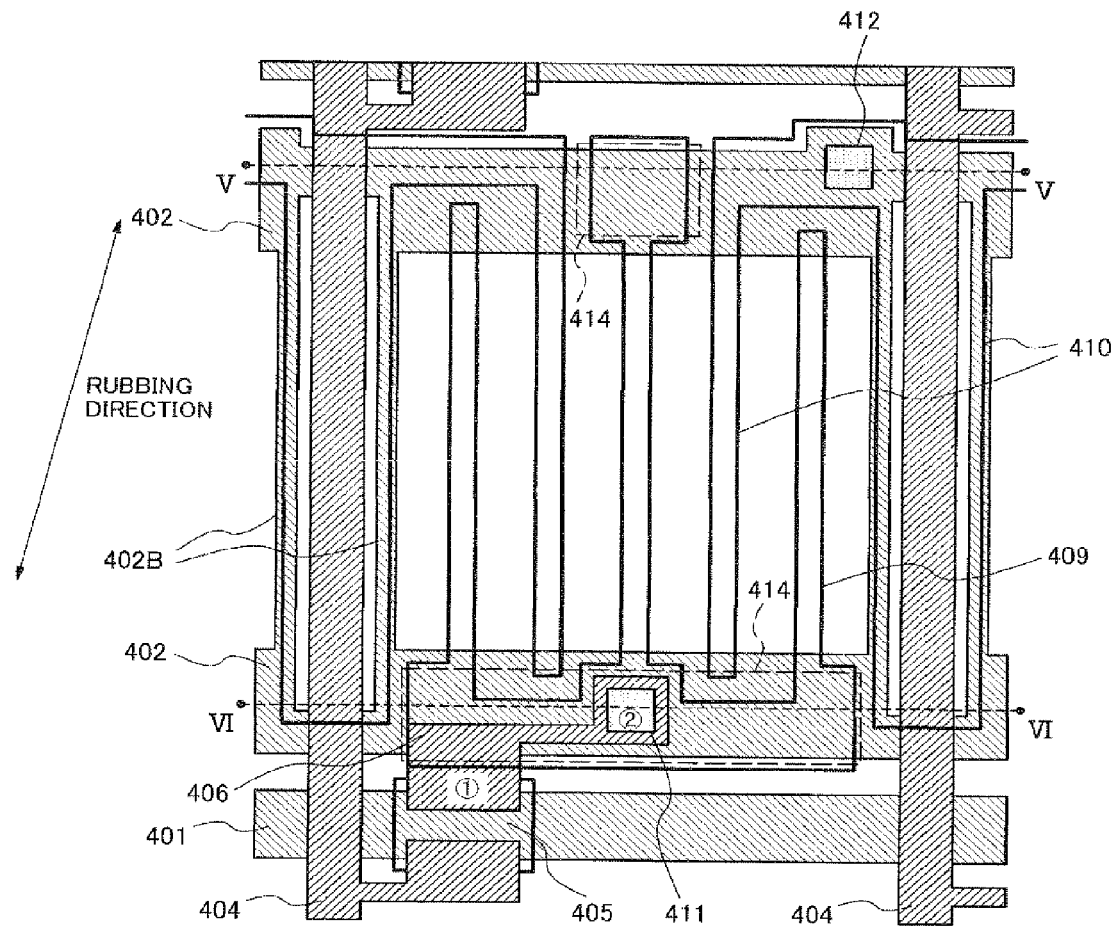
FIG. 4 is a plan view showing a configuration of one pixel of an LCD device according to a fifth exemplary embodiment.

Next, a fifth exemplary embodiment is described by referring to FIG. 4. Two common signal wiring lines arranged in an upper part and a lower part of a pixel which respectively correspond to a first storage capacity forming section and a second storage capacity forming section are electrically connected by a connecting part arranged along a plurality of video signal wiring lines.

Since the two common signal wiring lines 402 of an upper part and a lower part of the pixel are electrically connected by a connection part 402B, delay of a common signal is decreased and the distribution of luminance or a flicker level within a surface becomes uniform. The configuration contributes to a display with high definition. Therefore, when an device becomes large and high definition is highly required, the configuration becomes effective. In the exemplary embodiment, the connection part 402B is arranged along with a side of a plurality of video signal wiring lines, the leaked electric field from the plurality of video signal wiring lines to display areas is suppressed strongly, and vertical cross talk is suppressed.

Thus, according to the fifth exemplary embodiment, because frequency of the short circuit decreases substantially and delay of the common signal is decreased, improvement of image quality as well as higher yield are obtained.

[Exemplary Embodiment 6]

Figure 5:
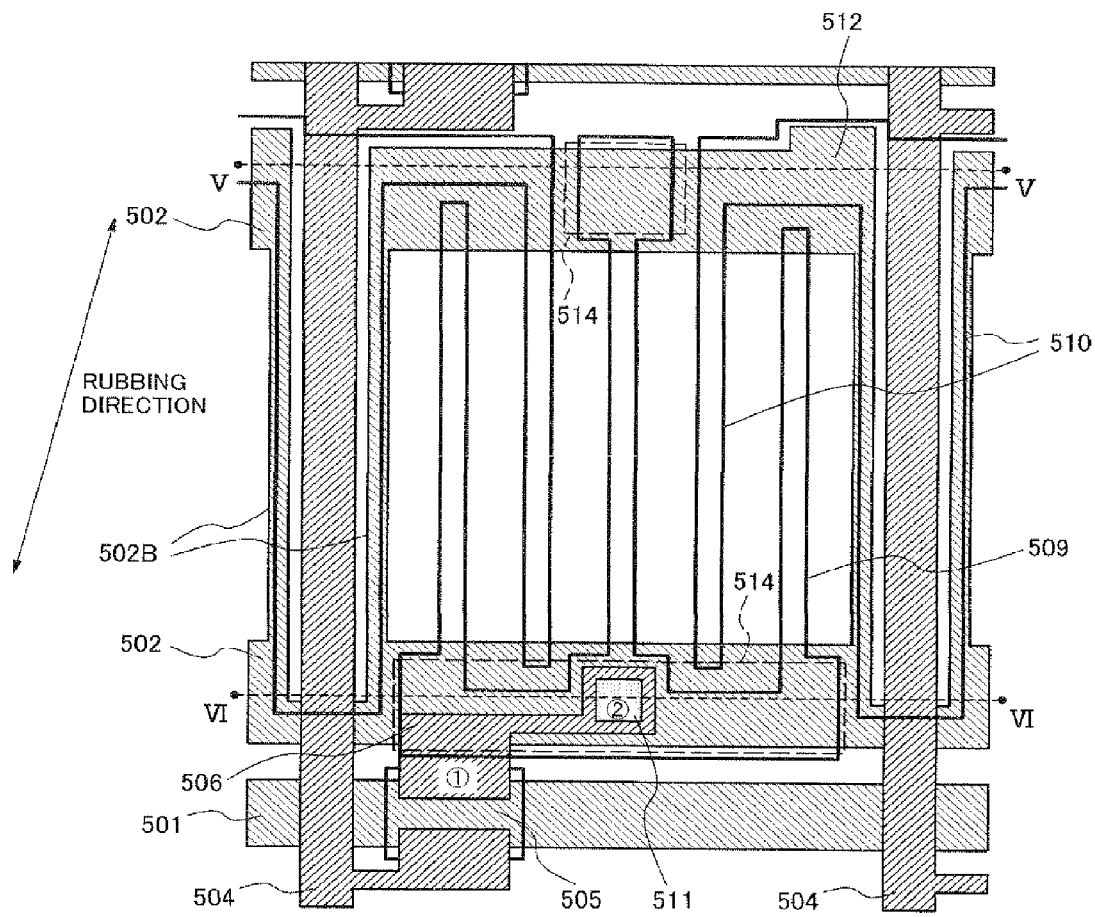
FIG. 5 is a plan view showing a pixel of configuration of an LCD device according to a sixth exemplary embodiment.

Next, a sixth exemplary embodiment is described by referring to FIG. 5. Upper common signal wiring lines which are in a second storage capacitance forming section is not connected to other line or other electrode, in a transverse direction, in areas where a plurality of video signal wiring lines intersect therewith.

The upper common signal wiring lines electrically connect with the lower common signal wiring lines via a connection part 502B. A crossing capacity between the plurality of video signal wiring lines and the plurality of common signal wiring lines become approximately half.

[Exemplary Embodiment 7]

Figure 6A:
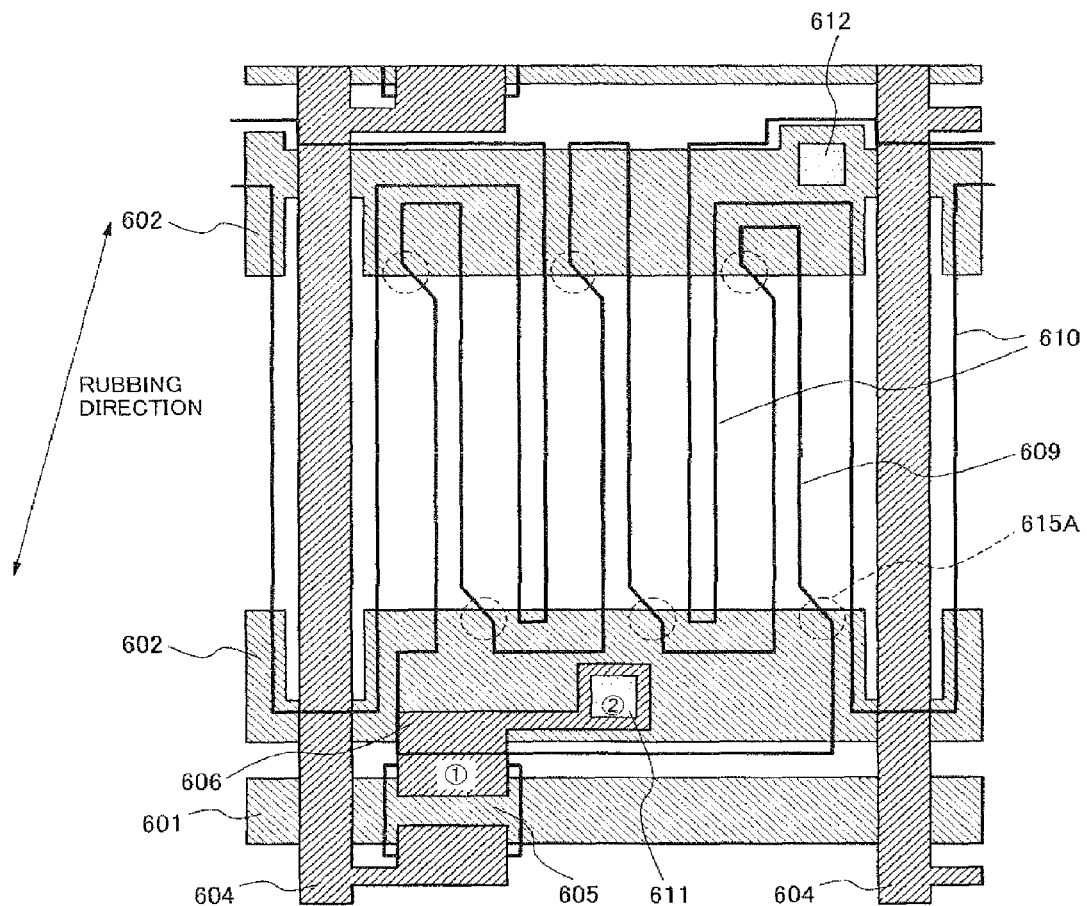
FIGS. 6A and 6B are plan views showing a pixel of configuration of an LCD device according to a seventh exemplary embodiment.
Figure 6B:
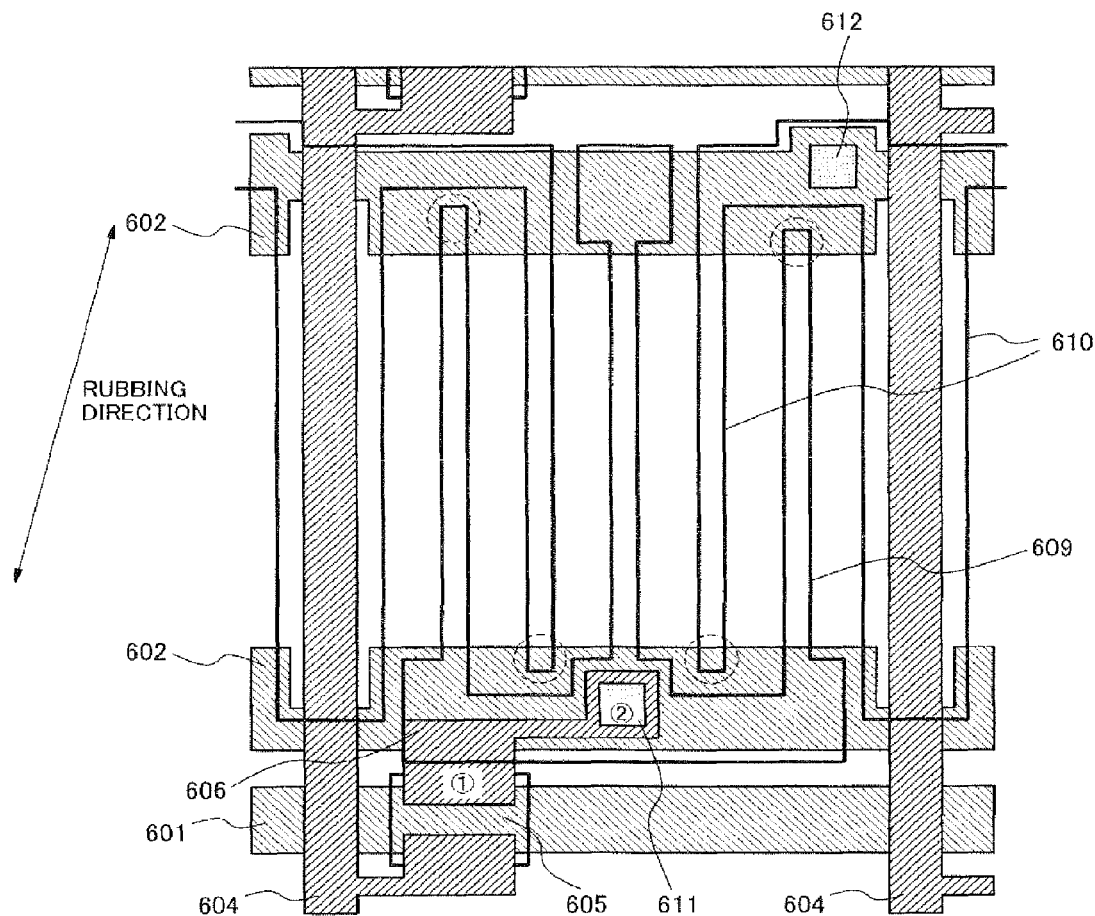
Figure 7A:
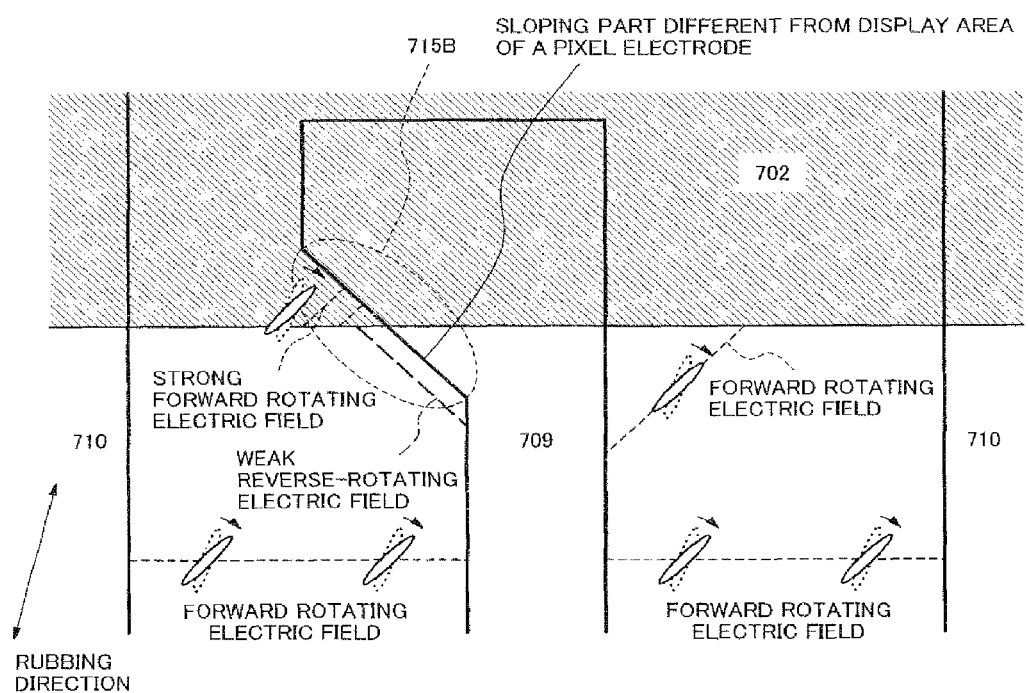
FIGS. 7A and 7B are diagram illustrating a structure that prevents a first reverse-rotation preventing structure in an LCD device according to the seventh exemplary embodiment.
Figure 7B:
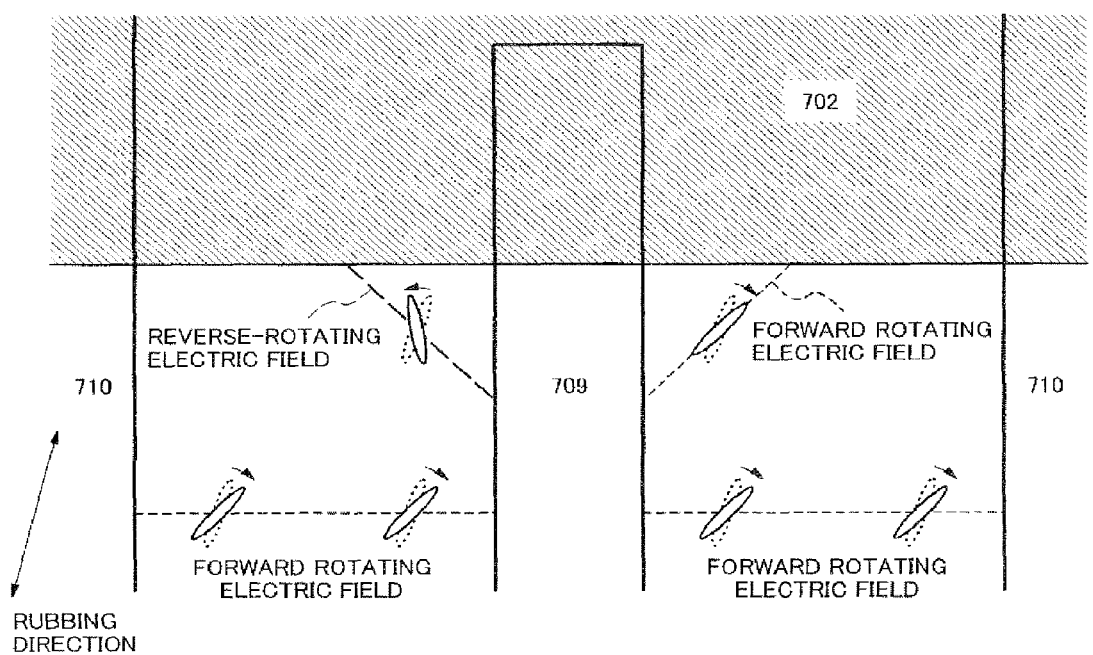

Next, a seventh exemplary embodiment is described by referring to FIGS. 6A and 7B. FIG. 6A is a plan view showing a configuration of one pixel of an LCD device according to the exemplary embodiment. FIG. 6B is a plan view showing one pixel configuration which is not provided with a reverse-rotation preventing structure. FIG. 7A shows an operation of LC molecules in a configuration provided with a reverse-rotation preventing structure of the exemplary embodiment.

FIG. 7B shows an operation of LC molecules in a configuration which is not provided with the reverse-rotation preventing structure.

Figure 35A:
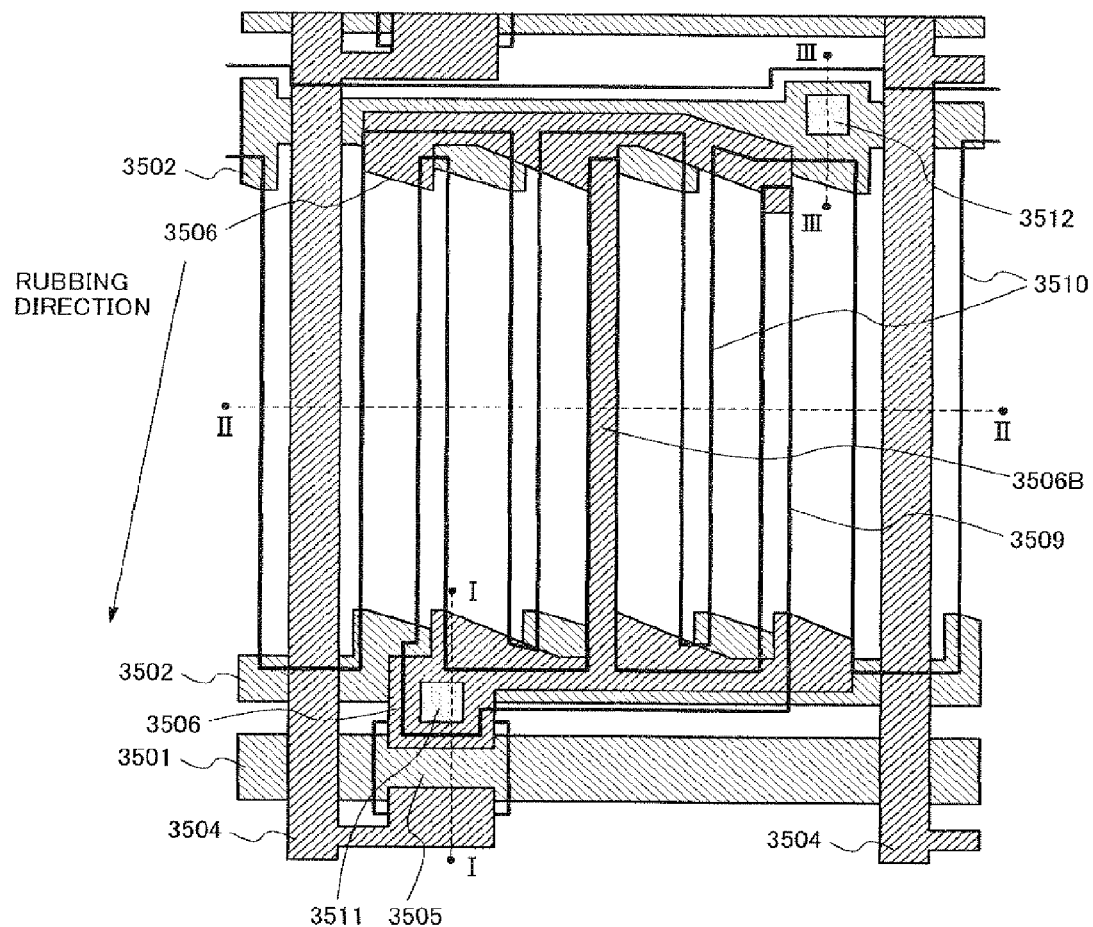
FIG. 35A is a plan view showing a pixel of configuration of an LCD device on a related art.
Figure 35B:
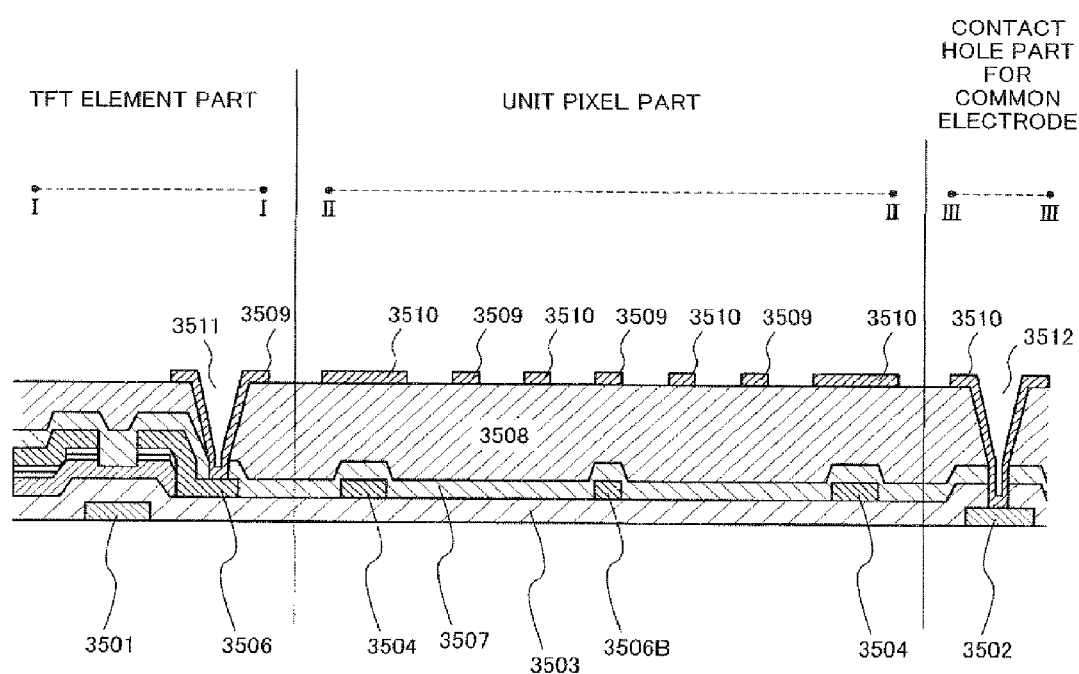
FIG. 35B is across sectional view which shows a specified partial configuration in FIG. 35A of an LCD device on the related art.
Figure 36A:
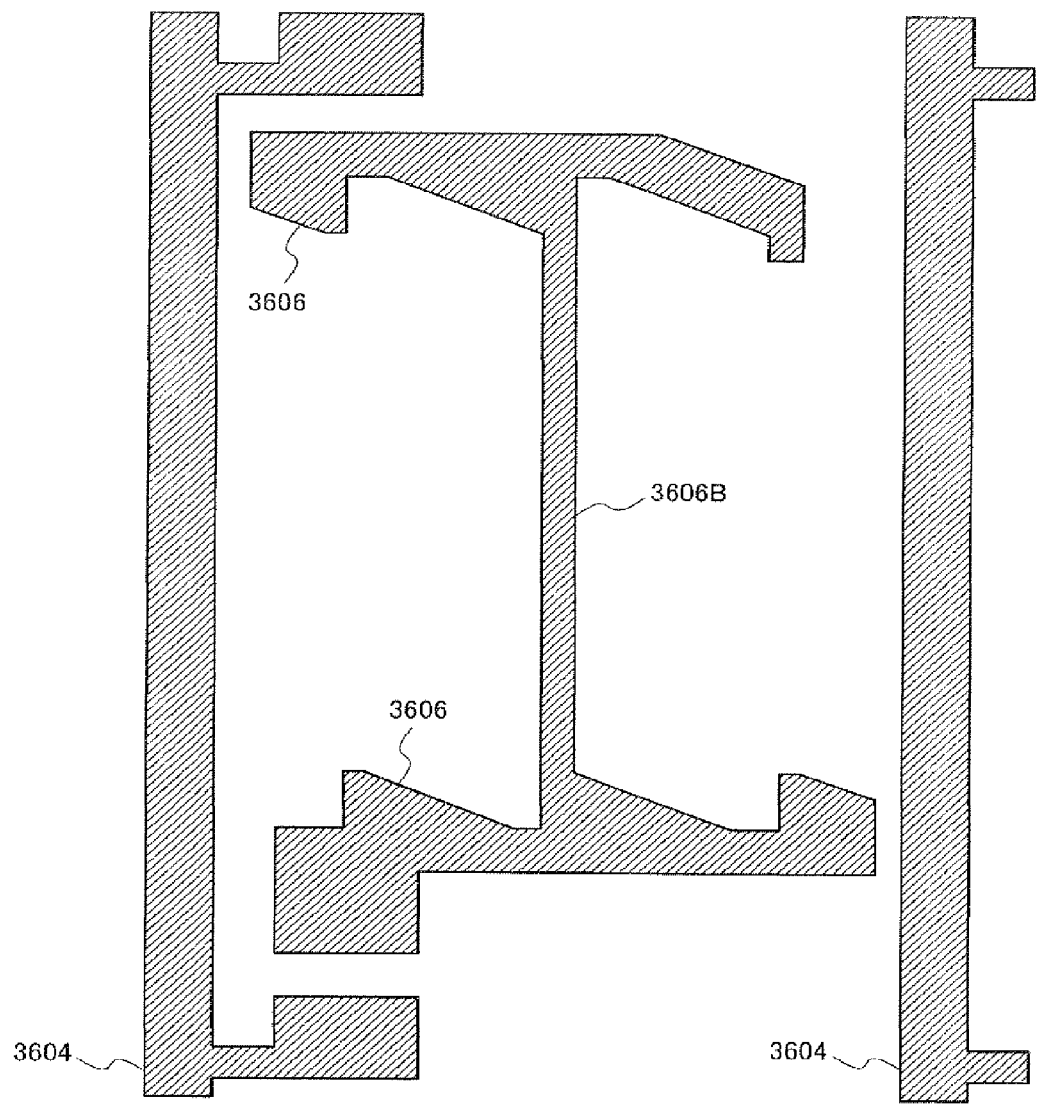
FIG. 36A is a plan view showing a configuration of a second metal layer of an LCD device on the related art.
Figure 36B:
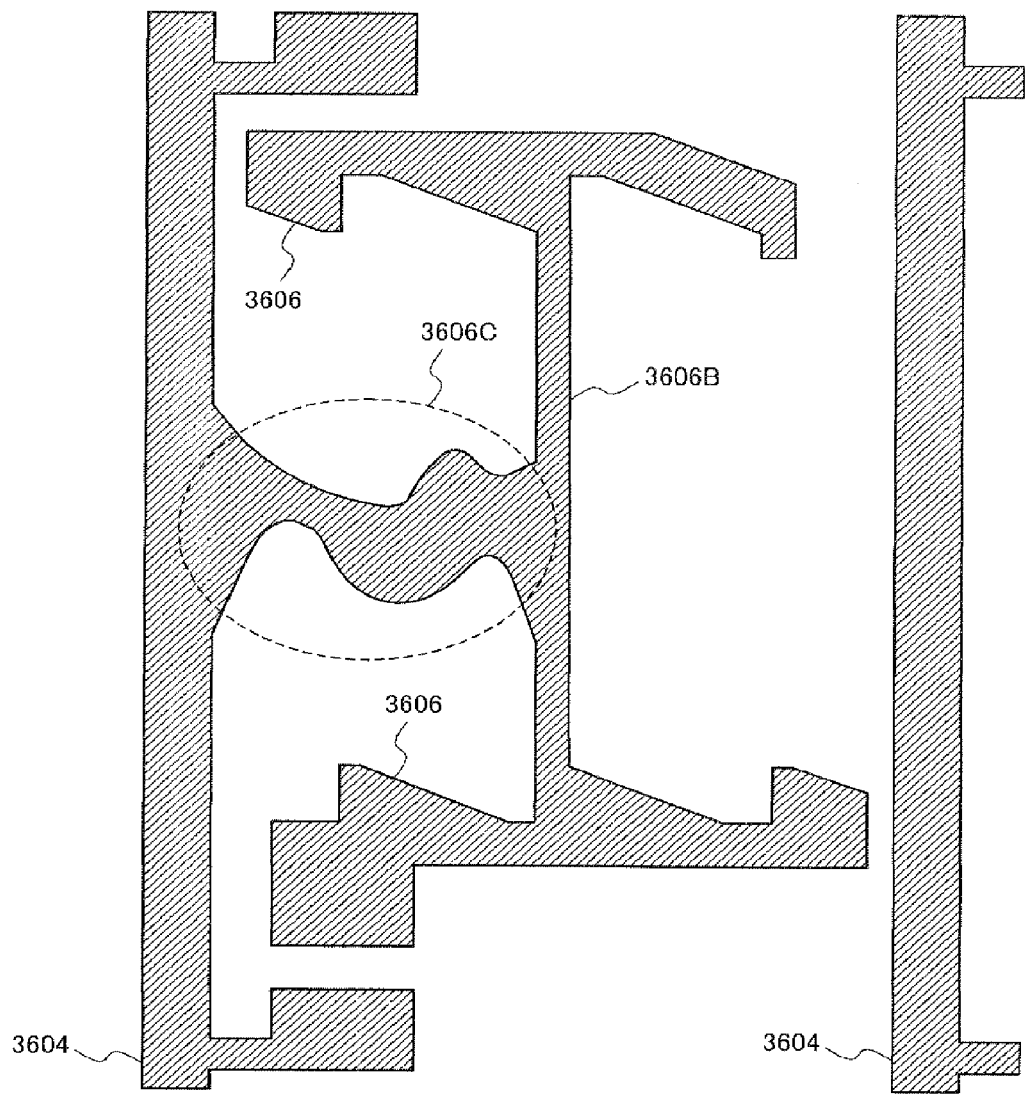
FIG. 36B is a figure illustrating an example in which the layer short circuit of a plurality of video signal wiring lines and pixel auxiliary wiring lines has occurred in the second metal layer of an LCD device on the related art.
Figure 37A:
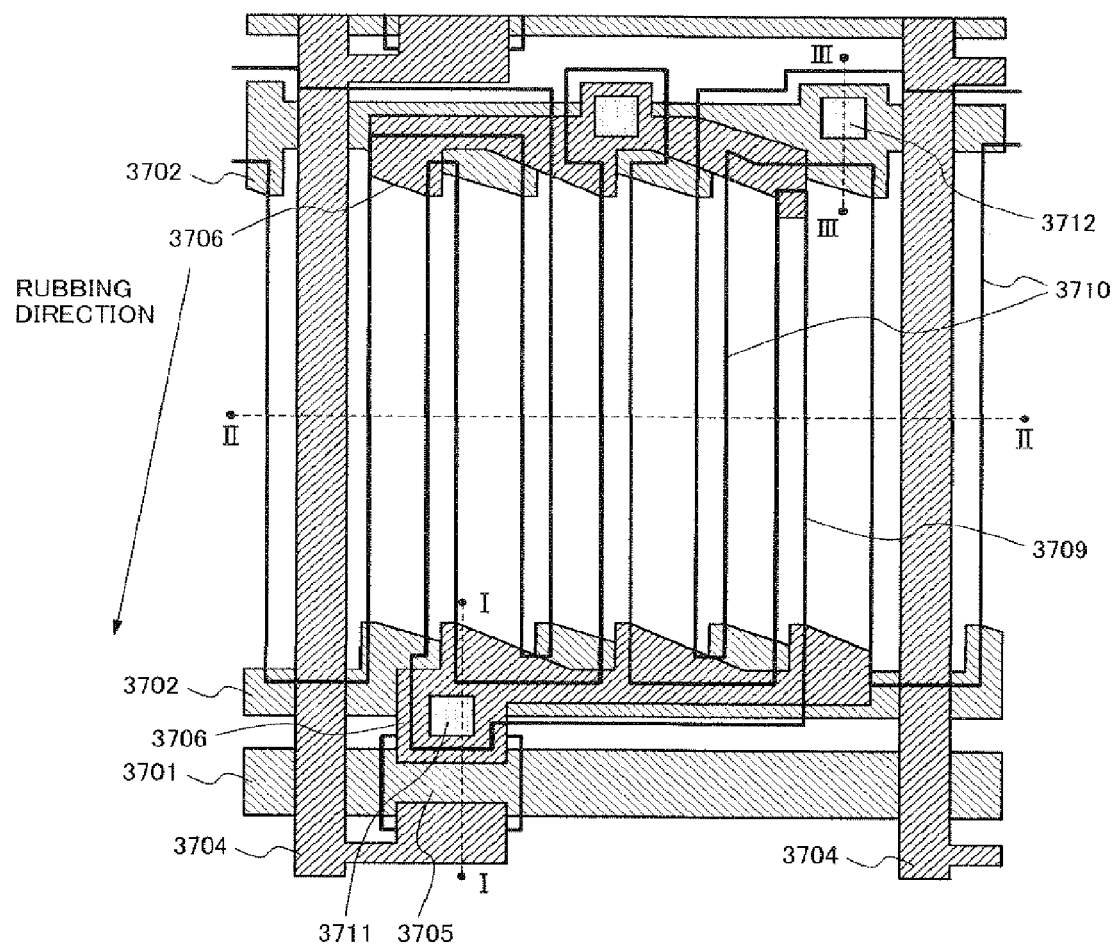
FIG. 37A is a plan view showing a pixel of configuration of an LCD device on another related art.
Figure 37B:
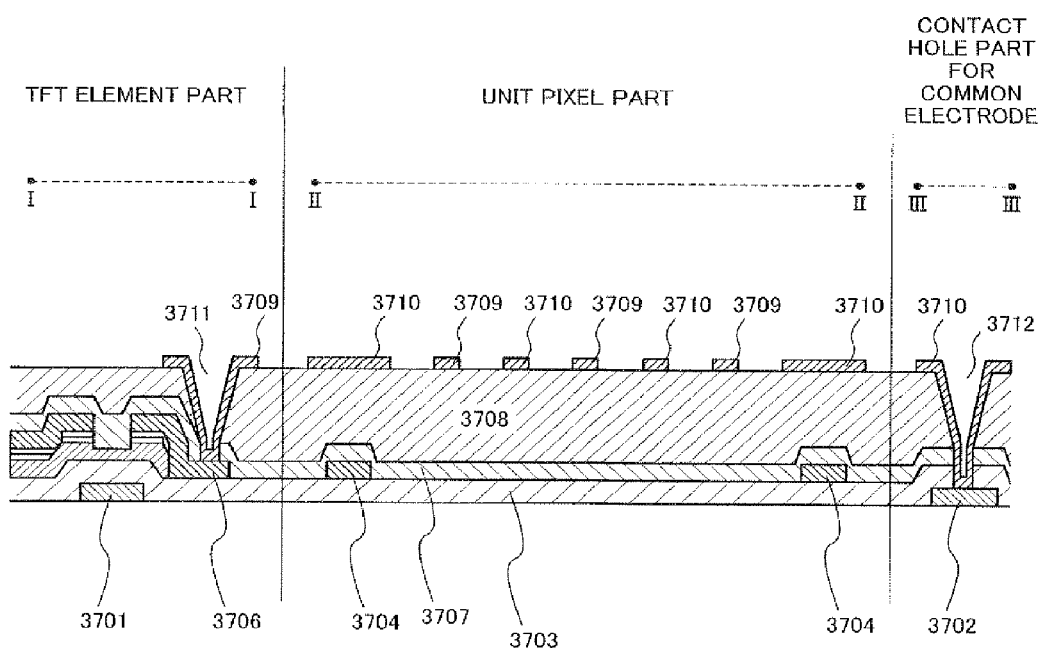
FIG. 37B is a cross sectional view showing a specified partial configuration in FIG. 37A of an LCD device on the related art.
Figure 38A:
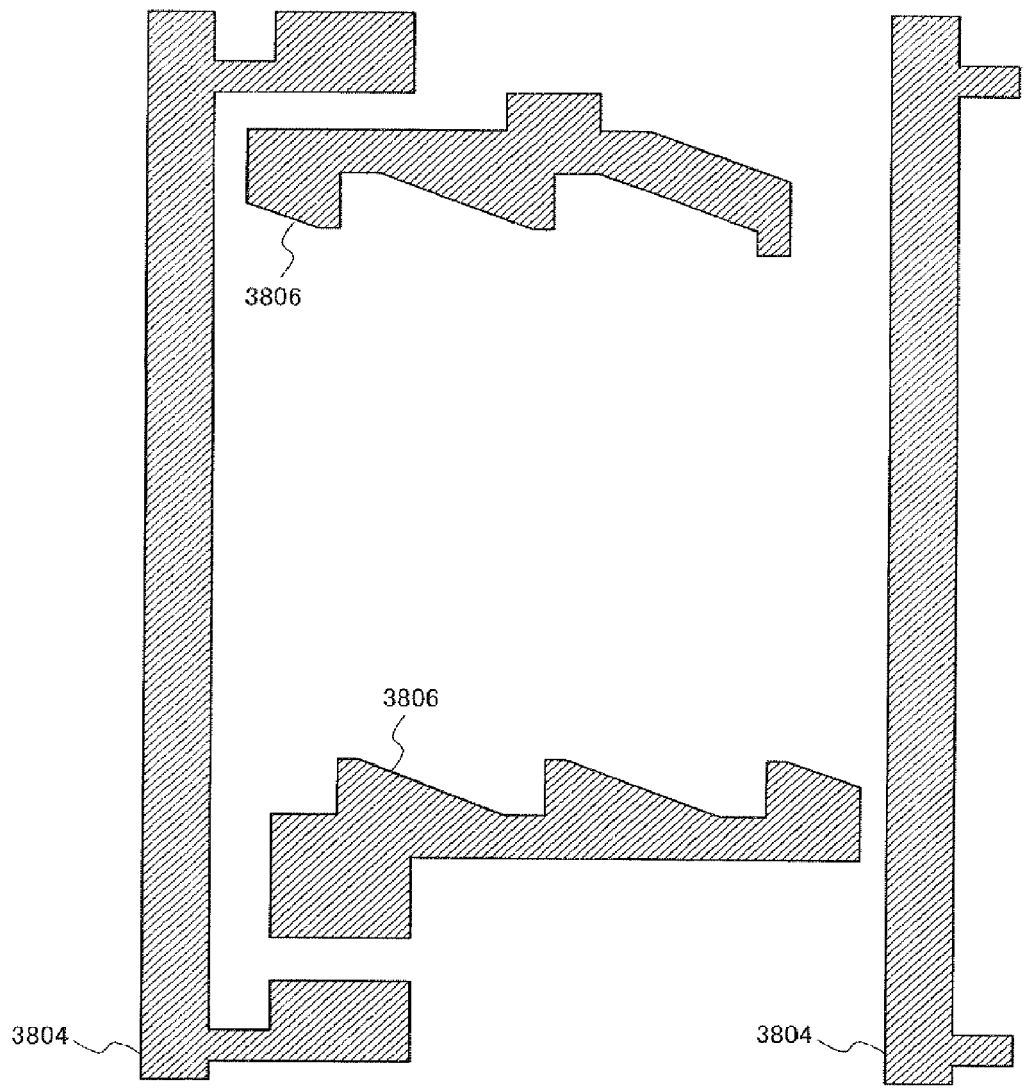
FIG. 38A is a plan view showing a configuration of a second metal layer of an LCD device on the related art.
Figure 38B:
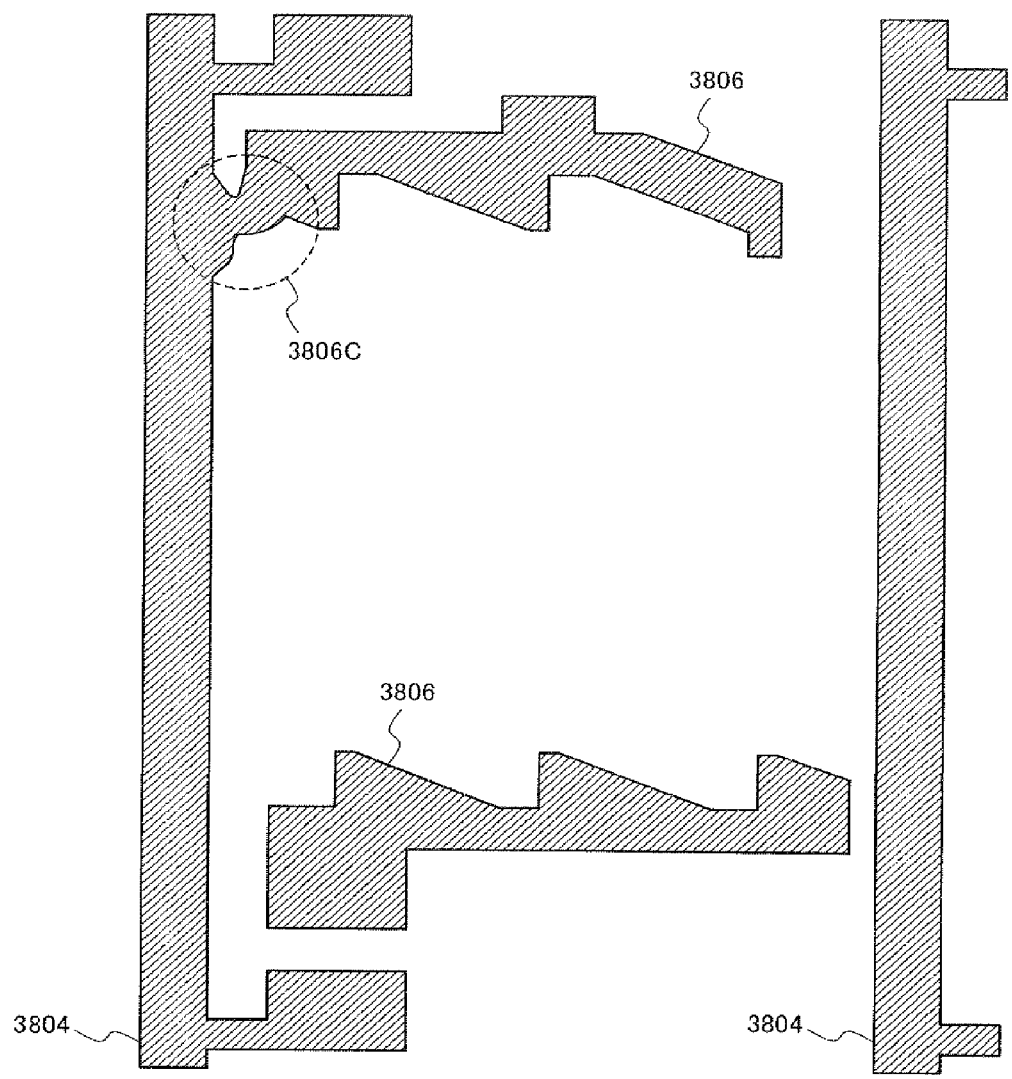
FIG. 38B is a diagram illustrating an example of short-circuit between a plurality of video signal wiring lines and source electrodes which have occurred at the same layer in the second metal layer of an LCD device of the related art.

In a display device of the related art as shown in FIGS. 35A and 37A, both of a plurality of common signal wiring lines and source electrodes are patterned like a saw shape and laminated. Such configuration suppresses an electric field which induces reverse-rotation of LC molecules. Reverse-rotation is described below briefly. When an electric field is not applied to LC molecules, the LC molecules are oriented homogeneously in a rubbing direction as shown in the drawings. When electric potential difference is given between pixel electrodes and common electrodes, an electric field is applied in a transverse direction in FIG. 35A. In such situation, based on a relation between an electric field and an initial oriented direction of LC molecules, the LC molecules deform so as to correspond to a direction of the electric field. In an example as shown in the drawing, such movement is a clockwise rotation. The rotation of the direction is defined as a forward rotation. A rotation of LC molecules in a rotational direction opposite to the forward rotation is defined as a reverse-rotation. In FIG. 35A, edges of pixel electrodes and common electrodes are formed into a saw shape. Thereby, in an electrode edge portion, an electric field is formed in a direction which LC molecules perform the forward rotation from an initial alignment of LC molecules. Accordingly, the good oriented state of LC molecules is maintained in an electrode edge portion. In contrast, in FIG. 1A shown, because areas of source electrodes are small, the same structure as FIG. 35A is not formed. For example, in FIG. 1A, an electric field is formed in a direction from a diagonal left to a diagonally right in an upper left side of pixel electrodes. LC molecules rotate counterclockwise at the areas. A domain in which LC molecules reverse-rotate is formed in the areas, and disclination occurs. The disclination reduces a contrast and white luminance. Thus, areas where an electric field which induces the reverse-rotation occurs are defined as a part which is not in accord with a desired rotational direction of LC molecular axes in a LC layer. On the other hand, in FIG. 1A, in an upper right side of the pixel electrode, a direction of an electric field is from a diagonal right to a diagonal below. A clockwise rotation is induced in LC molecules in the part. The part is defined as the part which is in accord with a desired rotational direction of LC molecular axes of a liquid crystal layer. In the exemplary embodiment, a measure which prevents reverse-rotation is taken also in the configuration of the first exemplary embodiment in which reduces areas of source electrodes.

In a part (i.e. a part enclosed with the dashed line of the drawing) where a plurality of common signal wiring lines 602 of a bottom layer intersect with pixel electrodes 609 of a top layer as specifically shown in FIG. 6A, the pixel electrode 609 inclines in a direction different from a direction thereof in display areas which are regions between a pair of common signal wiring lines 602. In a region on the plurality of common signal wiring lines 602, a reverse-rotation preventing structure 615A is formed such that a rotation of LC molecular axes in a LC layer according to a fringe electric field generated near edges of the pixel electrode 609 becomes a forward rotation. According to a rubbing direction, a inclining direction of the reverse-rotation preventing structure 615A becomes reverse with each other on both sides of a plurality of pixels in FIG. 6A (i.e. left and right sides in FIG. 6A).

Such a reverse-rotation preventing structure is described by referring to FIGS. 7A and 7B. In FIG. 7B, areas where an electric field which makes a reverse rotation of LC molecules occurs are located at edges of display areas. On the other hand, in FIG. 7A, a reverse rotation preventing structure 715B is arranged in areas where an electric field for reverse rotation of LC molecules occurs. The reverse rotation preventing structure 715B includes a configuration in which edges of a plurality of common signal wiring lines 702 intersect with parts of pixel electrodes which incline in a direction different from a direction thereof in display areas. In a region on the plurality of common signal wiring lines 702, a fringe electric field for a forward rotation occurs. And an influence of a reverse-rotating electric field is inhibited. Thereby, in whole display areas, LC molecules rotate in a forward direction. Hereafter, the reverse-rotation preventing structure shown in FIG. 7A is called a first reverse-rotation prevention structure.

Thus, according to the seventh exemplary embodiment, frequency of a short circuit decreases substantially, reverse-rotation of LC molecules is prevented in whole display areas, and efficiency for light utilization increases.

[Exemplary Embodiment 8]

Figure 8:
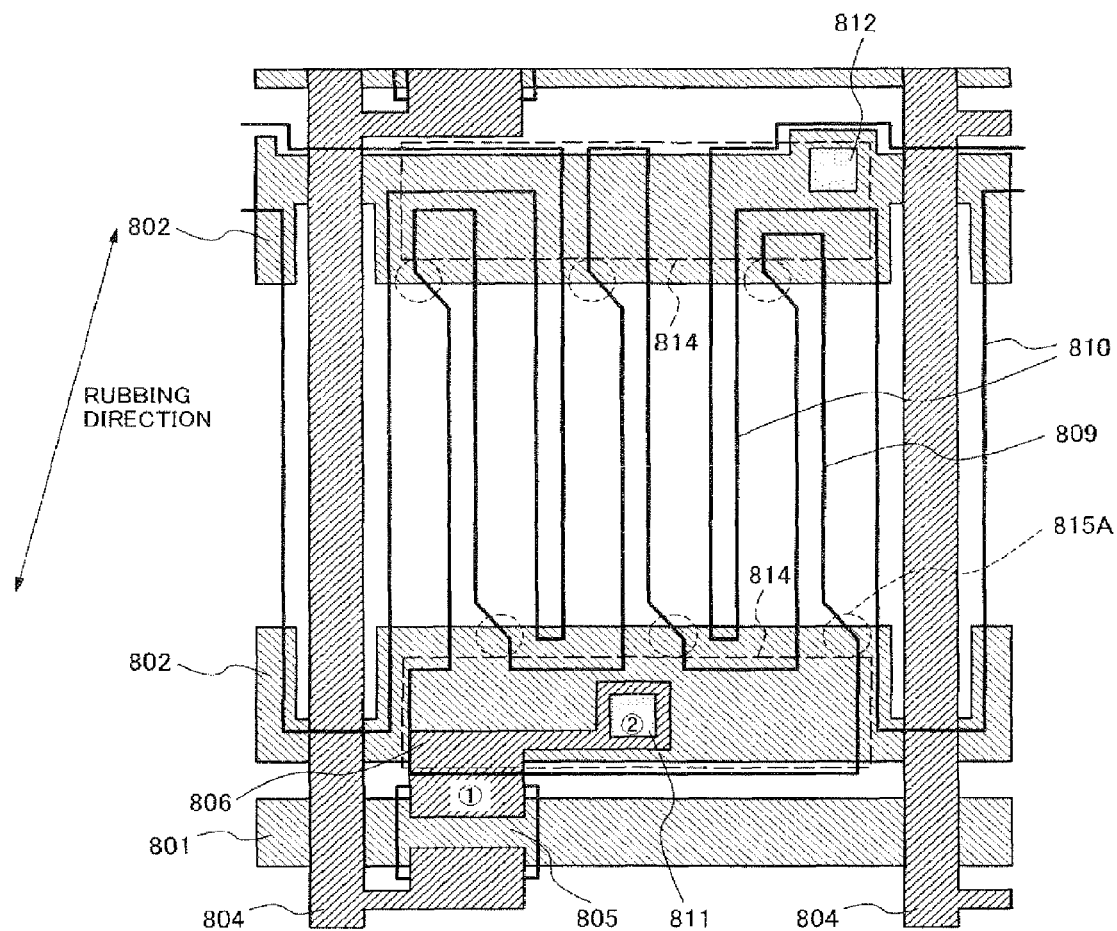
FIG. 8 is a plan view showing a pixel of configuration of an LCD device according to eighth and ninth exemplary embodiments.

Next, an eighth exemplary embodiment is described by referring to FIG. 8. FIG. 8 is a plan view showing a configuration of a plurality of pixels of an LCD device. In the exemplary embodiment, a third insulating film just below pixel electrodes is removed in areas in which a storage capacitance is formed.

Specifically, the storage capacitance is formed between a plurality of common signal wiring lines in a bottom layer and pixel electrodes in a top layer. In the configuration, because three insulating films are disposed between the plurality of common signal wiring lines and the pixel electrode, film thickness is thick and accordingly, a storage capacitance is small. In the exemplary embodiment, a concave portion 814 is formed by removing a third insulating film just below the pixel electrode 809 in areas in which a storage capacitance is formed. As a result, two insulating layers are arranged in storage capacitance forming areas. Thus, a storage capacitance with larger capacity is formed in the areas.

A silicon nitride film is formed by a chemical vapor deposition (CVD) method as a first and a second insulating film, for example. A photosensitive organic film of an acrylic resin is applied as a third insulating film. And a concave portion 814 is formed by selectively removing the third insulating layer by exposure and development. The third insulating film may be formed by the CVD method, and the concave portion 314 may be formed by an etching. The third insulating film just below the pixel electrode 809 may be completely removed or may be left thin.

According to the eighth exemplary embodiment, while frequency of a short circuit decreases substantially and reverse-rotation of LC molecules is prevented in whole display areas and a larger storage capacitance can be formed.

[Exemplary Embodiment]

Next, a ninth exemplary embodiment is described by referring to FIG. 8. Further, although the configuration of a device is same as the eighth exemplary embodiment, a distance from edges of a concave portion which is formed by removing a third insulating film just below pixel electrodes to display areas is defined in the exemplary embodiment.

When edges of the concave portion 814 formed by removing a third insulating film are close to display areas, light leak due to a step occurs. The light leak causes increase of black-level luminance. In the exemplary embodiment, the distance from the edges of the concave portion 814 formed by removing the third insulating film to the display areas is defined. Light leakage is effectively suppressed, when the distance is large. If distance of not less than 2 m is kept, the light leakage due to the step is intercepted with common signal wiring lines 802. Accordingly, black-level luminance does not increase.

According to the exemplary embodiment, frequency of a short circuit decreases substantially, and reverse-rotation of LC molecules is prevented in whole display areas. Since a sufficient storage capacitance is formed and a black-level luminance does not increase, a contrast of a screen of a display device improves.

[Exemplary Embodiment 10]

Figure 9:
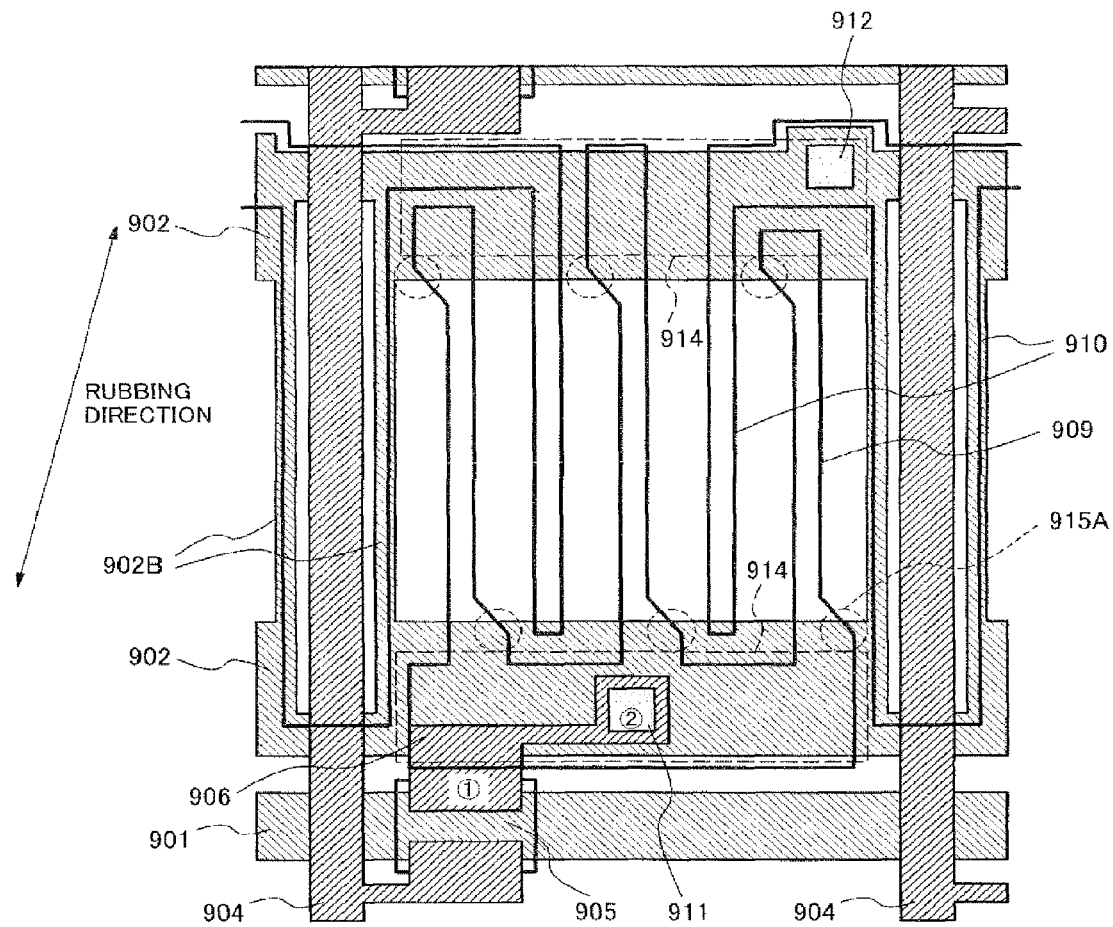
FIG. 9 is a plan view showing a pixel of configuration of an LCD device according to a tenth exemplary embodiment.

Next, a tenth exemplary embodiment is described by referring to FIG. 9. Two common signal wiring lines arranged in an upper part and a lower part of a pixel which are in a first storage capacity forming section and a second storage capacity forming section are electrically connected to each other via a connection part arranged along a plurality of video signal wiring lines.

When the two common signal wiring lines 902 of upper side and a lower side of the pixel are connected via the connection part 902B, delay of a common signal is decreased and the in-plane distribution of luminance or a flicker level becomes uniform. The configuration contributes to high definition of a display. The configuration is so effective for high definition of a display when a device is large and is high definition is required. In the exemplary embodiment, when the connection part 902B is arranged along the side of the plurality of video signal wiring lines, a leaked electric field from the plurality of video signal wiring lines to display areas is suppressed strongly, and vertical cross talk is suppressed.

According to the tenth exemplary embodiment, since frequency of a short circuit decreases substantially and, delay of a common signal is decreased, improvement of image quality and high yield are obtained.

[Exemplary Embodiment 11]

Figure 10:
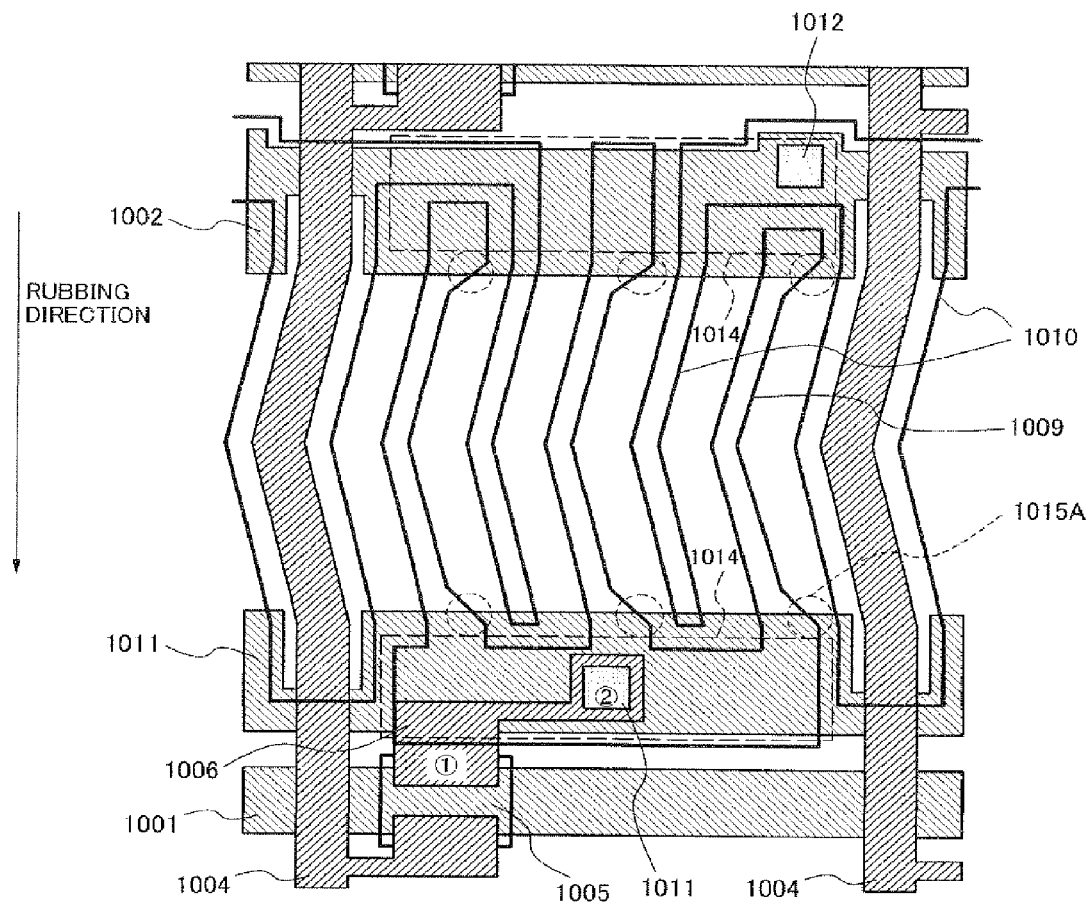
FIG. 10 is a plan view showing a pixel of configuration of an LCD device according to an eleventh exemplary embodiment.

Next, an eleventh exemplary embodiment is described by referring to FIG. 10. FIG. 10 is a plan view showing a configuration of a plurality of pixels of an LCD device.

In the exemplary embodiment, common electrodes 1010, pixel electrodes 1009 and a plurality of video signal wiring lines 1004 bend to form a multi-domain structure. In accordance with the structure, a direction of a first reverse-rotation preventing structure 1015A is changed from a direction of a single domain.

According to the eleventh exemplary embodiment, frequency of a short circuit decreases substantially and a reverse-rotation of LC molecules is prevented in whole display areas. A sufficient storage capacitance is formed. In a display device of the exemplary embodiment, since a black-level luminance does not increase, high contrast is obtained. In a display device of the exemplary embodiment, even when viewing a screen in a oblique direction, color shift is suppressed by a multi-domain structure.

[Exemplary Embodiment 12]

Figure 11:
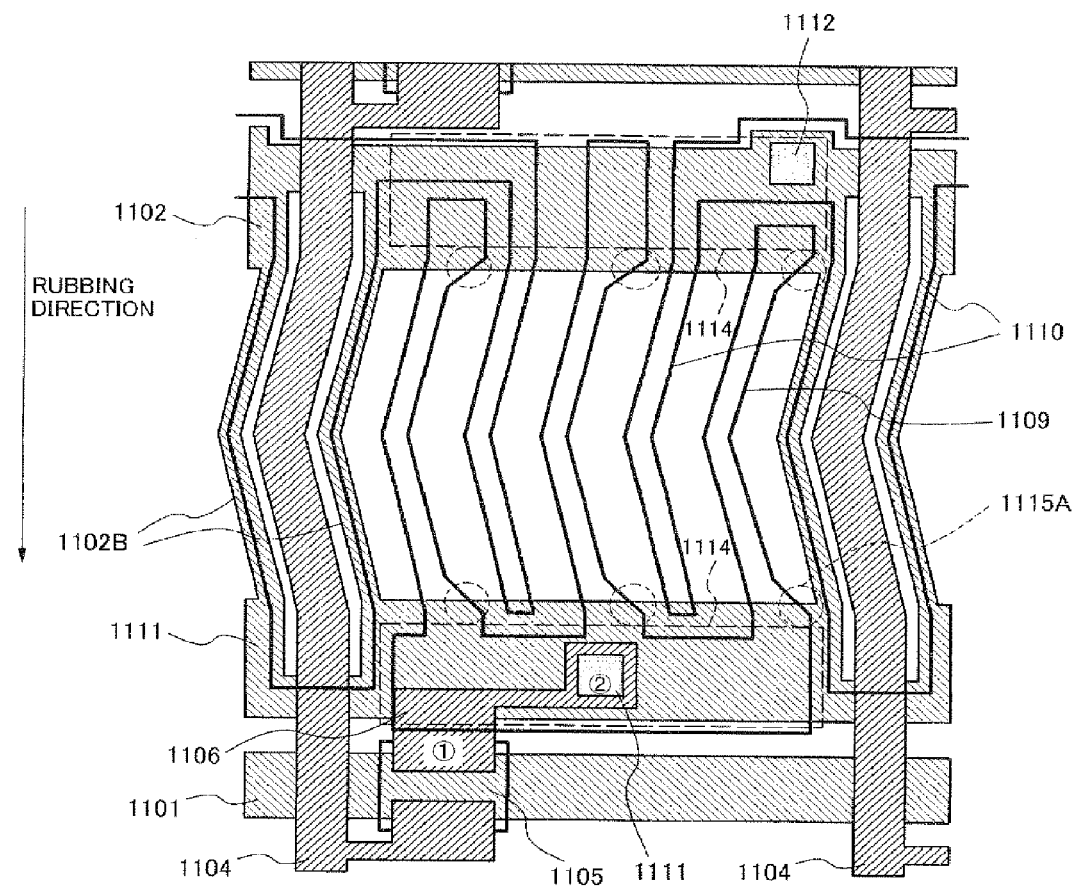
FIG. 11 is a plan view showing a pixel of configuration of an LCD device according to a twelfth exemplary embodiment.

A twelfth exemplary embodiment is described by referring to FIG. 11. Two common signal wiring lines arranged in the upper part and the lower part of a pixel which are in a first storage capacity forming section and a second storage capacity forming section are electrically connected by a connection part arranged along a plurality of video signal wiring lines.

When the two common signal wiring lines 1102 of upper side and lower side of the pixel are electrically connected to each other via a connection part 1102B, delay of a common signal is decreased and in-plane distribution of luminance or a flicker level becomes uniform. The configuration contributes to high definition of a display. The configuration is so effective for high definition of a display, when device is large and high definition is required. In the exemplary embodiment, since the connection part 1102B is arranged along the side of the plurality of video signal wiring lines, the leaked electric field from the plurality of video signal wiring lines to display areas is suppressed strongly and vertical cross talk is suppressed.

According to the twelfth exemplary embodiment, frequency of a short circuit decreases substantially and reverse-rotation is prevented in whole display areas. In the exemplary embodiment, a sufficient storage capacitance is formed. In a display device of the exemplary embodiment, because a black-level luminance does not increase, high contrast is obtained. Even when viewing a screen in an oblique direction, color shift is suppressed by a multi-domain structure. Because a short circuit decreases substantially and delay of a common signal decreases, improvement of image quality and high yield are obtained in a display of the exemplary embodiment.

[Exemplary Embodiment 13]

Figure 12:
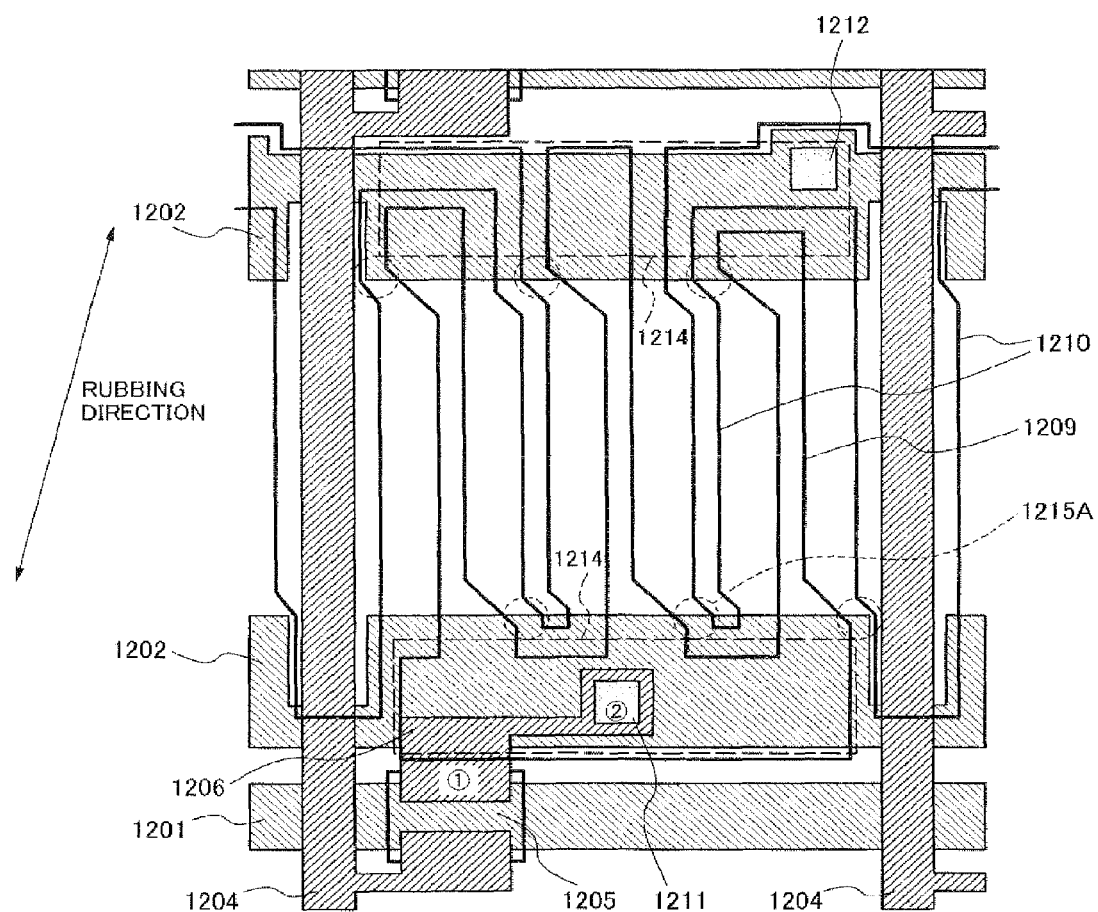
FIG. 12 is a plan view showing a pixel of configuration of an LCD device according to thirteenth to fourteenth exemplary embodiments.

Next, a thirteenth exemplary embodiment is described by referring to FIG. 12. Common electrodes 1210 adjacent to pixel electrodes 1209 on a side that generates a fringe electric field in a first reverse-rotation preventing structure 1215A include approximately crank shape in accordance with the shape of the pixel electrode 1209. An enclosure effect based on common electrodes is added to an effect of the fringe electric field, and thereby a strong reverse-rotation prevention effect is obtained.

Thus, according to the thirteenth exemplary embodiment, frequency of a short circuit decreases substantially and a reverse-rotation of LC molecules is prevented in whole display areas, and efficiency for light utilization increases.

[Exemplary Embodiment 14]

A fourteenth exemplary embodiment is described by referring to FIG. 12. A distance from edges of a concave portion 1214 formed by removing a third insulating film just below pixel electrodes to display areas is defined.

When edges of the concave portion 1214 formed by removing the third insulating film are close to display areas, light leak due to a step occurs to cause increase of black-level luminance. In the exemplary embodiment, the distance from the edges of the concave portion 1214 formed by removing the third insulating film to the display areas is defined. Light leakage is effectively suppressed, when the distance is large. If a distance of not less than 2 μm is kept, the light leakage due to the step is intercepted with common signal wiring lines 1202, and a black-level luminance does not increase.

According to the fourteenth exemplary embodiment, frequency of a short circuit decreases substantially and reverse-rotation of LC molecules is prevented in whole display areas and a sufficient storage capacitance is formed. Since a black-level luminance does not increase, contrast of a screen improves.

[Exemplary Embodiment 15]

Figure 13:
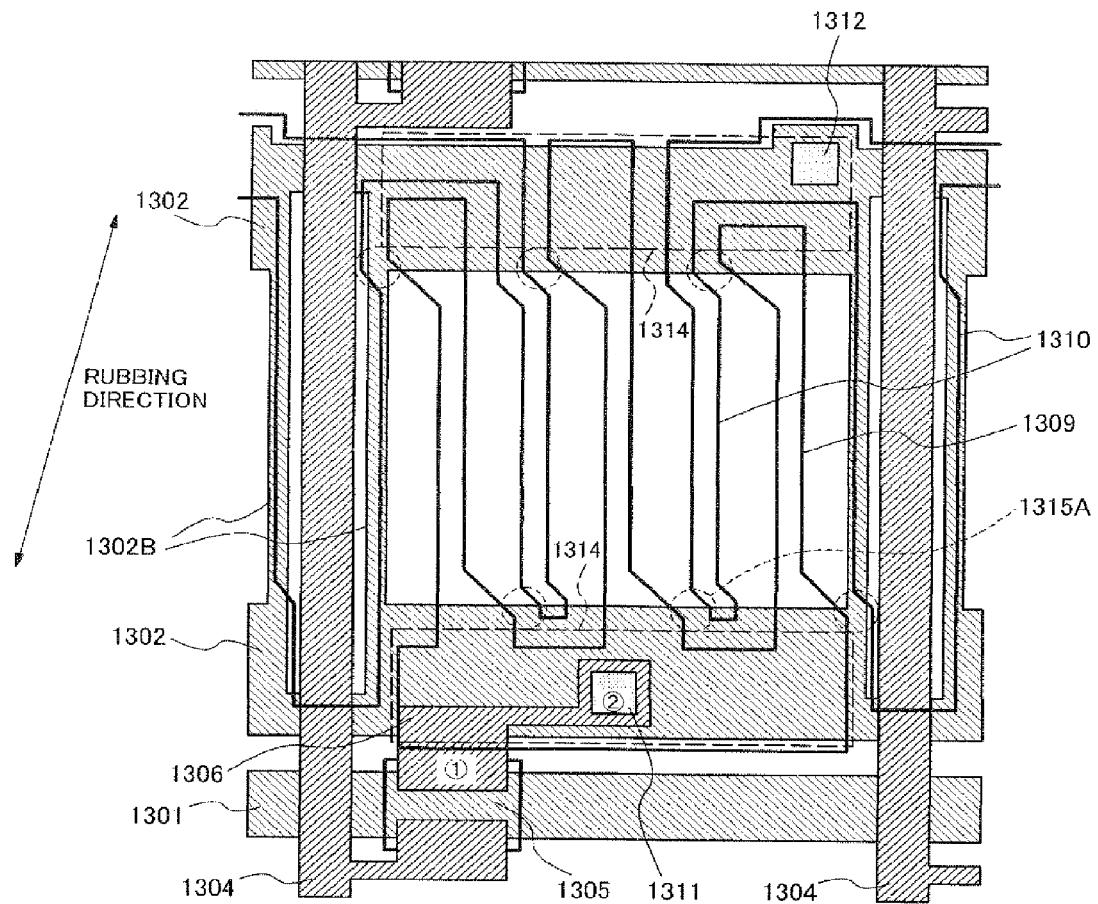
FIG. 13 is a plan view showing a pixel of configuration of an LCD device according to a fifteenth exemplary embodiment.

Next, a fifteenth exemplary embodiment is described by referring to FIG. 13. Two common signal wiring lines arranged in an upper part and a lower part of a pixel which are in a first storage capacity forming section and a second storage capacity forming section are electrically connected by a connection part 1302B arranged along a plurality of video signal wiring lines.

When the two common signal wiring lines 1302 of upper side and lower side of the pixel are electrically connected via a connection part 1302B, delay of a common signal is decreased and in-plane distribution of luminance or a flicker level becomes uniform. The configuration contributes to a display with high definition. The configuration is so effective for high definition of a display when a device is large and high definition is required. In the exemplary embodiment, when the connection part 1302B is arranged along the side of video signal wiring lines, the leaked electric field from the plurality of video signal wiring lines to display areas is suppressed strongly, and vertical cross talk is suppressed.

According to the fifteenth exemplary embodiment, frequency of a short circuit decreases substantially, reverse-rotation of LC molecules is prevented in whole display areas, and efficiency for light utilization increases. In-plane distribution of luminance or a flicker level becomes uniform, vertical cross talk is suppressed, and image quality improves.

[Exemplary Embodiment 16]

Figure 14:
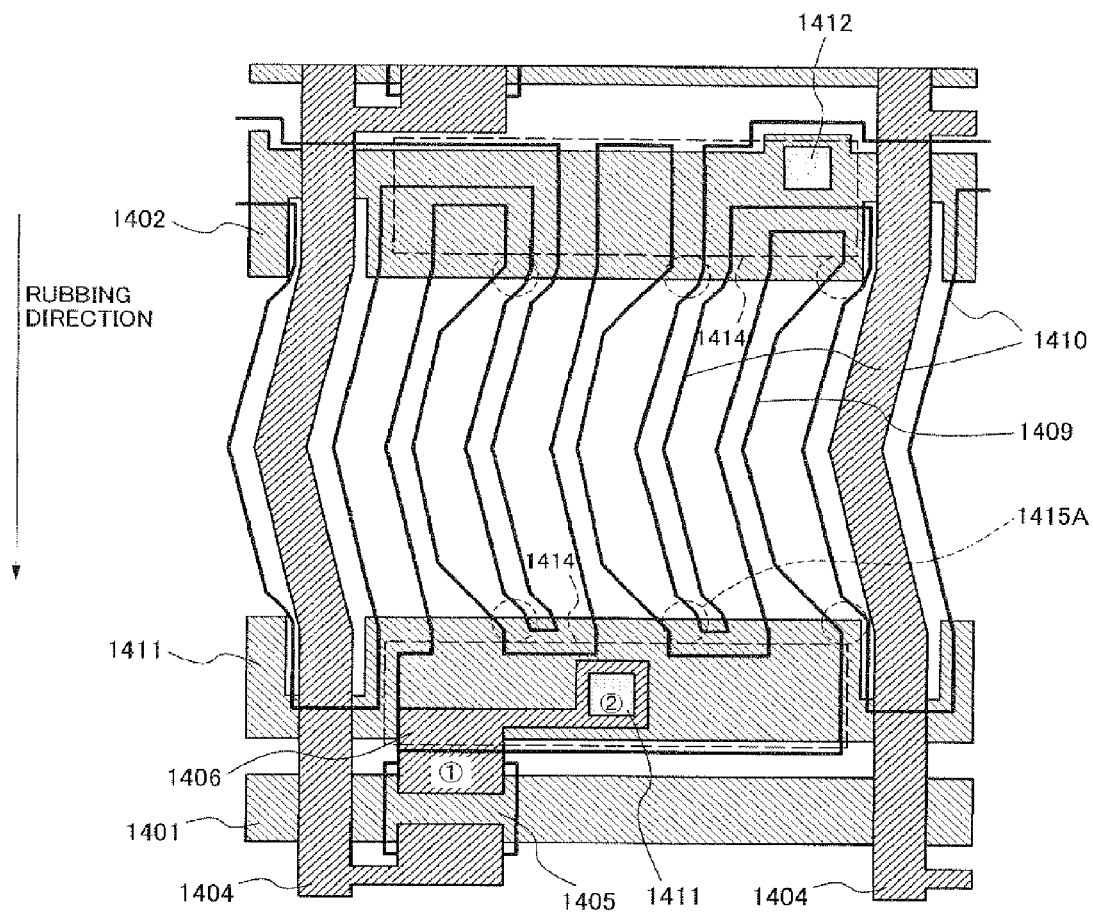
FIG. 14 is a plan view showing a pixel of configuration of an LCD device according to a sixteenth exemplary embodiment.

Next, a sixteenth exemplary embodiment is described by referring to FIG. 14. In the exemplary embodiment, common electrodes 1410, pixel electrodes 1409 and a plurality of video signal wiring lines 1404 bend to form a multi-domain structure in a center of display areas. In accordance with the structure, a direction of a first reverse-rotation preventing structure 1415A is different from a direction of the single domain above mentioned in the thirteenth and the fourteenth exemplary embodiment.

According to the sixteenth exemplary embodiment, frequency of a short circuit decreases substantially, reverse-rotation of LC molecules is prevented in whole display areas and efficiency for light utilization increases. In a display device of the exemplary embodiment, by a multi-domain structure, even when viewing a screen in an oblique direction, color shift is suppressed.

[Exemplary Embodiment 17]

Figure 15:
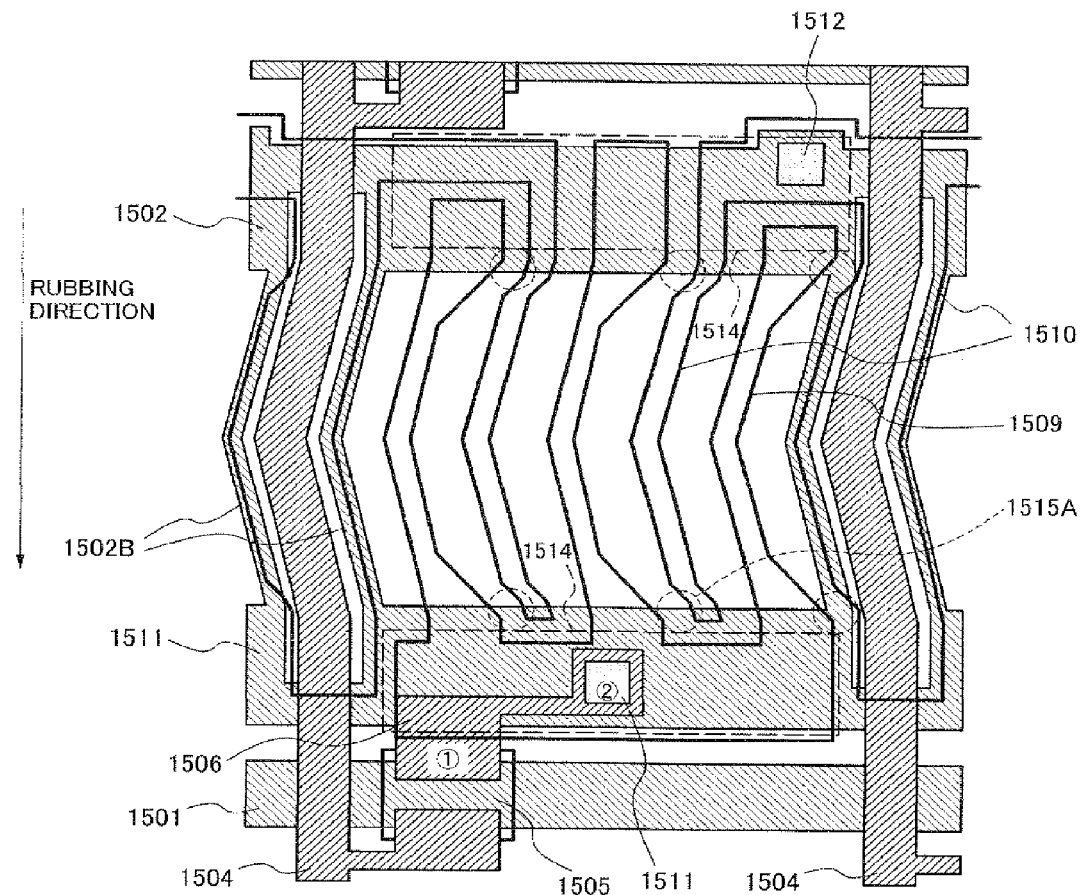
FIG. 15 is a plan view showing a pixel of configuration of an LCD device according to a seventeenth exemplary embodiment.

Next, a seventeenth exemplary embodiment is described by referring to FIG. 15. Two common signal wiring lines arranged in an upper part and a lower part of a pixel which are in a first storage capacity forming section and a second storage capacity forming section are electrically connected via a connection part arranged along a plurality of video signal wiring lines.

When the two common signal wiring lines 1502 of upper side and lower side of the pixel are connected to each other via a connection part 1502B, delay of a common signal is decreased and in-plane distribution of luminance or a flicker level becomes uniform. The configuration contributes to high definition of a display. The configuration is so effective for high definition of a display, when a device is large and high definition is required. In the exemplary embodiment, when the connection part 1502B is arranged along a side of the plurality of video signal wiring lines, the leaked electric field from the plurality of video signal wiring lines to display areas is suppressed strongly, and vertical cross talk is suppressed.

According to the seventeenth exemplary embodiment, frequency of a short circuit decreases substantially, the reverse-rotation of LC molecules is prevented in whole display areas, and efficiency for light utilization increases. Even when viewing a screen in an oblique direction, color shift is suppressed by a multi-domain structure. In-plane distribution of luminance or a flicker level becomes uniform, vertical cross talk is suppressed, and image quality improves.

[Exemplary Embodiment 18]

Figure 16:
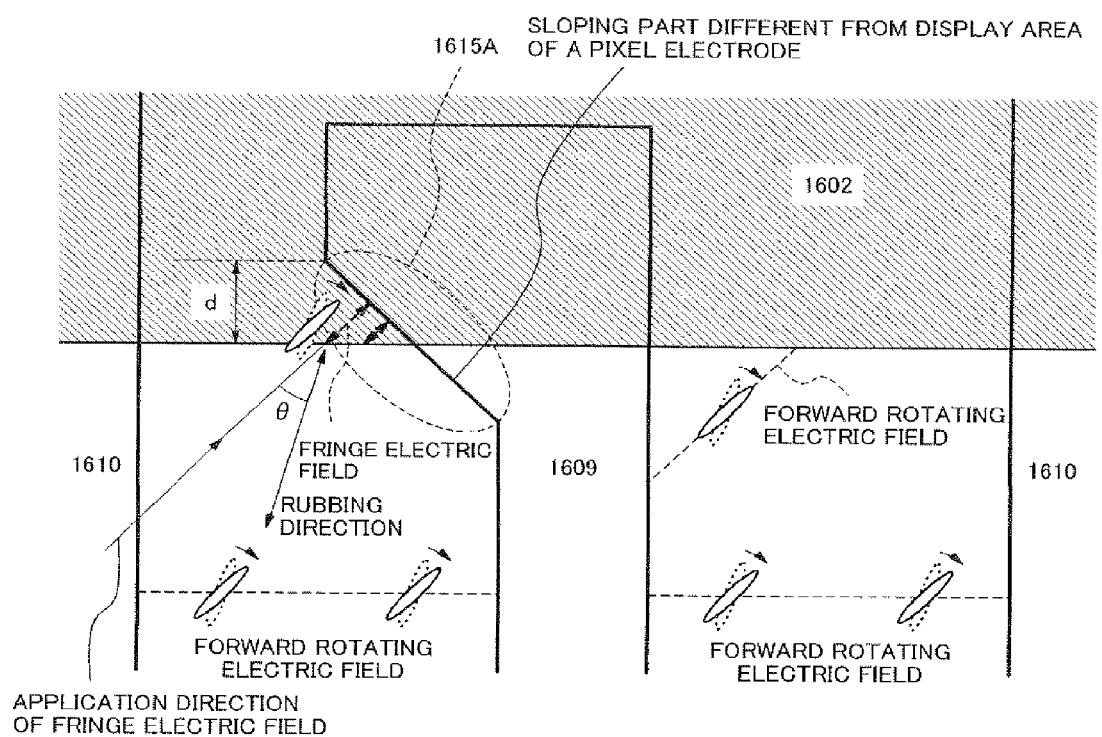
FIG. 16 is a diagram illustrating a first reverse-rotation preventing structure in the LCD device according to eighteenth to twentieth exemplary embodiments.

Next, a eighteenth exemplary embodiment is described by referring to FIG. 16. In the exemplary embodiment, an angle of a direction in which a fringe electric field which occurs in a neighborhood of a first reverse-rotation preventing structure 1615A operates and an initial alignment direction of LC molecules in an LC layer are defined.

In FIG. 16, an angle between the direction in which the fringe electric field operates and the initial alignment direction of the liquid crystal layer, that is, a rubbing direction is adjusted as θ. When the angle θ is 45 degrees, the strongest running torque is applied to LC molecules in the LC layer near the first reverse-rotation preventing structure 1615A and reverse-rotation preventing effect becomes high. Accordingly, it is desirable that the angle θ is 45 degrees. However, due to a pitch of a plurality of pixels and a layout, when the angle θ cannot be set to 45 degrees, a margin may be given to the value of θ. When the angle θ is settled in a predetermined range in which 45 degrees is central, enough reverse-rotation preventing effect is obtained practically. When the angle θ is 30 to 60 degrees specifically, the enough reverse-rotation preventing effect is obtained. When the angle θ is adjusted from 50 degrees to 40 degrees, even if disturbance such as a finger push occurs, stable orientation can be kept. The angle θ is approximately in accord with the angle between edges of a plurality of common signal wiring lines 1602 and edges of apart of pixel electrodes 1609 which inclines in a direction different from a direction in the display areas thereof.

According to the eighteenth exemplary embodiment, by defining the angle θ which is formed by a direction in which a fringe electric field operates and a initial alignment direction of LC molecules in an LC layer, a strong reverse-rotation preventing effect is obtained.

[Exemplary Embodiment 19]

Next, a nineteenth exemplary embodiment is described by referring to FIG. 16. A length of areas where a rotational direction of molecular axes of liquid crystal molecules in a liquid crystal layer due to a fringe electric field and a desired rotational direction of molecular axes of LC molecules are identical is defined in the exemplary embodiment.

The length above mentioned is described as d below. When the length d, from edges of common signal wiring lines, is adjusted to be longer than a thickness of an LC layer, a strong reverse-rotation preventing effect is obtained.

Thus, according to the nineteenth exemplary embodiment, since the angle θ and the length d above described are defined, the strong reverse-rotation preventing effect is obtained.

[Exemplary Embodiment 20]

Next, a twentieth exemplary embodiment is described by referring to FIG. 16. Shapes of a plurality of common signal wiring lines are defined in the embodiment.

Edges of a plurality of common signal wiring lines which face display areas and determine boundaries of display areas of pixels are formed as straight lines. In a related art, edges of common signal wiring lines include saw-like shapes, because reverse-rotation preventing structures are formed thereon.

Thus, a transmitted light is scattered at wiring line edges.

According to the twentieth exemplary embodiment, when the edges of the plurality of common signal wiring lines which determine boundaries in display areas of pixels are formed to be simple linear shapes, scattering of transmitted light in the wiring line edges is suppressed. Since the plurality of common signal wiring lines of the exemplary embodiment do not include saw-like shapes, scattering of transmission light is suppressed and approximately linearly-polarized-light state especially in a black display is not spoiled. Since a black-level luminance does not increase, high contrast is obtained.

[Exemplary Embodiment 21]

Figure 17:
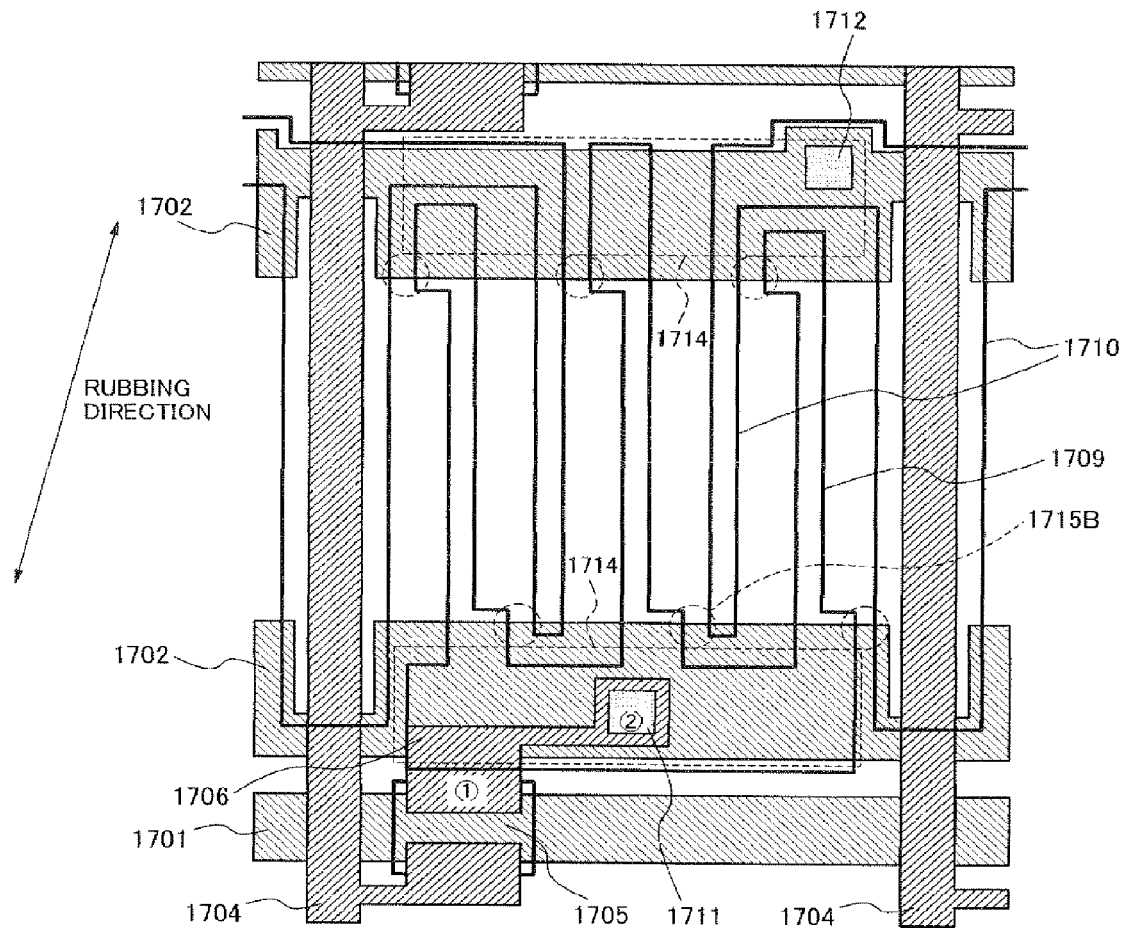
FIG. 17 is a plan view showing a pixel of configuration of an LCD device according to twenty-first to twenty-second exemplary embodiments.
Figure 18:
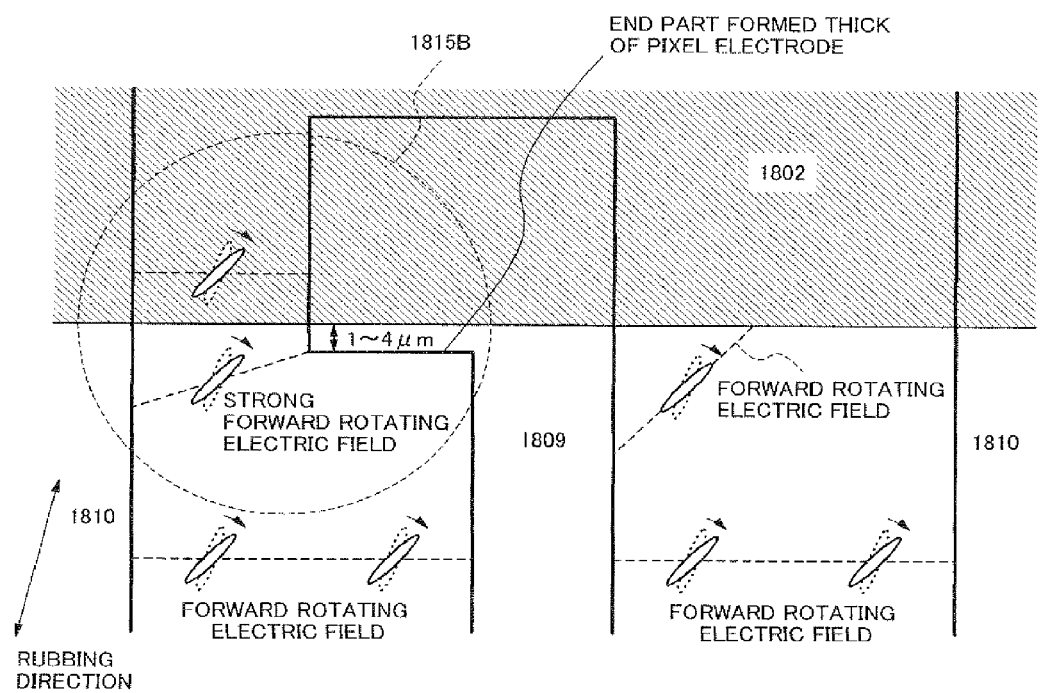
FIG. 18 is a diagram illustrating a second reverse-rotation preventing structure in the LCD device according to a twenty-first exemplary embodiment.

Next, a twenty-first exemplary embodiment is described by referring to FIGS. 17 and 18. A display device of the exemplary embodiment is provided with a different reverse-rotation preventing structure from the first reverse-rotation preventing structure above mentioned. FIG. 17 is a plan view showing a pixel configuration of an LCD device of the exemplary embodiment, and FIG. 18 is a drawing showing operation of LC molecules in a reverse-rotation preventing structure of the exemplary embodiment.

Specifically, electrode width at both ends of pixel electrodes 1709 is made to be thick toward a side which a reverse-rotation electric field occurs. Most of regions where electrode width at the ends of the pixel electrode 1709 is made to be thick overlap a plurality of common signal wiring lines 1702 of a bottom layer.

FIG. 18 shows the reason why reverse-rotation is prevented by such structure, and a difference from the first reverse-rotation preventing structure. In FIG. 18, near a region which reverse-rotation electric field is generated, a width of pixel electrodes 1809 is thick, and an interval between the pixel electrode 1809 and common electrodes 1810 is narrow. Due to such configuration, a strong forward rotating electric field occurs, and an operation of a reverse-rotation electric field is suppressed. In the first reverse-rotation preventing structure shown in FIG. 7A, edges of a plurality of common signal wiring lines 702 intersect with part of pixel electrodes which incline in a direction different from a direction thereof in display areas. A fringe electric field for a forward rotation of LC molecules occurs between the plurality of common signal wiring lines 702 and edges of pixel electrodes 709. Thus an influence of a reverse-rotating electric field is suppressed. In a reverse-rotation preventing structure shown in FIG. 18, a strong forward rotating electric field is generated between the pixel electrode 1809 and the common electrodes 1810. Hereafter, the reverse-rotation preventing structure shown in FIG. 18 is called a second reverse-rotation preventing structure.

According to the twenty-first exemplary embodiment, frequency of a short circuit decreases substantially, an effect of preventing reverse-rotation of LC molecules in whole display areas increases, and efficiency for light utilization increases. Marks of a finger push do not remain on a screen of an LC panel.

[Exemplary Embodiment 22]

Next, a twenty-second exemplary embodiment is described by referring to FIG. 17. A distance from edges of a concave portion formed by removing a third insulating layer just below pixel electrodes to display areas is defined.

When edges of the concave portion 1714 formed by removing the third insulating film are close to display areas, light leak caused due to a step occurs to cause increase of black-level luminance. Accordingly, in the exemplary embodiment, the distance from the edges of the concave portion 1714 formed by removing the third insulating film to the display areas is defined. Light leakage is well suppressed, when the distance is large. If the distance of not less than 2 μm is kept, the light leakage due to the step is intercepted with common signal wiring lines 1702, and a black-level luminance does not increase.

According to the twenty-second exemplary embodiment, frequency of a short circuit decreases substantially, reverse-rotation of LC molecules is prevented in whole display areas, and a sufficient storage capacitance is formed. Since a black-level luminance does not increase, a contrast improves.

[Exemplary Embodiment 23]

Figure 19:
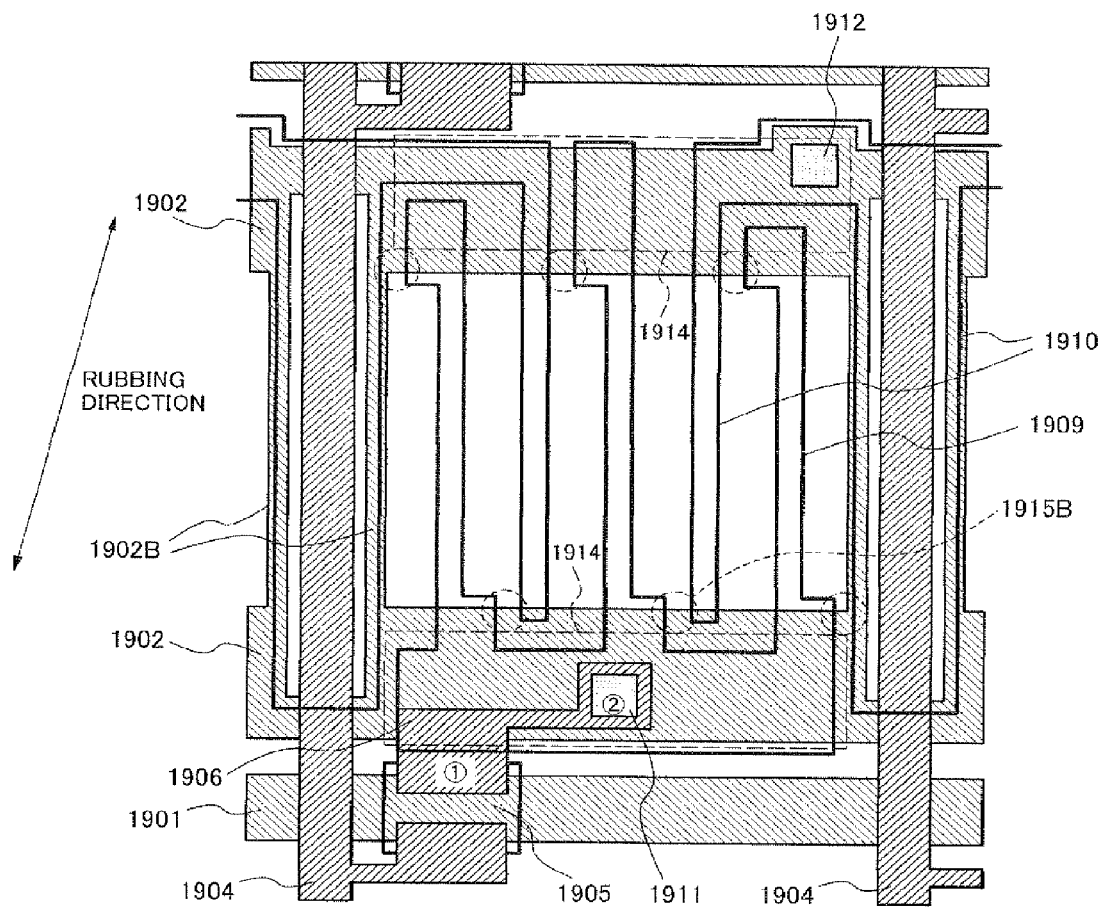
FIG. 19 is a plan view showing a pixel of configuration of an LCD device according to a twenty-third exemplary embodiment.

Next, a twenty-third exemplary embodiment is described by referring to FIG. 19. Two common signal wiring lines arranged in an upper part and a lower part of a pixel which are in a first storage capacity forming section and a second storage capacity forming section are electrically connected by a connection part 1902B arranged along a plurality of video signal wiring lines.

By connecting the two common signal wiring lines 1902 of upper side and lower side of the pixel with a connection part 1902B, delay of a common signal is decreased and in-plane distribution of luminance or a flicker level becomes uniform. The configuration contributes to high definition of a display. The configuration is so effective for high definition of a display when a device is large and high definition is required. In the exemplary embodiment, when the connection part 1902B is arranged along a side of the plurality of video signal wiring lines, a leakage electric field from the plurality of video signal wiring lines to display areas is suppressed strongly, and vertical cross talk is suppressed.

According to the twenty-third exemplary embodiment, frequency of a short circuit decreases substantially, an effect of preventing reverse-rotation of LC molecules in whole display areas increases, and efficiency for light utilization increases. Marks of a finger push do not remain on a screen of an LC panel. In-plane distribution of luminance or a flicker level becomes uniform, vertical cross talk is suppressed, an image quality improves.

[Exemplary Embodiment 24]

Figure 20:
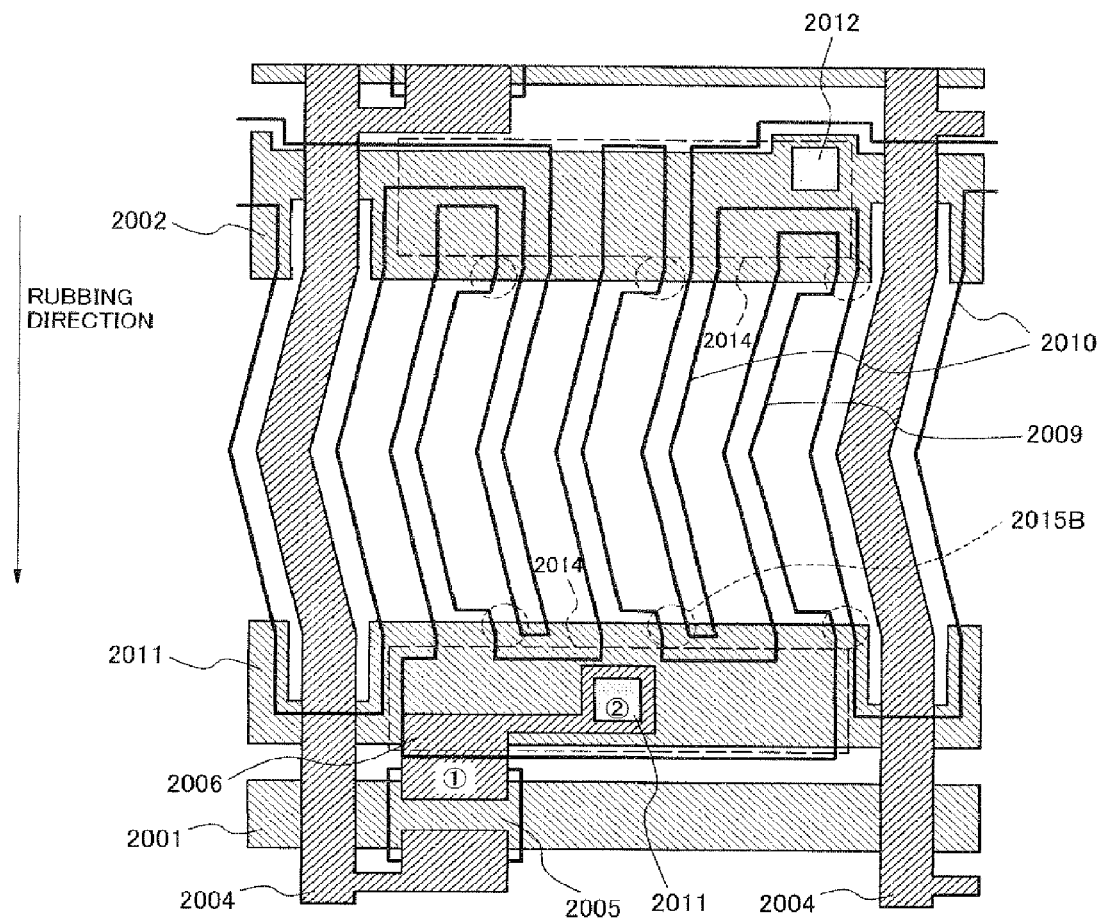
FIG. 20 is a plan view showing a pixel of configuration of an LCD device according to a twenty-fourth exemplary embodiment.

Next, a twenty-fourth exemplary embodiment is described by referring to FIG. 20. Common electrodes 2010, pixel electrodes 2009 and a plurality of video signal wiring lines 2004 bend to form a multi-domain structure in a center of display areas.

In accordance with the structure, a direction of a second reverse-rotation preventing structure 2015B is changed from a direction of a single domain described in the twenty-first and the twenty-second exemplary embodiment.

According to the twenty-fourth exemplary embodiment, frequency of a short circuit decreases substantially, an effect of preventing reverse-rotation of LC molecules in whole display areas increases, and efficiency for light utilization increases. Marks of a finger push do not remain on a screen of an LC panel. Even if viewing a screen in an oblique direction, color shift is suppressed by the multi-domain structure.

[Exemplary Embodiment 25]

Figure 21:
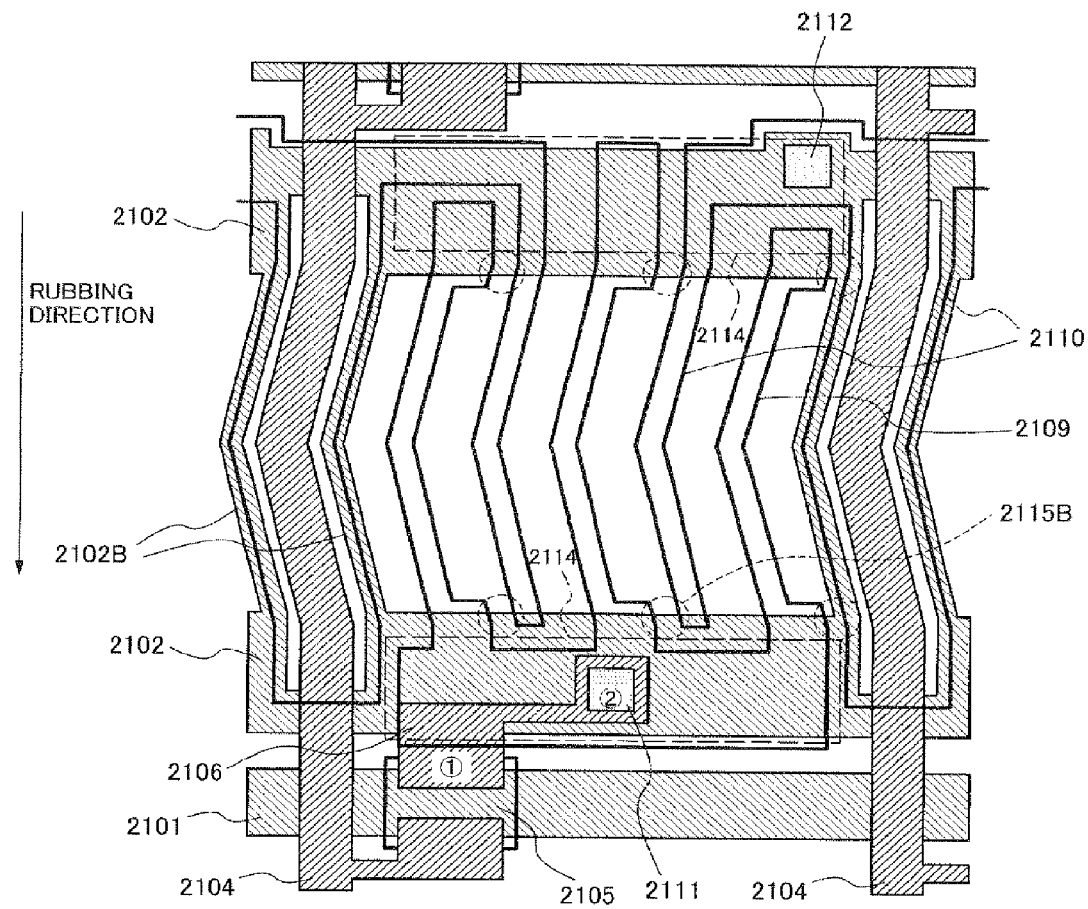
FIG. 21 is a plan view showing a pixel of configuration of an LCD device according to a twenty-fifth exemplary embodiment.

Next, a twenty-fifth exemplary embodiment is described by referring to FIG. 21. Two common signal wiring lines arranged in an upper part and a lower part of a pixel which are in a first storage capacity forming section and a second storage capacity forming section are electrically connected by a connection part arranged along a plurality of video signal wiring lines.

By connecting the two common signal wiring lines 2102 of an upper side and a lower side of a pixel with a connection part 2102B, delay of a common signal is decreased and in-plane distribution of luminance or a flicker level becomes uniform. The configuration contributes to high definition of a display and is so effective for high definition of a display when a device is large and high definition is required. In the exemplary embodiment, when the connection part 2102B is arranged along a side of a plurality of video signal wiring lines, a leakage electric field from the plurality of video signal wiring lines to display areas is suppressed strongly, and vertical cross talk is suppressed.

According to the twenty-fifth exemplary embodiment, frequency of a short circuit decreases substantially, an effect of preventing reverse-rotation of LC molecules in whole display areas increases, and efficiency for light utilization increases. Marks of a finger push do not remain on a screen of an LC panel. Even if viewing a screen in an oblique direction, a color shift is suppressed by a multi-domain structure. In-plane distribution of luminance or a flicker level becomes uniform and vertical cross talk is suppressed, and image quality improves.

[Exemplary Embodiment 26]

Figure 22:
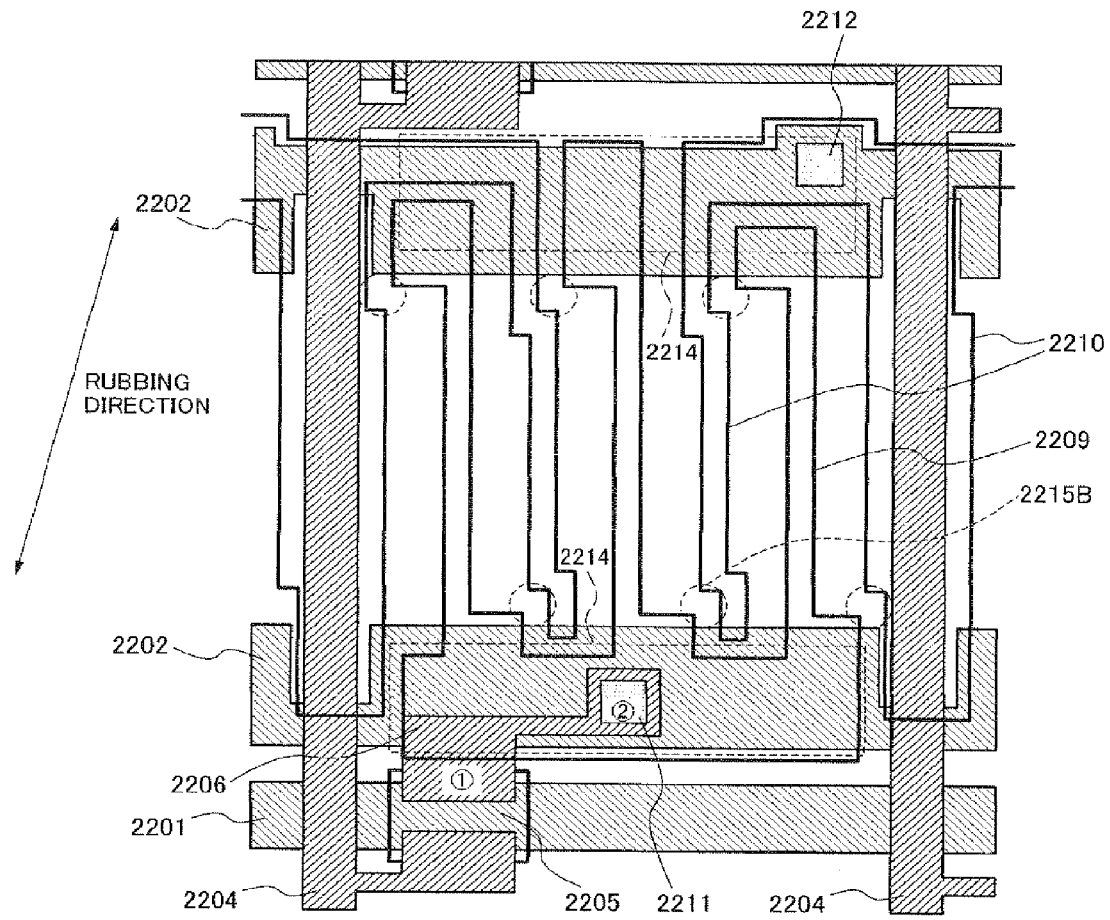
FIG. 22 is a plan view showing a pixel of configuration of an LCD device according to twenty-sixth to twenty-seventh exemplary embodiments.
Figure 23:
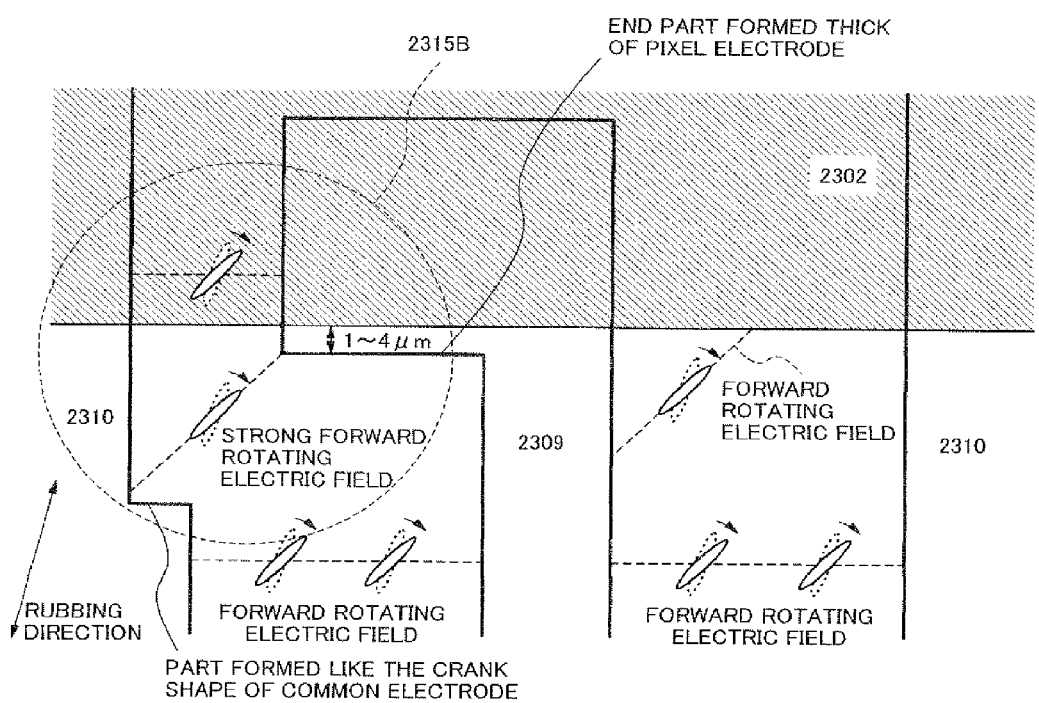
FIG. 23 is a diagram illustrating a second reverse-rotation preventing structure in the LCD device according to the twenty-sixth exemplary embodiment.

Next, a twenty-sixth exemplary embodiment is described by referring to FIGS. 22 and 23. In a second reverse-rotation preventing structure 2215B, common electrodes 2210 adjacent to pixel electrodes 2209 having wide edges becomes a shape of an approximately crank type in accordance with the shapes of pixel electrodes 2209. Then an effect of suppressing a reverse-rotation electric field becomes still higher in the exemplary embodiment.

A reason for the effect is described by referring to FIG. 23. In a region where corner parts of electrode edges are close to each other, a strong forward rotating electric field occurs. The electric field applies a strong rotating torque in an initial alignment direction of LC molecules. Specifically, a initial alignment direction of the LC molecules and a direction where the forward rotating electric field operates form around 45 degrees. An effect for suppressing a reverse-rotation electric field becomes still higher in the exemplary embodiment.

According to the twenty-sixth exemplary embodiment, frequency of a short circuit decreases substantially, an effect for preventing the reverse-rotation of the LC molecules in whole display areas increases, and efficiency for light utilization increases. Marks of a finger push do not remain on a screen of an LC panel.

[Exemplary Embodiment 27]

Next, a twenty-seventh exemplary embodiment is described by referring to FIG. 22. A distance from edges of a concave portion formed by removing a third insulating layer just below pixel electrodes to display areas is defined in the exemplary embodiment.

The exemplary embodiment is described in detail. When edges of the concave portion 2214 formed by removing the third insulating film are close to display areas, light leak caused by a step occurs to cause increase of black-level luminance. Accordingly, in the exemplary embodiment, the distance from the edges of the concave portion 2214 formed by removing the third insulating film to the display areas is defined. Light leakage is well suppressed, when the distance is large. If a distance of not less than 2 μm is kept, the light leakage due to a step is intercepted with a plurality of common signal wiring lines 1702, and a black-level luminance does not increase.

Thus, according to the twenty-seventh exemplary embodiment, frequency of a short circuit decreases substantially, reverse-rotation of LC molecules is prevented in whole display areas, and a sufficient storage capacitance is formed. Since black-level luminance does not increase, contrast improves.

[Exemplary Embodiment 28]

Figure 24:
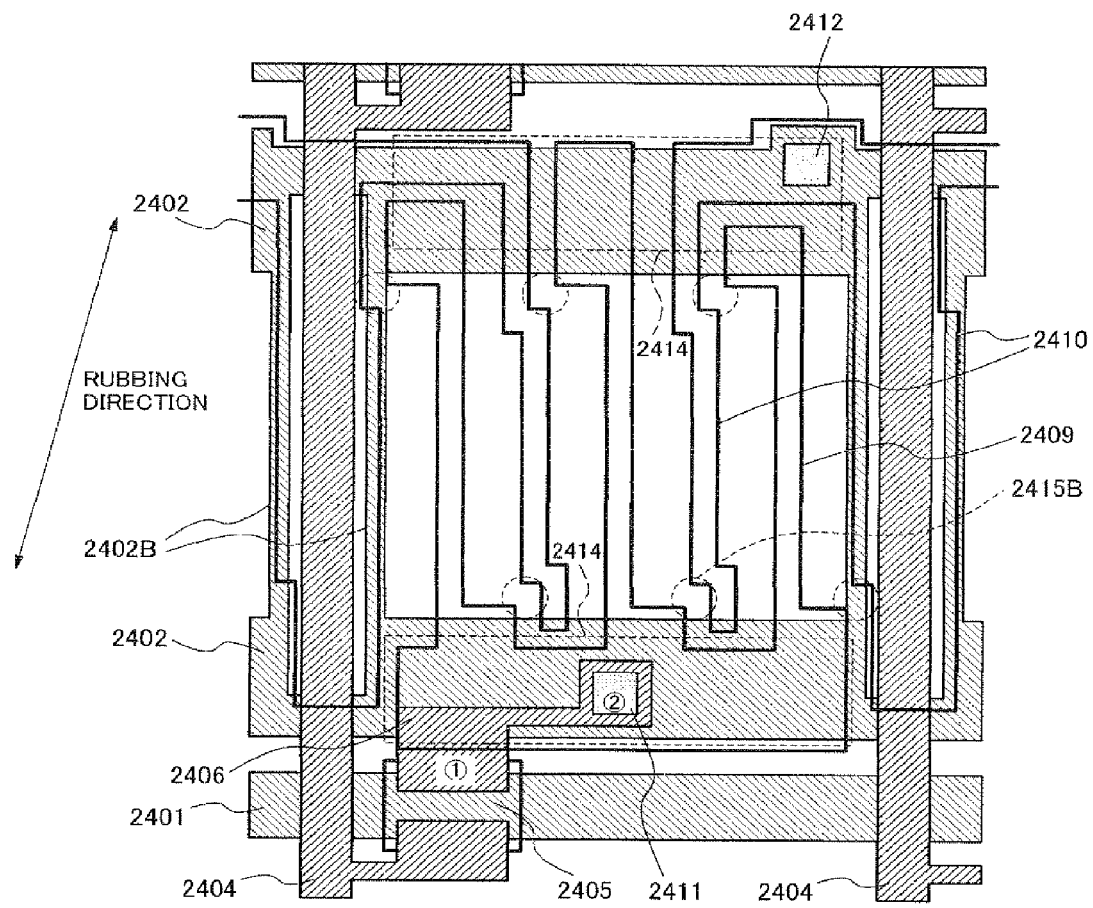
FIG. 24 is a plan view showing a pixel of configuration of an LCD device according to a twenty-eighth exemplary embodiment.

Next, a twenty-eighth exemplary embodiment is described by referring to FIG. 24. Two common signal wiring lines arranged in an upper part and a lower part of a pixel which are in a first storage capacity forming section and a second storage capacity forming section are electrically connected via a connection part arranged along a plurality of video signal wiring lines.

When the two common signal wiring lines 2402 of an upper side and a lower side of the pixel with a connection part 2402B are connected, delay of a common signal is decreased and in-plane distribution of luminance or a flicker level becomes uniform. The configuration contributes to high definition of a display and is so effective for high definition of a display when a device is large and high definition is required. In the exemplary embodiment, when the connection part 2402B is arranged along a side of the plurality of video signal wiring lines, the leakage electric field from the plurality of video signal wiring lines to display areas is suppressed strongly, and vertical cross talk is suppressed.

According to the twenty-eighth exemplary embodiment, frequency of e short circuit decreases substantially, reverse-rotation of LC molecules is prevented in whole display areas, and efficiency for light utilization increases. Marks of a finger push do not remain on a screen of an LC panel. In-plane distribution of luminance or a flicker level becomes uniform, vertical cross talk is suppressed, and image quality improves.

[Exemplary Embodiment 29]

Figure 25:
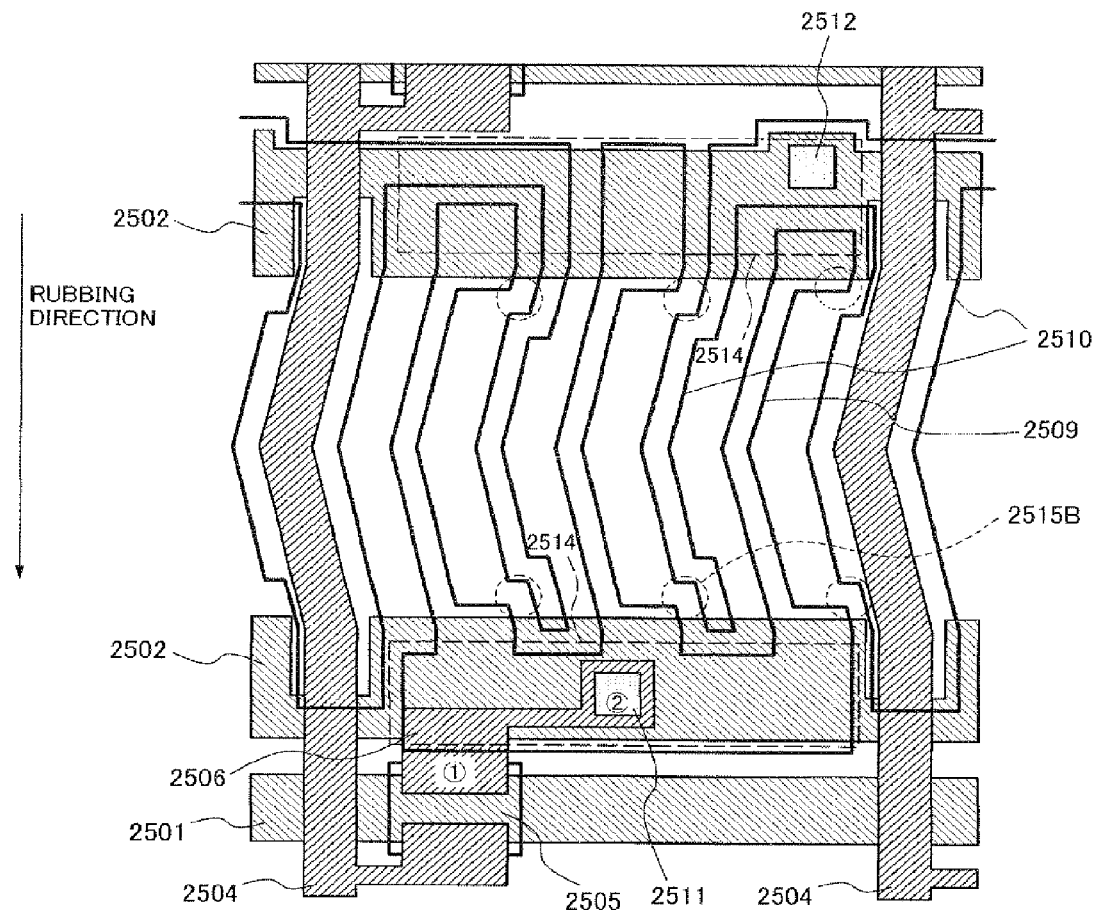
FIG. 25 is a plan view showing a pixel of configuration of an LCD device according to a twenty-ninth exemplary embodiment.

Next, a twenty-ninth exemplary embodiment is described by referring to FIG. 25. Common electrodes 2510, pixel electrodes 2509 and a plurality of video signal wiring lines 2504 bend to form a multi-domain structure in a center of display areas. In accordance with the structure, a direction of a second reverse-rotation preventing structure 2515B is changed from a direction in the single domain described in the twenty-sixth and the twenty-seventh exemplary embodiment.

According to the twenty-ninth exemplary embodiment, frequency of a short circuit decreases substantially, reverse-rotation of LC molecules is prevented in whole display areas, and efficiency for light utilization increases. Marks of a finger push do not remain on a screen of an LC panel. Even if viewing a screen in an oblique direction, a color shift is suppressed by a multi-domain structure.

[Exemplary Embodiment 30]

Figure 26:
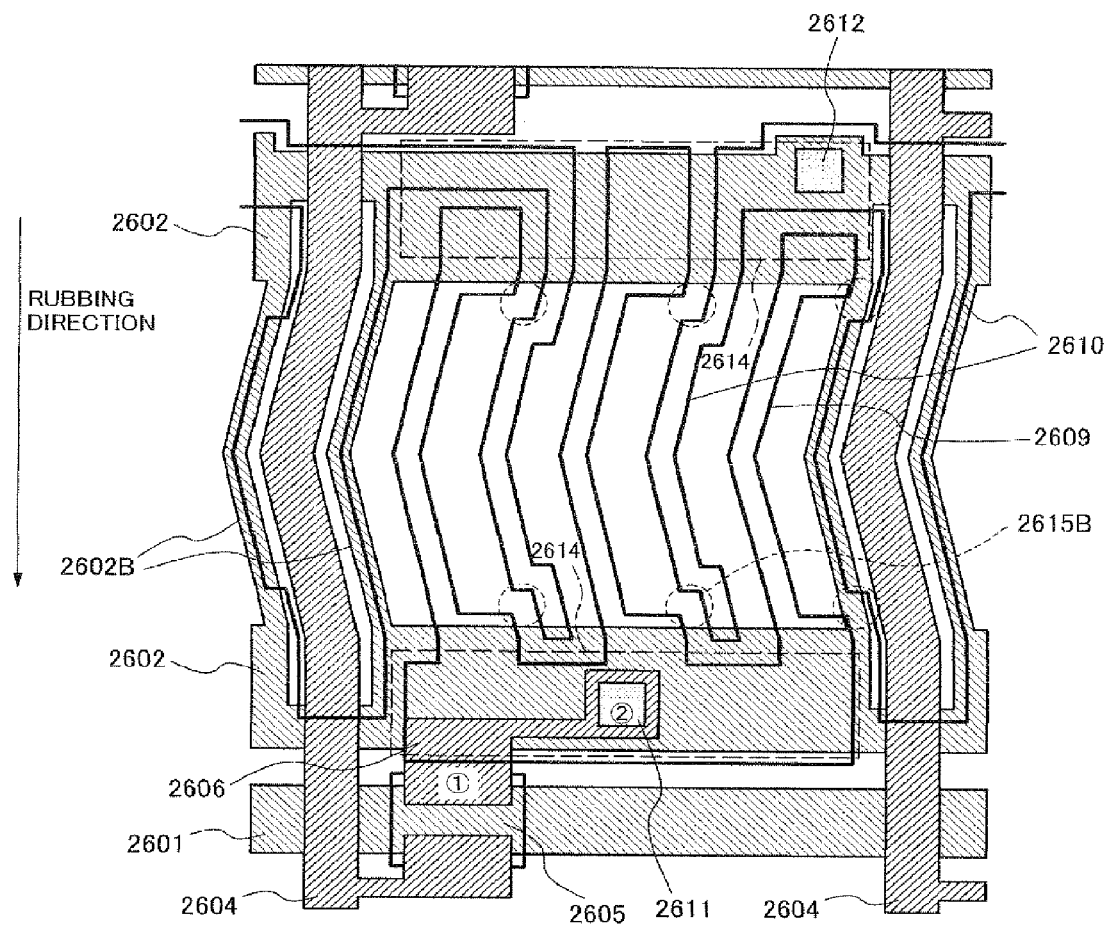
FIG. 26 is a plan view showing a pixel of configuration of an LCD device according to a thirtieth exemplary embodiment.

Next, a thirtieth exemplary embodiment is described by referring to FIG. 26. Two common signal wiring lines arranged in an upper part and a lower part of a pixel which are in a first storage capacity forming section and a second storage capacity forming section are electrically connected via a connection part arranged along a plurality of video signal wiring lines.

When the two common signal wiring lines 2602 of an upper side and a lower side of the pixel with a connection part 2602B are connected, delay of a common signal is decreased and in-plane distribution of luminance or a flicker level becomes uniform. The configuration contributes to high definition of a display and is so effective for high definition of a display when a device is large and high definition is required. In the exemplary embodiment, when the connection part 2602B is arranged along a side of the plurality of video signal wiring lines, a leakage electric field from the plurality of video signal wiring lines to display areas is suppressed strongly, and vertical cross talk is suppressed.

Thus, according to the twenty-fifth exemplary embodiment, frequency of a short circuit decreases substantially, reverse-rotation of LC molecules is prevented in whole display areas, and efficiency for light utilization increases. Marks of a finger push do not remain on a screen of an LC panel. Even if viewing a screen in an oblique direction, a color shift is suppressed by a multi-domain structure. In-plane distribution of luminance or a flicker level becomes uniform, vertical cross talk is suppressed, and image quality improves.

[Exemplary Embodiment 31]

Figure 27:
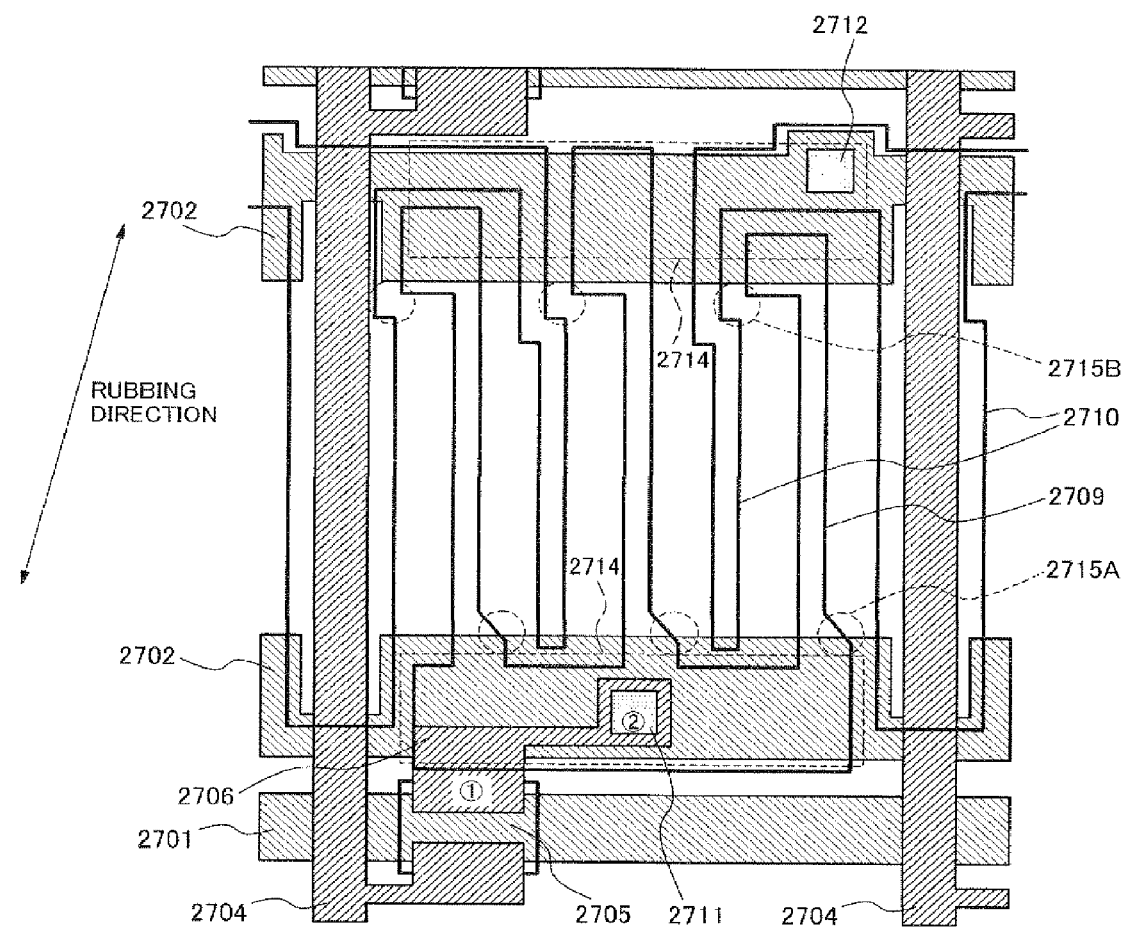
FIG. 27 is a plan view showing a pixel of configuration of an LCD device according to thirty-first to thirty-second exemplary embodiments.

Next, a thirty-first exemplary embodiment is described by referring to FIG. 27. A first reverse-rotation preventing structure 2715A is used in one side (i.e. lower side) of a pixel and a second reverse-rotation preventing structure 2715B is used in the other side (i.e. upper side) of a pixel. Such combination of such reverse-rotation preventing structures may be upside down, and may be freely set according to a design condition.

According to the thirty-first exemplary embodiment, frequency of a short circuit decreases substantially, reverse-rotation of LC molecules is prevented in whole display areas, and efficiency for light utilization increases. Marks of a finger push do not remain on a screen of an LC panel.

[Exemplary Embodiment 32]

Next, a thirty-second exemplary embodiment is described by referring to FIG. 27. A distance from edges of a concave portion formed by removing a third insulating layer just below pixel electrodes to display areas is defined.

When edges of the concave portion 2714 formed by removing the third insulating film are close to display areas, light leak caused by a step occurs to cause increase of black-level luminance. Accordingly, in the exemplary embodiment, the distance from the edges of the concave portion 2714 formed by removing the third insulating film to the display areas is defined. Light leakage is well suppressed, when the distance is large. If the distance of not less than 2 µm is kept, the light leakage due to the step is intercepted with a plurality of common signal wiring lines 1702, and a black-level luminance does not increase.

According to the thirty-second exemplary embodiment, frequency of a short circuit decreases substantially and reverse-rotation of LC molecules is prevented in whole display areas, and a sufficient storage capacitance is formed. Since a black-level luminance does not increase, a contrast improves.

[Exemplary Embodiment 33]

Figure 28:
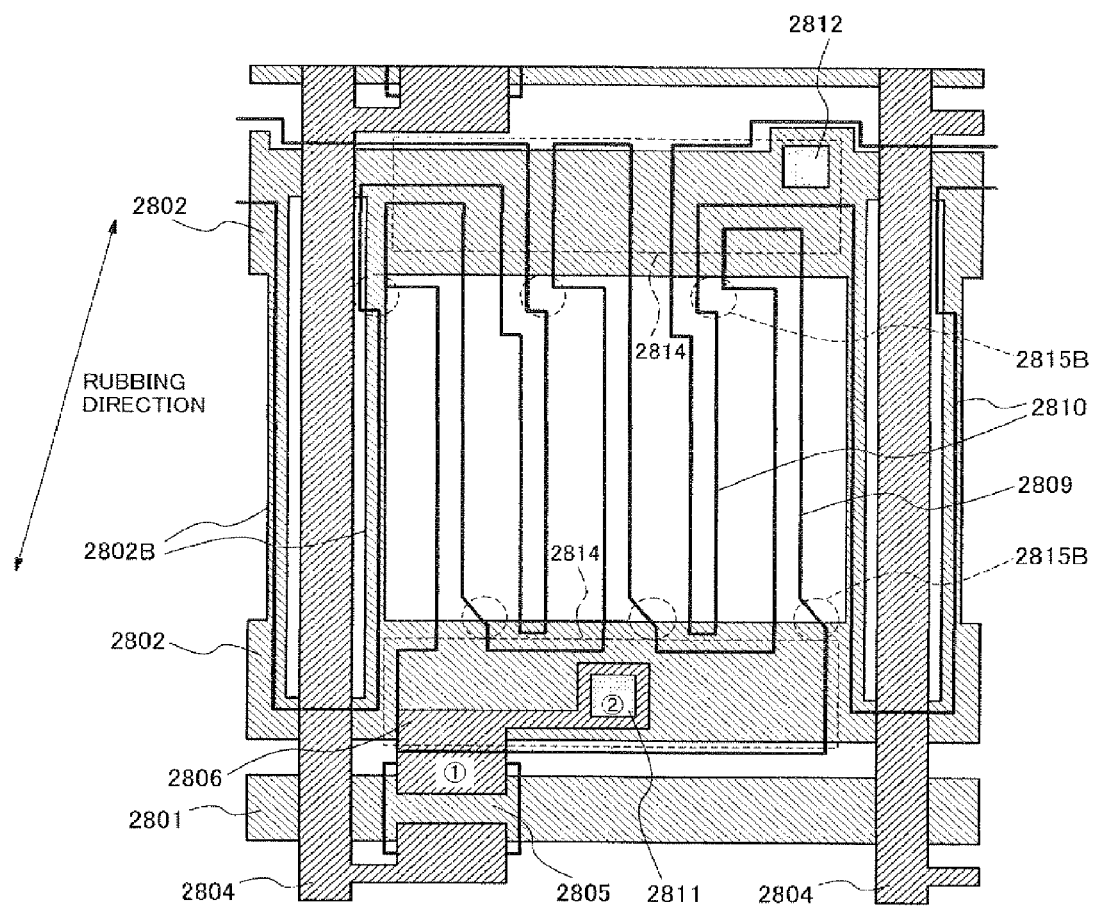
FIG. 28 is a plan view showing a pixel of configuration of an LCD device according to a thirty-third exemplary embodiment.

Next, a thirty-third exemplary embodiment is described by referring to FIG. 28. Two common signal wiring lines arranged in an upper part and a lower part of a pixel which are in a first storage capacity forming section and a second storage capacity forming section are electrically connected via a connection part arranged along a plurality of video signal wiring lines.

When the two common signal wiring lines 2802 of an upper side and a lower side of the pixel are connected by a connection part 2802B, delay of a common signal is decreased and in-plane distribution of luminance or a flicker level becomes uniform. The configuration contributes to high definition of a display and is so effective for high definition of a display when a device is large and high definition is required. In the exemplary embodiment, when the connection part 2802B is arranged along a side of the plurality of video signal wiring lines, the leakage electric field from the plurality of video signal wiring lines to display areas is suppressed strongly, and vertical cross talk is suppressed.

According to the thirty-third exemplary embodiment, frequency of a short circuit decreases substantially, reverse-rotation of LC molecules is prevented in whole display areas increases, and efficiency for light utilization increases. Marks of a finger push do not remain on a screen of an LC panel. In-plane distribution of luminance or a flicker level becomes uniform, vertical cross talk is suppressed, and image quality improves.

[Exemplary Embodiment 34]

Figure 29:
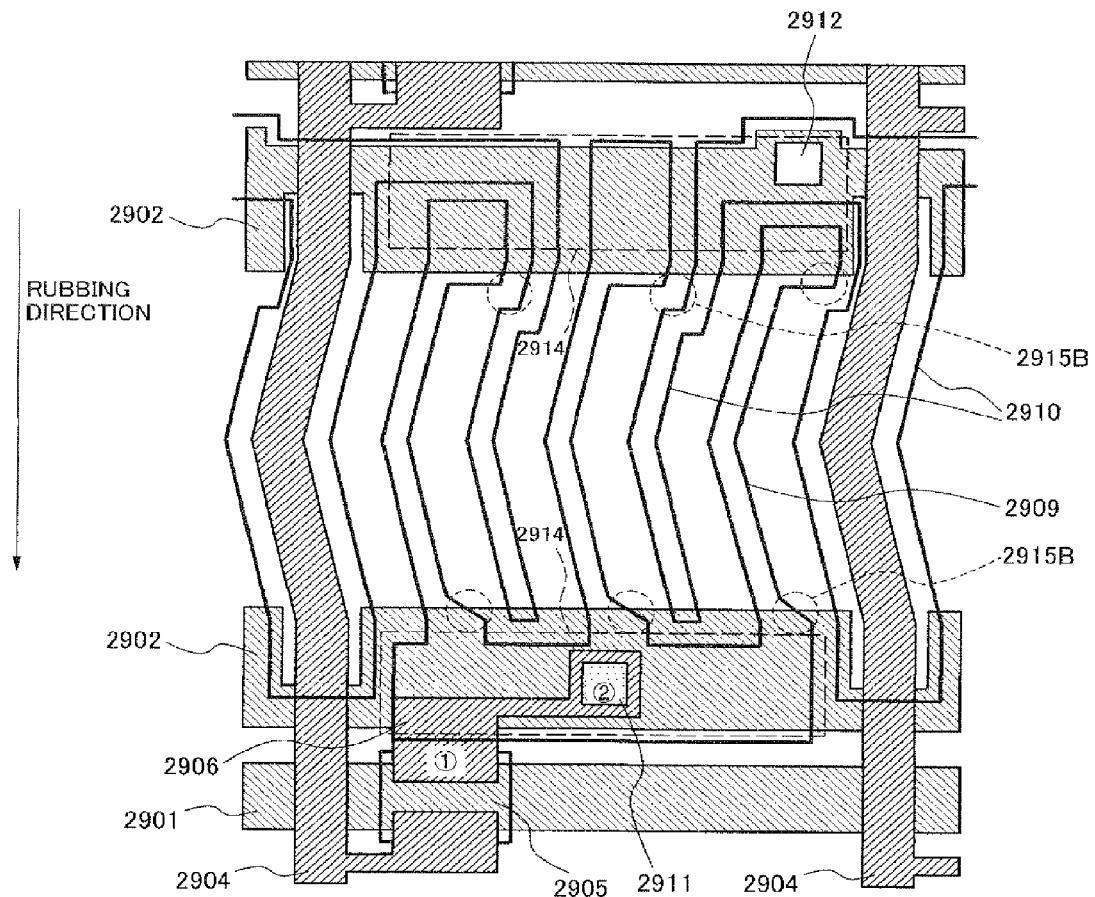
FIG. 29 is a plan view showing a pixel of configuration of an LCD device according to a thirty-fourth exemplary embodiment.

Next, a thirty-fourth exemplary embodiment is described by referring to FIG. 29. Common electrodes 2910, pixel electrodes 2909 and a plurality of video signal wiring lines 2904 bend to form a multi-domain structure in a center of display areas. In accordance with the structure, a direction of a second reverse-rotation preventing structure 2915B is changed from a direction of the single domain described in the twenty-third exemplary embodiment.

According to the thirty-fourth exemplary embodiment, frequency of a short circuit decreases substantially and reverse-rotation of LC molecules is prevented in whole display areas and efficiency for light utilization increases. Marks of a finger push do not remain on a screen of an LC panel. Even if viewing a screen in an oblique direction, a color shift is suppressed by a multi-domain structure.

[Exemplary Embodiment 35]

Figure 30:
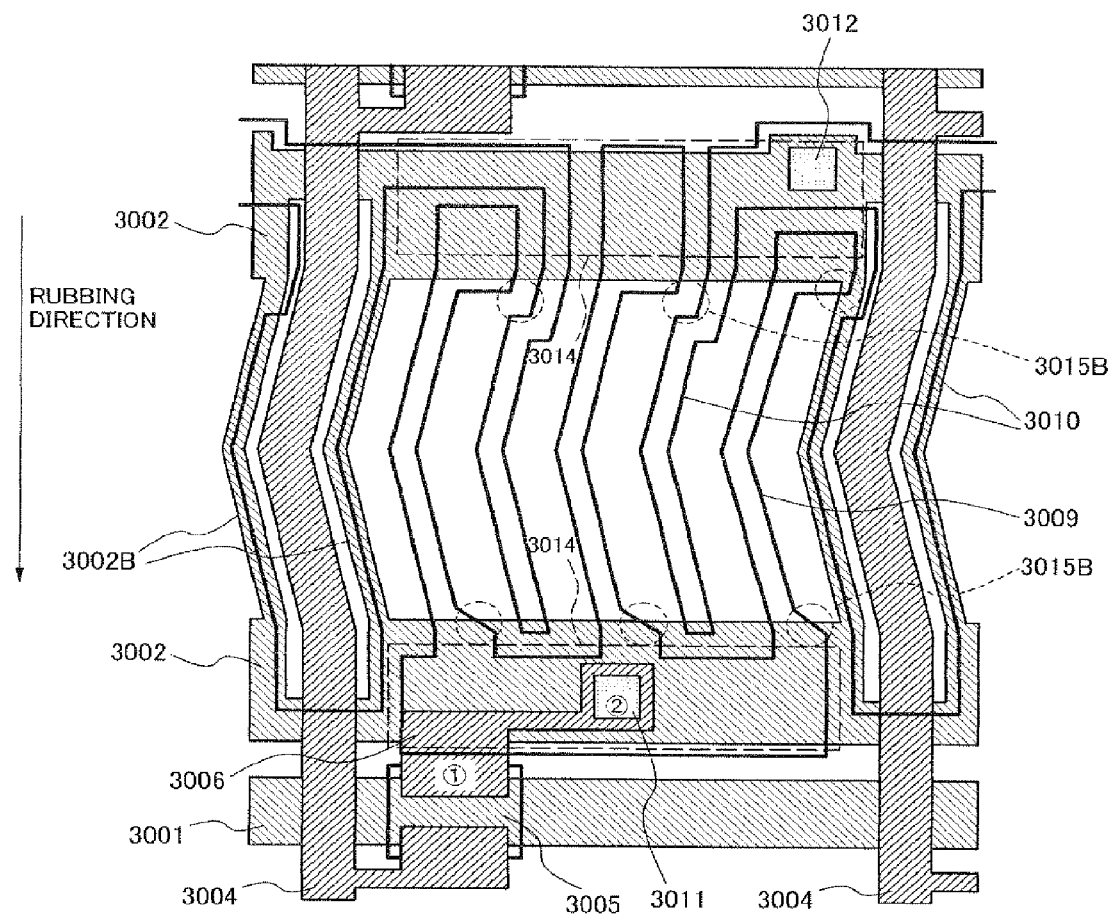
FIG. 30 is a plan view showing a pixel of configuration of an LCD device according to a thirty-fifth exemplary embodiment.

Next, a thirty-fifth exemplary embodiment is described by referring to FIG. 30. Two common signal wiring lines arranged in an upper part and a lower part of a pixel which are in a first storage capacity forming section and a second storage capacity forming section are electrically connected by a connection part 1902B arranged along a plurality of video signal wiring lines.

When the two common signal wiring lines 3002 of an upper side and a lower side of the pixel are connected by a connection part 3002B, delay of a common signal is decreased and in-plane distribution of luminance or a flicker level becomes uniform. The configuration contributes to high definition of a display, and is so effective for high definition of a display when a device is large and high definition is required. In the exemplary embodiment, when the connection part 3002B is arranged along a side of the plurality of video signal wiring lines, a leakage electric field from the plurality of video signal wiring lines to display areas is suppressed strongly, and vertical cross talk is suppressed.

According to the thirty-fifth exemplary embodiment, frequency of a short circuit decreases substantially, an effect of preventing reverse-rotation of LC molecules in whole display areas increases, and efficiency for light utilization increases. Marks of a finger push do not remain on a screen of an LC panel. In a display device of the exemplary embodiment, due to a multi-domain structure, even if viewing a screen in an oblique direction, color shift is suppressed. In-plane distribution of luminance or a flicker level becomes uniform, vertical cross talk is suppressed, and image quality improves.

[Exemplary Embodiment 36]

Figure 31:
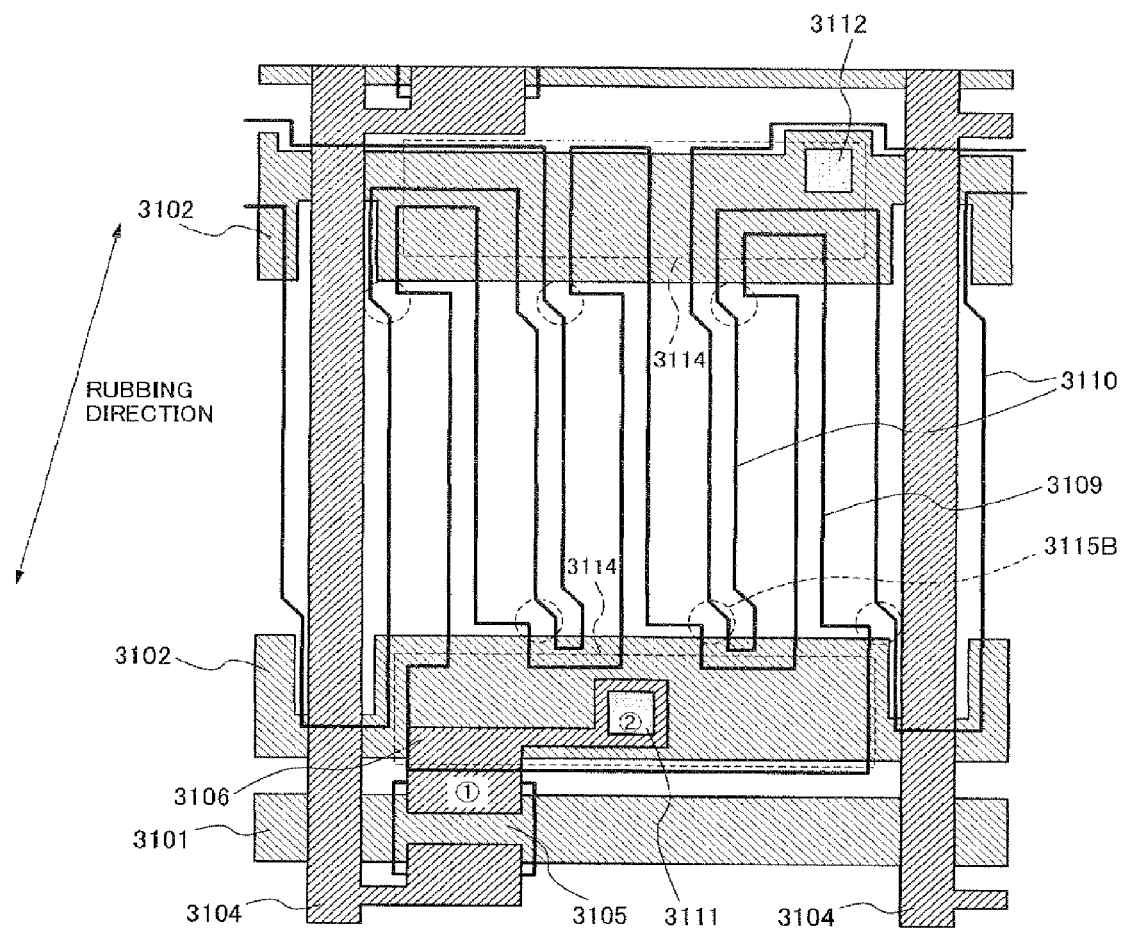
FIG. 31 is a plan view showing a pixel of configuration of an LCD device according to thirty-sixth to thirty-seventh exemplary embodiment.

Next, a thirty-sixth exemplary embodiment is described by referring to FIG. 31. In a second reverse-rotation preventing structure 3115B, common electrodes 3110 adjacent to pixel electrodes 3109 does not includes shapes thoroughly along with shapes of pixel electrodes 3109, but includes shapes in which near a tip thereof is slanted. Even when changing shapes, an effect for suppressing a reverse-rotation electric field remains unchanged, and shapes of the common electrodes 3110 may be freely formed according to a design condition. The shapes of the common electrodes 3110 according to this exemplary embodiment are effective, when a column width is narrow and common electrodes of right-angled crank shapes cannot be made easily.

According to the thirty-sixth exemplary embodiment, frequency of a short circuit decreases substantially, reverse-rotation of LC molecules is prevented in whole display areas, and efficiency for light utilization increases. Marks of a finger push do not remain on a screen of an LC panel.

[Exemplary Embodiment 37]

Next, a thirty-seventh exemplary embodiment is described by referring to FIG. 31. A distance from edges of a concave portion formed by removing a third insulating layer just below pixel electrodes to display areas is defined.

When edges of the concave portion 3114 formed by removing the third insulating film are close to display areas, light leak caused by a step occurs to cause increase of black-level luminance. Accordingly, in the exemplary embodiment, the distance from the edges of the concave portion 3114 formed by removing the third insulating film to the display areas is defined. Light leakage is well suppressed, when the distance is large. If the distance of not less than 2 m is kept, the light leakage due to the step is intercepted with common signal wiring lines 1702, and a black-level luminance does not increase.

According to the thirty-seventh exemplary embodiment, frequency of a short circuit decreases substantially and reverse-rotation of LC molecules is prevented in whole display areas, and a sufficient storage capacitance is formed. Since a black-level luminance does not increase, a contrast improves.

[Exemplary Embodiment 38]

Figure 32:
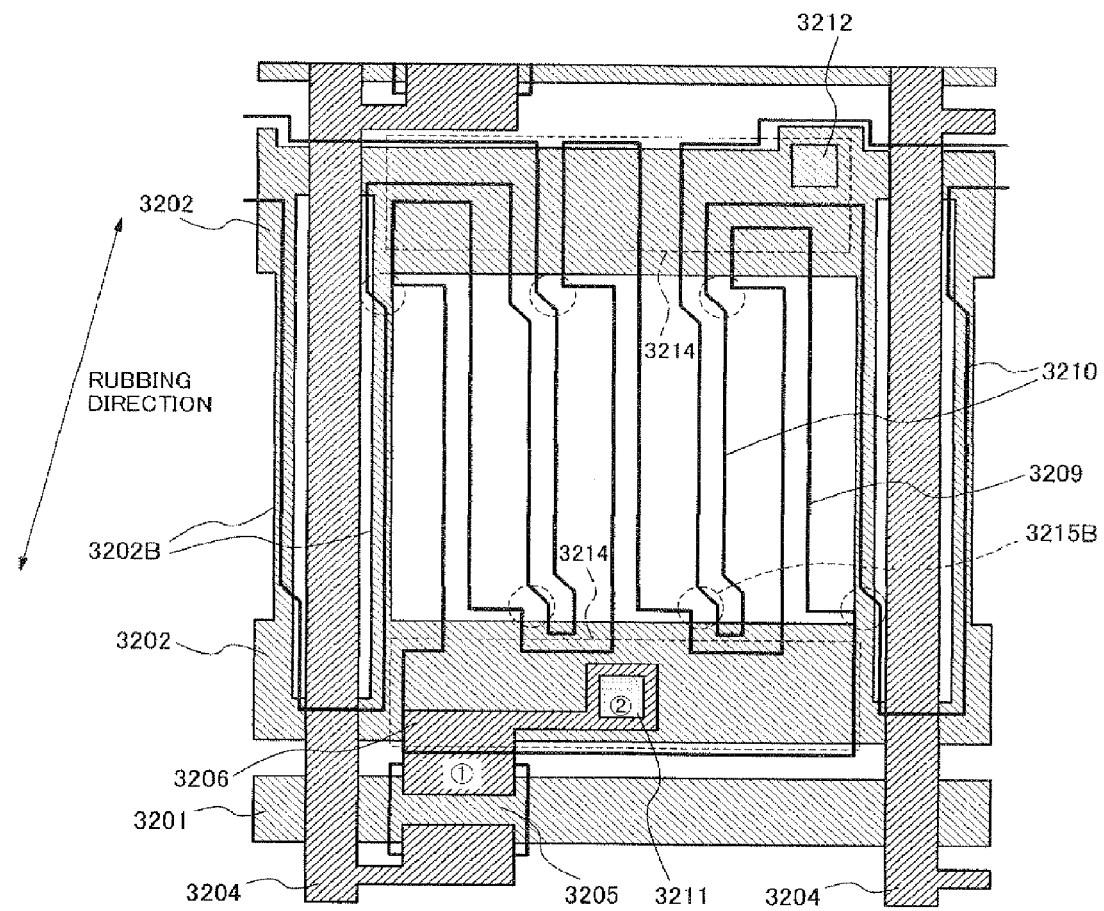
FIG. 32 is a plan view showing a pixel of configuration of an LCD device according to a thirty-eighth exemplary embodiment.

Next, a thirty-eighth exemplary embodiment is described by referring to FIG. 32. Two common signal wiring lines arranged in an upper part and a lower part of a pixel which are in a first storage capacity forming section and a second storage capacity forming section are electrically connected by a connection part 1902B arranged along a plurality of video signal wiring lines.

When the two common signal wiring lines 3202 of an upper side and a lower side of the pixel are connected by the connection part 3202B, delay of a common signal is decreased and in-plane distribution of luminance or a flicker level becomes uniform. The configuration contributes to high definition of a display and is so effective for high definition of a display when a device is large and high definition is required. In the exemplary embodiment, when the connection part 3202B is arranged along a side of the plurality of video signal wiring lines, a leakage electric field from the plurality of video signal wiring lines to display areas is suppressed strongly, and vertical cross talk is suppressed.

According to the thirty-eighth exemplary embodiment, frequency of a short circuit decreases substantially and reverse-rotation of LC molecules is prevented in whole display areas, and efficiency for light utilization increases. Marks of a finger push do not remain on a screen of an LC panel. In-plane distribution of luminance or a flicker level becomes uniform, vertical cross talk is suppressed, and image quality improves.

[Exemplary Embodiment 39]

Figure 33:
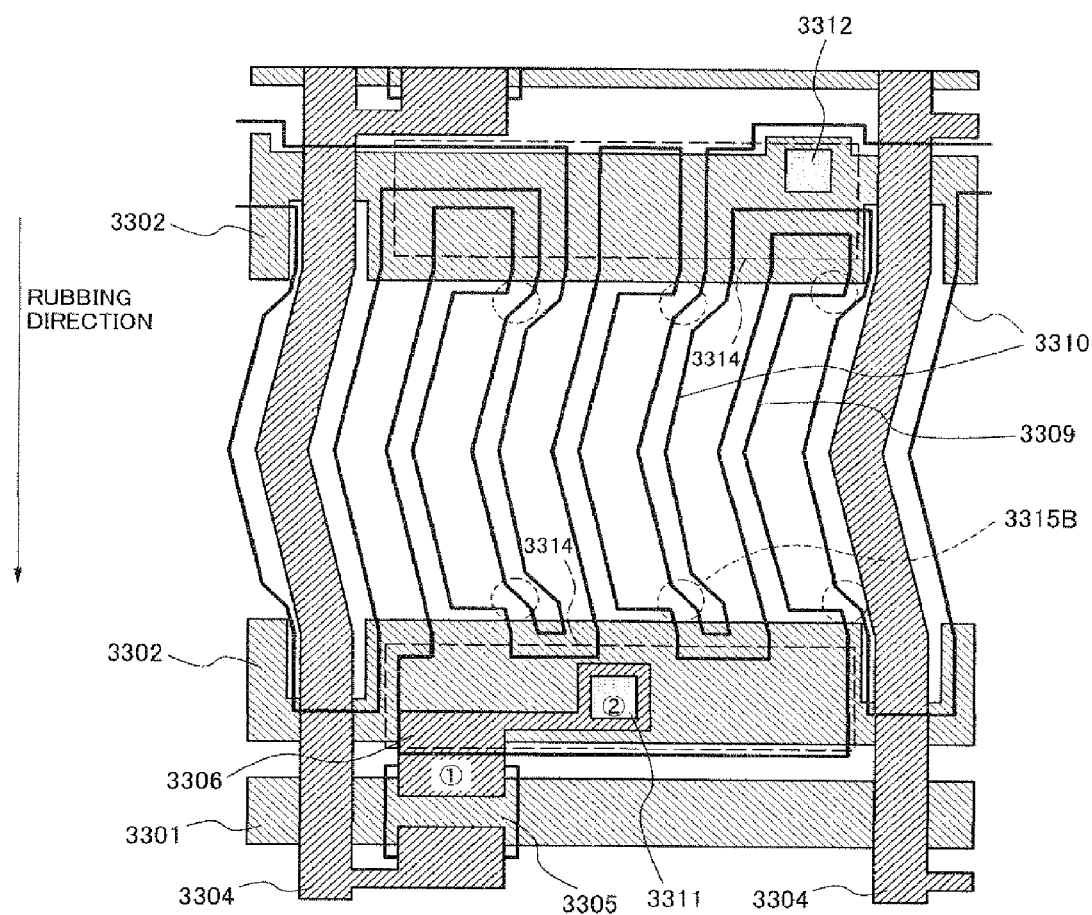
FIG. 33 is a plan view showing a pixel of configuration of an LCD device according to a thirty-ninth exemplary embodiment.

Next, a thirty-ninth exemplary embodiment is described by referring to FIG. 33. Common electrodes 3310, pixel electrodes 3309 and a plurality of video signal wiring lines 3304 bend to form a multi-domain structure in a center of display areas. In accordance with the structure, a direction of a second reverse-rotation preventing structure 3315B is changed from a direction of a single domain described in the thirty-sixth and the thirty-seventh exemplary embodiment.

According to the thirty-ninth exemplary embodiment, frequency of a short circuit decreases substantially and reverse-rotation of LC molecules is prevented in whole display areas, and efficiency for light utilization increases. Marks of a finger push do not remain on a screen of an LC panel. Even if viewing a screen in an oblique direction, a color shift is suppressed by the multi-domain structure.

[Exemplary Embodiment 40]

Figure 34:
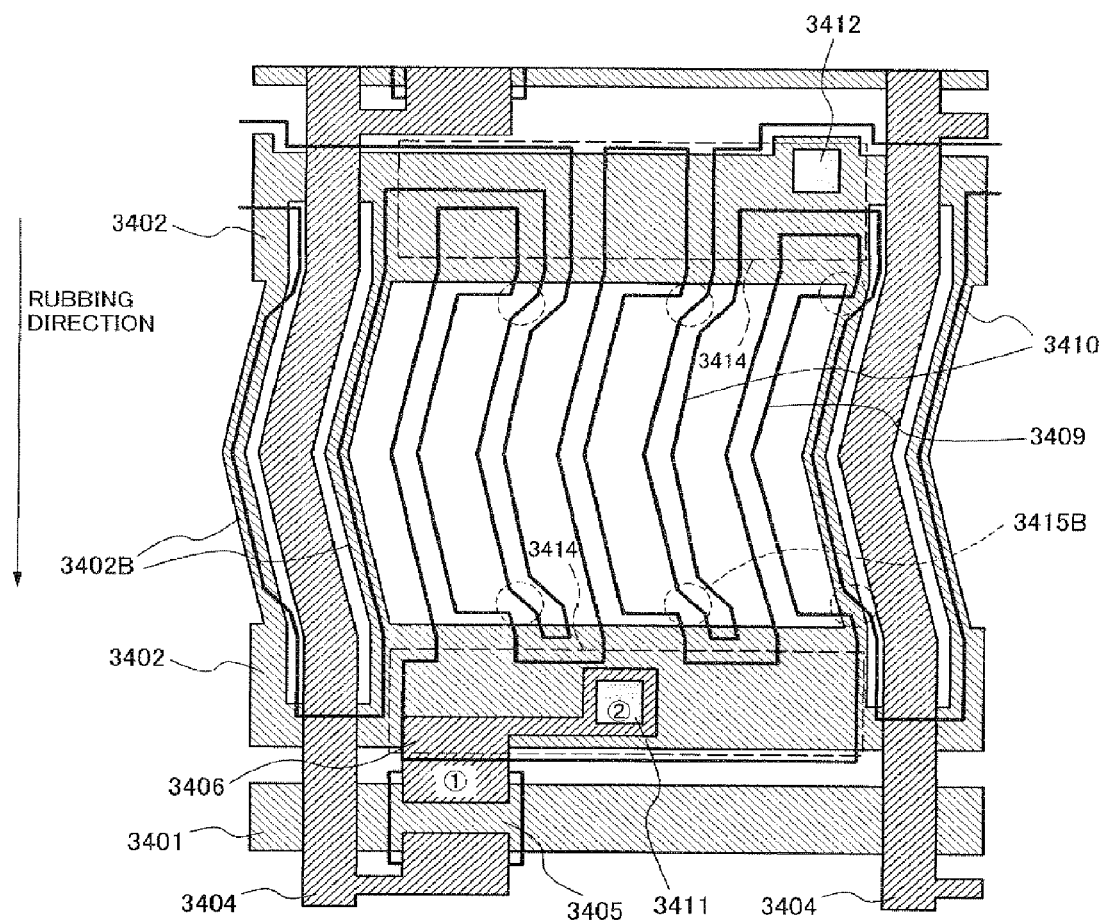
FIG. 34 is a plan view in the neighborhood of a second reverse-rotation preventing structure of an LCD device according to a fortieth exemplary embodiment.

Next, a fortieth exemplary embodiment is described by referring to FIG. 34. Two common signal wiring lines arranged in an upper part and a lower part of a pixel which are in a first storage capacity forming section and a second storage capacity forming section are electrically connected by a connection part 1902B arranged along a plurality of video signal wiring lines.

When the two common signal wiring lines 3402 of an upper side and a lower side of the pixel are connected by the connection part 3402B, delay of a common signal is decreased and in-plane distribution of luminance or a flicker level becomes uniform. The configuration contributes to high definition of a display, and is so effective for high definition of a display when a device is large and high definition is required. In the exemplary embodiment, the connection part 3402B is arranged along a side of the plurality of video signal wiring lines, a leakage electric field from the plurality of video signal wiring lines to display areas is suppressed strongly, and vertical cross talk is suppressed.

According to the fortieth exemplary embodiment, frequency of a short circuit decreases substantially and reverse-rotation of LC molecules is prevented in whole display areas, and efficiency for light utilization increases. Marks of a finger push do not remain on a screen of an LC panel. Even if viewing a screen in an oblique direction, color shift is suppressed by a multi-domain structure. In-plane distribution of luminance or a flicker level becomes uniform, vertical cross talk is suppressed, and image quality improves.

[Exemplary Embodiment 41]

Next, a forty-first exemplary embodiment is described by referring to FIGS. 18 and 23. A positional relationship between edges of a region having a wide width in both ends of pixel electrodes and edges of a plurality of common signal wiring lines are defined.

As shown in FIGS. 18 and 23, in order to suppress a reverse-rotation electric field, it is desirable that edges of the wide width region of the ends of the pixel electrode project, by 1 μm to 4 μm, from the edges of the plurality of common signal wiring lines. However, even when the edges of the wide width region of the ends of the pixel electrode go back, by around 1 μm, from the edges of the plurality of common signal wiring lines, reverse-rotation of LC molecules is prevented. Therefore, the edges of the wide width region of the ends of the pixel electrode may be formed, in a range from 1 μm inside to 4 μm outside, with respect to the edges of the plurality of common signal wiring lines.

According to the forty-first exemplary embodiment, a reverse-rotation preventing structure for LC molecules in whole display areas includes a large process margin to easily align a mask or the like.

[Exemplary Embodiment 42]

Next, a forty-second exemplary embodiment is described by referring to FIGS. 18 and 23. Shapes of a plurality of common signal wiring lines are defined in the embodiment.

Edges of a plurality of common signal wiring lines which face display areas and define boundaries of display areas of pixels include straight line shapes. In a related art, edges of common signal wiring lines include saw-like shapes since a reverse-rotation preventing structure is formed thereat. Therefore, a transmitting light is scattered in the edges of the wiring lines.

According to the forty-second exemplary embodiment, since edges of the plurality of common signal wiring lines which define boundaries in display areas of pixels are formed to be simple linear shapes, scattering of transmitting light in the wiring line edges is suppressed. Since the scattering of a transmitting light is suppressed, a linearly-polarized-light state in a black display is not spoiled. Further since a black-level luminance does not increase, high contrast is obtained.

In each above-mentioned exemplary embodiment, a TFT is described as a switching element. In the present invention, however, other elements, such as a thin film diode (TFD), can also be used as a switching element. A configuration of a substrate facing a TFT substrate, a configuration of an optical member arranged on the outside of the liquid crystal panel which includes a TFT substrate, a counter substrate, and an LC layer, and a configuration of back light for illuminating an LC panel, etc. are not limited to the above-mentioned and can employ any available technology.

The first and second reverse-rotation preventing structures and the structure in which source electrodes are reduced are combined in each above-mentioned exemplary embodiment. However such reverse-rotation preventing structures are not necessarily applied only to the structure in which source electrodes are reduced. Such reverse-rotation preventing structures can be applied to a device which includes a plurality of common signal wiring lines and common electrodes and pixel electrodes thereon, and can prevent disclination of ends of a plurality of pixels to realize high contrast.

The above-mentioned exemplary embodiments describe examples in which two insulating layers are disposed on a plurality of video signal wiring lines, and pixel electrodes and common electrodes thereon. However, in above mentioned structure, one insulating layer or more than one insulating layers are available.

[The Availability on the Industry]

The present invention is available to an active matrix type LCD device of a lateral electric field type, and arbitrary instruments which use this LCD device as a display device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

The invention claimed is:

1. An active matrix liquid crystal display device, comprising:
   a first substrate including
      a scan signal wiring line,
      a common signal wiring line parallel to the scan signal wiring line,
      a video signal wiring line intersecting the scan signal wiring line and the common signal wiring line, and
      a pixel, which is disposed in a first region surrounded with the scan signal wiring lines and the video signal wiring lines, the pixel including a thin film transistor, a source electrode of the thin film transistor formed in a same first layer as the video signal wiring line, a pixel electrode connected to the source electrode, and a common electrode connected to the common signal wiring line,
   the pixel electrode and the common electrode being formed in a same single second layer, and at least one insulating film being provided between the first layer of the video signal wiring line and the second layer of the pixel electrode and the common electrode;
   a second substrate facing the first substrate; and
   a liquid crystal layer sandwiched by the first substrate and the second substrate, wherein
      a molecular axis of the liquid crystal layer is rotatable in a plane parallel to the first substrate by the electric field between the pixel electrode and the common electrode,
      a display area where the pixel electrode and the common electrode are formed in parallel to each other,
   the pixel electrode overlaps with the common signal wiring line at an end of the pixel electrode,
   in a region where the pixel electrode overlaps with the common signal wiring line, at one side of the pixel electrode, a width of the pixel electrode is increased, so as to face the common electrode with a narrower electrode spacing in order to prevent a reverse rotation of the molecular axis of the liquid crystal layer, and
   the pixel electrode edge, which is along a boundary between the pixel electrode with increased width and the display area, is parallel to the common signal wiring line edge which is along a boundary between the common signal wiring line and the display area.

2. The active matrix liquid crystal display device according to claim 1, wherein an edge of the pixel electrode of the part having the increased electrode width, is parallel to the edge of the facing common electrode.

3. The active matrix liquid crystal display device according to claim 1, wherein the edge of the pixel electrode in the region having the increased width at the end of the pixel electrode, the edge facing the display area, is positioned, by 1 µm, inside the common signal wiring line to, by 4 µm, outside the common signal wiring line.

4. The active matrix liquid crystal display device according to claim 1, wherein an edge of the common electrode, adjacent to the region having the increased width at the end of the pixel electrode, is bent in accordance with a shape of the pixel electrode.

5. The active matrix liquid crystal display device according to claim 4, wherein an edge of the pixel electrode and the common electrode having an edge which is bent in accordance with the edge of the pixel electrode are bent in a crank shape in the end of the pixel electrode.

6. The active matrix liquid crystal display device according to claim 1, wherein a part which defines a boundary of the display area of the pixel in an edge of the common signal wiring line includes a straight line shape, the edge facing the display area.

* * * * *